US012456118B1

(12) United States Patent
Walbroehl et al.

(10) Patent No.: US 12,456,118 B1
(45) Date of Patent: Oct. 28, 2025

(54) PERMISSION-BASED TIERED AUTHORIZATION FOR SMART CONTRACTS VIA BLOCKCHAIN CYBERSECURITY AUTHENTICATION SERVICES

(71) Applicant: Halborn Inc., Miami, FL (US)

(72) Inventors: Steven Robert Walbroehl, Miami, FL (US); Ferran Celades i Pons, Girona (ES)

(73) Assignee: Halborn Inc., Miami, FL (US)

( * ) Notice: Subject to any disclaimer, the term of this patent is extended or adjusted under 35 U.S.C. 154(b) by 235 days.

(21) Appl. No.: 18/171,168

(22) Filed: Feb. 17, 2023

Related U.S. Application Data

(60) Provisional application No. 63/413,183, filed on Oct. 4, 2022, provisional application No. 63/311,823, filed on Feb. 18, 2022.

(51) Int. Cl.
| | | |
|---|---|---|
| *G06Q 20/38* | (2012.01) | |
| *G06Q 20/22* | (2012.01) | |
| *G06Q 20/40* | (2012.01) | |

(52) U.S. Cl.
CPC ....... *G06Q 20/3825* (2013.01); *G06Q 20/223* (2013.01); *G06Q 20/4016* (2013.01)

(58) Field of Classification Search
CPC ............. G06Q 20/3825; G06Q 20/223; G06Q 20/4016

(Continued)

(56) References Cited

U.S. PATENT DOCUMENTS

| | | |
|---|---|---|
| 9,137,242 B2 | 9/2015 | Fang |
| 9,300,665 B2 | 3/2016 | Ronda |

(Continued)

FOREIGN PATENT DOCUMENTS

| | | |
|---|---|---|
| CN | 109359994 A | 2/2019 |
| CN | 109697613 A | 4/2019 |

(Continued)

OTHER PUBLICATIONS

US 10,903,983 B2, 01/2021, Li (withdrawn)

(Continued)

*Primary Examiner* — Zeshan Qayyum
(74) *Attorney, Agent, or Firm* — Baker Botts L.L.P.

(57) ABSTRACT

In one embodiment, a method includes receiving transaction data associated with a protected first function of a first blockchain transaction protocol by a cybersecurity authentication service of a blockchain cybersecurity platform, assigning a first authority classification to the protected first function based on a transaction protocol runbook comprising preconfigured conditions associated with the protected first function, accessing the transaction data via a cybersecurity authentication interface by a first cybersecurity authority having an authority classification corresponding to the first authority classification, determining that the protected first function should be authenticated by the first cybersecurity authority based on each preconfigured condition being satisfied, inputting an authentication of the protected first function via the cybersecurity authentication interface by the first cybersecurity authority, and transmitting a transaction bundle configured to update a second blockchain transaction protocol to indicate that the protected first function is authenticated.

18 Claims, 43 Drawing Sheets

(58) Field of Classification Search
USPC .......................................................... 705/75
See application file for complete search history.

(56) References Cited

U.S. PATENT DOCUMENTS

| | | | |
|---|---|---|---|
| 9,306,754 B2 | 4/2016 | Baghdasaryan | |
| 9,853,977 B1 | 12/2017 | Laucius | |
| 9,900,163 B2 | 2/2018 | Lund | |
| 10,432,585 B2 | 10/2019 | Irwan | |
| 10,476,847 B1 | 11/2019 | Smith | |
| 10,567,174 B2 | 2/2020 | Wang | |
| 10,848,318 B2 | 11/2020 | Uhr | |
| 10,972,274 B2 | 4/2021 | Redpath | |
| 10,992,465 B2 | 4/2021 | Zhang | |
| 11,004,067 B2 | 5/2021 | Cheng | |
| 11,019,050 B2 | 5/2021 | Li | |
| 11,025,435 B2 | 6/2021 | Li | |
| 11,108,545 B2 | 8/2021 | Zuo | |
| 11,233,655 B2 | 1/2022 | Yang | |
| 11,251,937 B2 | 2/2022 | Jevans | |
| 11,315,109 B2 | 4/2022 | Lin | |
| 11,539,526 B2 | 12/2022 | Channa | |
| 11,568,396 B2 | 1/2023 | Song | |
| 11,861,464 B2 | 1/2024 | Sinha | |
| 12,056,646 B1 | 8/2024 | Ong | |
| 2001/0027527 A1 | 10/2001 | Khidekel | |
| 2009/0063112 A1 | 3/2009 | Hader | |
| 2015/0227895 A1 | 8/2015 | O'Hara | |
| 2015/0302402 A1 | 10/2015 | Chan Chi Yuen | |
| 2018/0082294 A1 | 3/2018 | Davis | |
| 2019/0018887 A1 | 1/2019 | Madisetti | |
| 2019/0043053 A1 | 2/2019 | Jain | |
| 2019/0306232 A1* | 10/2019 | Brock | H04W 4/38 |
| 2019/0334886 A1 | 10/2019 | Lelcuk | |
| 2020/0082388 A1 | 3/2020 | Wang | |
| 2020/0220728 A1 | 7/2020 | Ardashev | |
| 2020/0313856 A1 | 10/2020 | Basu | |
| 2020/0349569 A1 | 11/2020 | Murao | |
| 2021/0004246 A1 | 1/2021 | Ullmann | |
| 2021/0049602 A1 | 2/2021 | Yang | |
| 2021/0119790 A1 | 4/2021 | Eggimann | |
| 2021/0185051 A1 | 6/2021 | Soryal | |
| 2021/0224797 A1 | 7/2021 | Berengoltz | |
| 2021/0326984 A1* | 10/2021 | Kim | G06Q 40/04 |
| 2021/0406003 A1* | 12/2021 | Crabtree | G06F 21/64 |
| 2022/0092587 A1 | 3/2022 | Jevans | |
| 2022/0138290 A1 | 5/2022 | Lim | |
| 2022/0166634 A1 | 5/2022 | Zhu | |
| 2022/0321364 A1 | 10/2022 | Sholtis | |
| 2022/0383322 A1 | 12/2022 | Butvinik | |
| 2023/0012019 A1 | 1/2023 | Newsom | |
| 2023/0128039 A1* | 4/2023 | Kumawat | G06F 16/2379 707/822 |
| 2023/0131813 A1* | 4/2023 | Goel | G06Q 20/401 705/75 |
| 2023/0206216 A1 | 6/2023 | Lehmann | |
| 2024/0275611 A1* | 8/2024 | Molloy | H04L 9/50 |

FOREIGN PATENT DOCUMENTS

| | | |
|---|---|---|
| CN | 110060056 A | 7/2019 |
| CN | 110473102 A | 11/2019 |
| CN | 110619222 A | 12/2019 |
| CN | 111291398 A | 6/2020 |
| CN | 111400743 A | 7/2020 |
| CN | 111459672 A | 7/2020 |
| CN | 111460458 A | 7/2020 |
| CN | 112199721 A | 1/2021 |
| CN | 112424775 A | 2/2021 |
| CN | 113162915 A | 7/2021 |
| CN | 113393239 A | 9/2021 |
| CN | 113742709 A | 12/2021 |
| CN | 113901519 A | 1/2022 |
| CN | 114066446 A | 2/2022 |
| CN | 114066546 A | 2/2022 |
| CN | 114519178 A | 5/2022 |
| CN | 115118426 A | 9/2022 |
| CN | 115118428 A | 9/2022 |
| EP | 3488555 B1 | 9/2020 |
| JP | 6871386 B2 | 5/2021 |
| KR | 20150003297 A | 1/2015 |
| KR | 102140462 B1 | 8/2020 |
| KR | 102205654 B1 | 1/2021 |
| WO | WO9964995 A1 | 12/1999 |
| WO | WO2011050745 A1 | 5/2011 |
| WO | WO2017001587 A1 | 1/2017 |
| WO | WO2018069566 A1 | 4/2018 |
| WO | WO2018183099 A1 | 10/2018 |
| WO | WO2020064890 A1 | 4/2020 |

OTHER PUBLICATIONS

U.S. Appl. No. 18/171,152, filed Feb. 17, 2023, Steven Robert Walbroehl.

U.S. Appl. No. 18/171,165, filed Feb. 17, 2023, Steven Robert Walbroehl.

U.S. Appl. No. 18/171,176, filed Feb. 17, 2023, Steven Robert Walbroehl.

U.S. Appl. No. 18/171,186, filed Feb. 17, 2023, Steven Robert Walbroehl.

* cited by examiner

Dashboard 210

Projects 220

| Name | Protection: Verify Seraph | Last TX |
|---|---|---|
| Uniswap | ⌄ Contacts | 2mo Ago |
| Chainlink | ⌄ Contacts | 2mo Ago |
| USDC | ⌄ Contacts | 2mo Ago |
| WBTC | ⌄ Contacts | 2mo Ago |
| Shiba Inu | ⌄ Contacts | 2mo Ago |
| Tether | ⌄ Contacts | 2mo Ago |
| Client6 | ⌄ Contacts | 2mo Ago |

Latest Permits 230

Search For Project

| | | |
|---|---|---|
| Tether deleteReserve(bytes32) | Permit Approved | 2mo Ago |
| Uniswap deleteReserve(bytes32) | Permit Approved | 2mo Ago |
| USDC Approve() | Permit Approved | 2mo Ago |
| Tether Approve(uint256) | Permit Approved | 2mo Ago |

*FIG. 2*

/// Cybersecurity Authentication | Search For Project By Name / Token name / Contract Address 🔍 | Incorrect Chain 0xf73F | Disconnect |

◁ Back To Projects

Democlient > Testcontract > Emergencywithdraw

Contracts 310   Functions 320   Permits 330

Permit Detail 340

| Permit ID 13 | |
|---|---|
| Client | Democlient |
| Contact | Testcontact   0x768E2F22185B6159809A2E9d7AC7f43877BB0aB28   0xeb3f4966 |
| Function | Emergencywithdraw()   0xdb2e21bc |
| Call Data | 0xdb2e21bc |

Permit State 350

| Last State | Permit State | Last TX |
|---|---|---|
| PermitExecuted | PermitExecuted | 26d Ago |
|  | PermitApproved | 26d Ago |
|  | PermitVoted | 26d Ago |
|  | PermitAccepted | 26d Ago |
|  | NewPermit | 26d Ago |

///  Cybersecurity
    Authentication          Search For Project By Name / Token name / Contact Address  🔍   Incorrect Chain  0xf73F  Disconnect ‹ Back To Projects Democlient  ›  Testcontract  ›  Emergencywithdraw Contracts   Functions   Permits Permit Detail 410

| Permit ID | 13 | |
|---|---|---|
| Client | Democlient | |
| Contact | Testcontact  0x768E2F22185B6159809A2E9d7AC7f43877BB0aB28 | 0xeb3f4966 |
| Function | Emergencywithdraw() | |
| Call Data | 0xdb2e21bc | 0xdb2e21bc |

~400

Permit State 420

| Last State | Permit State | Last TX |
|---|---|---|
| PermitExecuted | PermitExecuted | 26d Ago |
|  | PermitApproved | 26d Ago |
|  | PermitVoted | 26d Ago |
|  | PermitAccepted | 26d Ago |
|  | NewPermit | 26d Ago |

*FIG. 4*

Blockchain Provider
Example Blockchain Network | All Filters ⌄ | Search By Address
Approve

Transaction Details 510

Overview 520 | Internal Txns 530 | State 540

- Transaction Hash: 0x63707358921f0d5801adc02ea5eba6e4ccba642a64224af0ca8e0707dfe08a
- Status: ⊙ Success
- Block: 10486340 ⟩ 45729 Block Confirmation
- Timelapse: ⊙ 8 Days 10 Mins Ago (Apr-11-2022 02:52:18 PM +UTC)
- From: 0x8dca754c7b87433b6941cf6b2deca3375edbbc1
- To: ⊕ Contract 0x245dbeb1a55a1f04a8ed734e4fbc8caac924496a

*FIG. 5*

| Blockchain Provider | | All Filters ⌄ | | Search By Address/ Reject |
|---|---|---|---|---|

Example Blockchain Network

Transaction Details 610

| Overview 620 | Internal Txns 630 | State 640 |
|---|---|---|

(?) Transaction Hash: 0x63707358921f0d5801adc02ea5eba6e4ccba642a64224af0ca8e0707dfe08a ⧉

(?) Status: ⊗ Fail With Error 'Transaction Not Approved'

(?) Block: 10486311 ⟩ 45558 Block Confirmation (?) Timelapse: ⏱ 7 Days 23 Hrs Ago (Apr-11-2022 02:45:01 PM +UTC)

(?) From: 0x8dca754c7b87433b6941cf6b2deca3375edbbc1 ⧉

(?) To: ⊕ Contract 0x245dbeb1a55a1f04a8ed734e4fbc8caac924496a △ ⧉
☐ Warning! Error Encountered During Contact Execution [Execution Reverted] ☺

*FIG. 6*

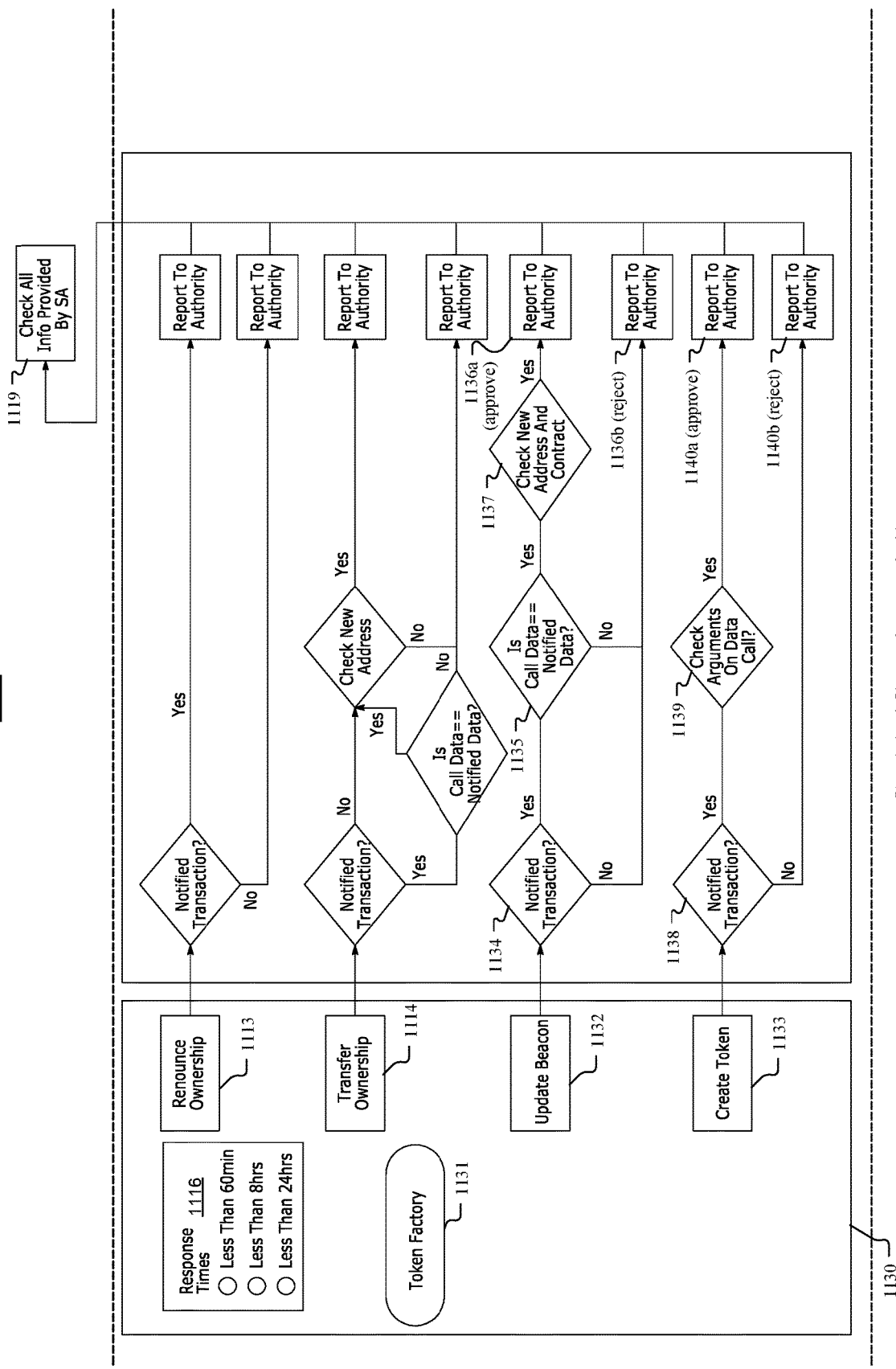
FIG. 11 (Continued 1)

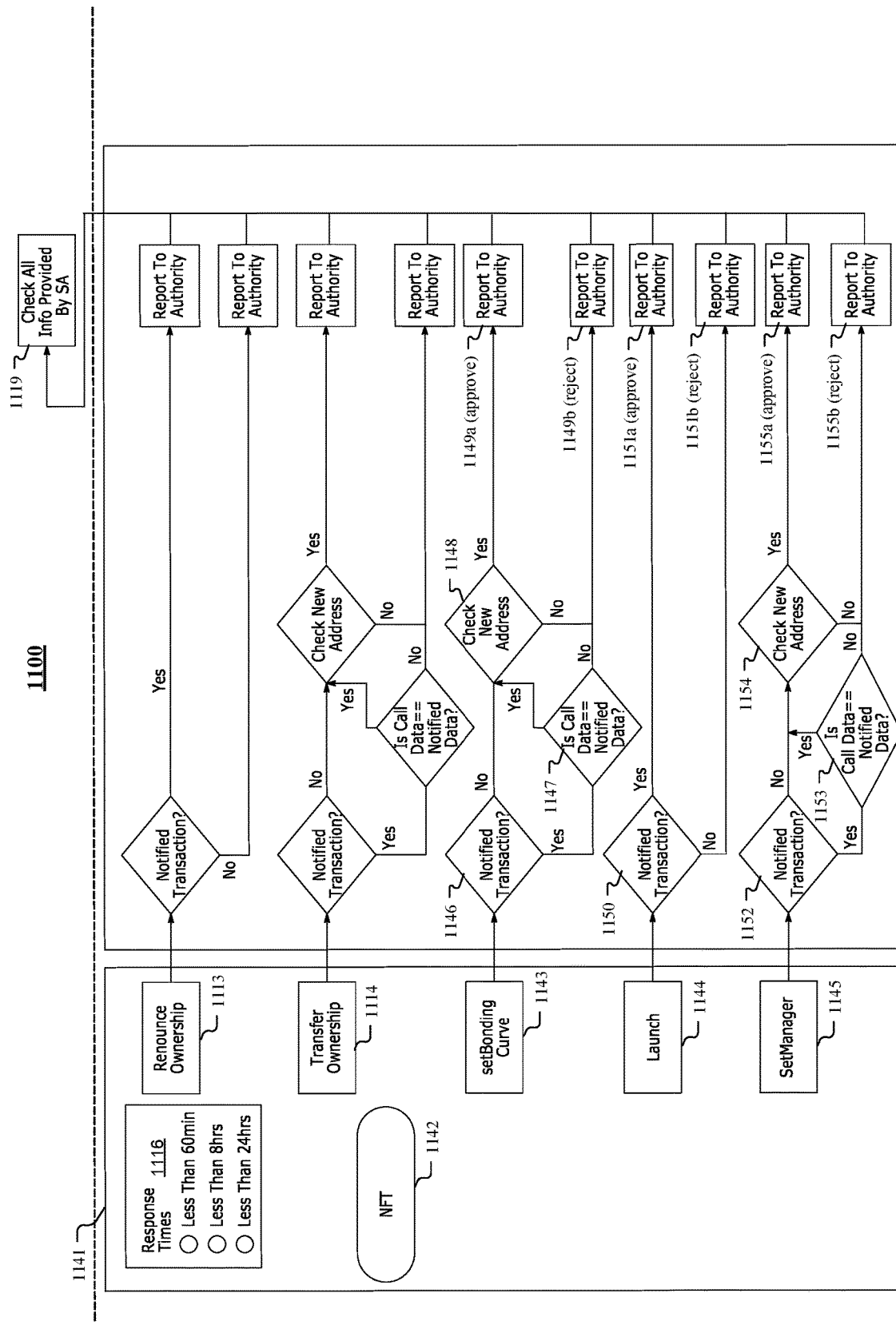
FIG. 11 (Continued 2)

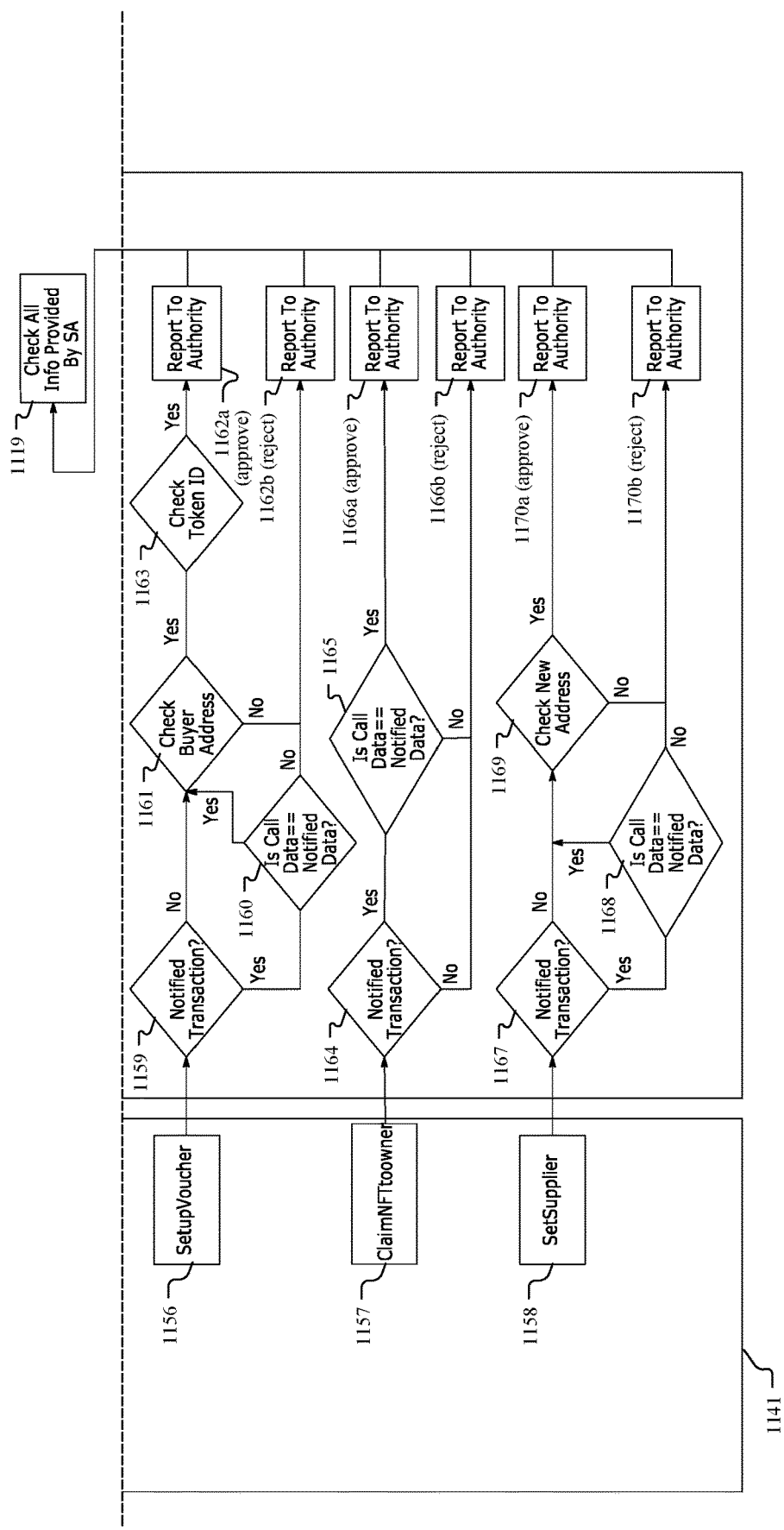
FIG. 11 (Continued 3)

cybersecurity authentication | Search For Project By Name/ Token Name/ Contract Address | 🔍 | 0×0067 | Disconnect (ETH) (RIN) (GOE) (POLYGON) (POLYGON-TEST) (AVAX) (AVAX-TEST) (BSC) (BSC-TEST)

〈Back To Users

Finance Company 1310

Contracts 1320

← 1300

| Contract | Address | Last TX |
|---|---|---|
| Vault 1330 | 0x3c6700538b7A9e2D022f9 0E7CFa5d1C521c65949 | 2h ago |

Latest Finance Company
Transactions 1330

Search For Project By Name / t  🔍

Vault — Sent
TransferOwnership(Ad — 2h ago
dress Newowner)

Vault — Sent
ChangeFee(uint2 — 2h ago
56 Amount)

*FIG. 13A*

FIG. 13B cybersecurity authentication | Search For Project By Name/ Token Name/ Contract Address | 0x0067 | Disconnect

[ETH] [RIN] [GOE] [POLYGON] [POLYGON-TEST] [AVAX] [AVAX-TEST] [BSC] [BSC-TEST]

Dashboard

Client Has 0 Contracts Protected By Seraph On ChainId 4

Users 1405

| Name | Last TX | | Latest Transactions | |
|---|---|---|---|---|
| ZionDAO | 2h ago | | Vault<br>TransferOwnership(Address Newowner) | Sent<br>2h ago |
| Finance Company 1410 | | | Vault<br>ChangeFee(uint256 Amount) | Sent<br>2h ago |

*FIG. 14A*

← 1400 cybersecurity authentication | Search For Project By Name/ Token Name/ Contract Address | 🔍 | 0×0067 | Disconnect

[ETH] [RIN] [GOE] [POLYGON] [POLYGON-TEST] [AVAX] [AVAX-TEST] [BSC] [BSC-TEST]

<Back To Users

Finance Company > Vault

Contracts    Functions 1425

| Function | Sign | Last TX |
|---|---|---|
| Withdraw(uint256 Amount) | Sign | |
| WithdrawAll() | Sign | 2h ago |
| TransferOwnership (Adress Newowner) 1430 | Sign | 2h ago |
| ChangeFee(uint256 Amount) | Sign | |

Latest Finance Company Transactions

Search For Project By Name / t  🔍

Vault — Sent
TransferOwnership(Address Newowner) — 2h ago

Vault — Sent
ChangeFee(uint256 Amount) — 2h ago

*FIG. 14C*

| cybersecurity authentication | Search For Project By Name/ Token Name/ Contract Address 🔍 | 0×0067 | Disconnect |

(ETH) (RIN) (GOE) (POLYGON) (POLYGON-TEST) (AVAX) (AVAX-TEST) (BSC) (BSC-TEST)

<Back To Users

Finance Company > Vault > Transferownership(Address Newowner)

Contracts    Functions    Transactions 1435

| TX Hash | Call Data | msg.value | Stage | Last TX |
|---|---|---|---|---|
| 0x04453f52c4b9326d5d5ecb9ab9785eb5fa4f79129e06a5605cd7df2d62dea3ab  1440 | 0xf2fde38...6720b... | 0x0 | Sent | 2h ago |

*FIG. 14D*

| cybersecurity authentication | Search For Project By Name/ Token Name/ Contract Address | 0×0067 | Disconnect |

[ETH] [RIN] [GOE] [POLYGON] [POLYGON-TEST] [AVAX] [AVAX-TEST] [BSC] [BSC-TEST]

<Back To Users

Finance Company > Vault > TRANSFEROWNERSHIP(ADDRESS NEWOWNER)

Contracts     Functions     Transactions

Transaction Detail 1445

| | |
|---|---|
| TX ID | 0x82bd633e762d2b2d7b074425f429c3f5b7e87743441858c58ed14e10eaa |
| User | Finance Company |
| Contract | Vault |
| Function | TransferOwnership (Address Newowner) |
| Call Data | Function Name: |

TX State

| Last Stage | TX Stage | Last TX |

0x3c6700538b7A9e2D022f90E7CFa5d1C521c65949

0xf2fde38b

*FIG. 14E* cybersecurity authentication | Search For Project By Name/ Token Name/ Contract Address | 0x0067 | Disconnect

[ETH] [RIN] [GOE] [POLYGON] [POLYGON-TEST] [AVAX] [AVAX-TEST] [BSC] [BSC-TEST]

<Back To Users

Finance Company > Vault

1600

Contracts  Functions

| Function | Last TX | Sign |
|---|---|---|
| Withdraw(uint256 Amount) | | Sign |
| WithdrawAll() | | Sign |
| TransferOwnership (Address Newowner) 1610 | 2h ago | Sign 1620 |
| ChangeFee(uint256 Amount) | 2h ago | Sign |

Latest Finance Company Transactions

0x04453f52c4b9326d5d5ecb9

Vault — Sent

TransferOwnership — 2h ago
(Address Newowner)

*FIG. 16A* cybersecurity authentication | Search For Project By Name/ Token Name/ Contract Address | 0×0067 | Disconnect

[ETH] [RIN] [GOE] [POLYGON] [POLYGON-TEST] [AVAX] [AVAX-TEST] [BSC] [BSC-TEST]

<Back To Users

Finance Company > Vault

Contracts    Functions

| Function | Last TX |
|---|---|
| Withdraw(uint256 Amount) | |
| WithdrawAll() | 2h ago |
| TransferOwnership (Address Newowner) | 2h ago |
| ChangeFee(uint256 Amount) | |

Submit Approval

Function:
TransferOwnership
(Address Newowner)

Input Params:
Newowner

0×006720BE41fDce2f551648cbb!

[Cancel]   [Submit]

1630

Latest Finance Company Transactions

0×04453f52c4b9326d5d5ecb9

Vault                          Sent

TransferOwnership(Ad           2h ago
dress Newowner)

1600

*FIG. 16B* cybersecurity authentication | Search For Project By Name/ Token Name/ Contract Address 🔍 | 0x0067 | Disconnect (ETH) (RIN) (GOE) (POLYGON) (POLYGON-TEST) (AVAX) (AVAX-TEST) (BSC) (BSC-TEST)

<Back To Users

Finance Company > Vault

Contracts    Functions

1600

Function | Last TX
--- | ---
Withdraw(uint256 Amount) |
WithdrawAll() | 2h ago
TransferOwnership(Address Newowner) | 2h ago
ChangeFee(uint256 Amount) |

Submit Approval

Function:
TransferOwnership
(Address Newowner)

Input Params:
Newowner

0x006720BE41fDce2f551648cbb!

Cancel        Submit ⎯⎯ 1640

Latest Finance Company Transactions

0x04453f52c4b9326d5d5ecb9  🔍

Vault                                    Sent

TransferOwnership(Address              2h ago
Newowner)

*FIG. 16C*

PERMISSION-BASED TIERED AUTHORIZATION FOR SMART CONTRACTS VIA BLOCKCHAIN CYBERSECURITY AUTHENTICATION SERVICES

PRIORITY

This application claims the benefit, under 35 U.S.C. § 119(e), of U.S. Provisional Patent Application No. 63/311,823, filed 18 Feb. 2022 and U.S. Provisional Patent Application No. 63/413,183, filed 4 Oct. 2022, each of which is incorporated herein by reference.

TECHNICAL FIELD

This disclosure generally relates to databases and file management within blockchain network environments, and in particular relates to hardware and software for securing and validating transaction protocols within a blockchain network environment.

BACKGROUND

A blockchain is a type of digital ledger technology (DLT) that consists of a growing list of records, called blocks, that are securely linked together using cryptography. Each block contains a cryptographic hash of the previous block, a timestamp, and transaction data (generally represented as a Merkle tree, where data nodes are represented by leaves). The timestamp proves that the transaction data existed when the block was created. Since each block contains information about the block previous to it, they effectively form a chain (compare linked list data structure), with each additional block linking to the ones before it. Consequently, blockchain transactions are irreversible in that, once they are recorded, the data in any given block cannot be altered retroactively without altering all subsequent blocks.

A smart contract is a computer program that is stored on the blockchain and that is executed by the blockchain when certain conditions are met. For example, a smart contract can be used to automate the payment of a product that is delivered by a shipper to a customer. A smart contract is created by the creation transaction of a contract address. The contract address is the address of a blockchain account that has the authority to execute the smart contract. A smart contract is executed by invoking transactions to the contract address. The smart contract is the controller of the transaction. The transaction is the invocation of a function of the smart contract. The function is the implementation of a smart contract. The smart contract is a state machine. A state machine is a mathematical model that describes the behavior of a system. In a state machine, the system transitions from one state to another when an event occurs and a condition is met. In a smart contract, the event is the invocation of a function of the smart contract, and the condition is defined in the function that is invoked.

SUMMARY OF PARTICULAR EMBODIMENTS

In particular embodiments, a blockchain cybersecurity platform may utilize a cybersecurity authentication service to bridge the gap between decentralized and centralized administration of blockchain transaction protocols (i.e., smart contracts) to protect users (who may be clients of the blockchain cybersecurity platform) and developers of smart contracts on blockchains. The cybersecurity authentication service may be an information security service commissioned to serve an organization (centralized or decentralized) as a third-party witness to the signing of important on-chain actions. In particular embodiments, the cybersecurity authentication service may allow users to protect critical functions for owned smart contracts by registering them into the blockchain cybersecurity platform. Once registered, the cybersecurity authentication service may approve or deny transactions of said functions, in order to prevent misuse or attack against protected contracts and to deter fraud. Examples of important transactions the cybersecurity authentication service may be used to deter fraud for may comprise emergency withdrawal within a particular response time (e.g., less than 10 minutes), contract upgrades within a particular response time (e.g., less than 48 hours), change of ownership within a particular response time (e.g., less than 48 hours), DAO (decentralized autonomous organization)-proposal related payments within a particular response time (e.g., less than 48 hours), vendor payments within a particular response time (e.g., less than 48 hours), and insurance protocol claim payments within a particular response time (e.g., less than 48 hours). Although this disclosure describes securing particular transactions by particular systems in a particular manner, this disclosure contemplates securing any suitable transaction by any suitable system in any suitable manner.

In particular embodiments, the blockchain cybersecurity platform may receive, at a receiving node of the blockchain cybersecurity platform, transaction data associated with a first function of a first blockchain transaction protocol associated with a first user and a first blockchain network. The blockchain cybersecurity platform may then determine that the first function is protected by the blockchain cybersecurity platform based on the transaction data comprising a modifier associated with the blockchain cybersecurity platform. In particular embodiments, the blockchain cybersecurity platform may store, in a mempool of the blockchain cybersecurity platform, the transaction data associated with the protected first function. The blockchain cybersecurity platform may then access, by a cybersecurity authentication service of the blockchain cybersecurity platform, a transaction protocol runbook associated with the first user and the first blockchain transaction protocol. In particular embodiments, the transaction protocol runbook may comprise one or more preconfigured conditions associated with the protected first function. The blockchain cybersecurity platform may further determine, by the cybersecurity authentication service, whether the protected first function should be authenticated by determining, based at least in part on the transaction data, whether each preconfigured condition is satisfied. In particular embodiments, the blockchain cybersecurity platform may update, if each preconfigured condition associated with the protected first function is satisfied, a second blockchain transaction protocol associated with the blockchain cybersecurity platform and the first blockchain transaction protocol. The second blockchain transaction protocol may be updated to indicate that the protected first function is authenticated.

Certain technical challenges exist for effective cybersecurity authentication service. One technical challenge may include effectively determining whether a protected function of a smart contract should be authenticated. The solution presented by the embodiments disclosed herein to address this challenge may be a transaction protocol runbook associated with the protected function as the runbook may specify preconfigured conditions developed by entities associated with the smart contract and the function should be authenticated when all the preconfigured conditions are satisfied.

Certain embodiments disclosed herein may provide one or more technical advantages. A technical advantage of the embodiments may include enhanced security for smart contracts as the cybersecurity authentication service may determine whether protected functions in a smart contract should be authenticated for corresponding transactions. Another technical advantage of the embodiments may include a transactional level authentication as the cybersecurity authentication service may review protected functions at a transaction-by-transaction basis, making it a preventative solution for smart contracts. Certain embodiments disclosed herein may provide none, some, or all of the above technical advantages. One or more other technical advantages may be readily apparent to one skilled in the art in view of the figures, descriptions, and claims of the present disclosure.

In particular embodiments, the cybersecurity authentication service may be based on an automated authentication process. The automated approval process may be based on specific runbook rules in conjunction with an automated decisional logic module associated with the cybersecurity authentication service. The automated decisional logic module may comprise rules and the blockchain cybersecurity platform may check if these rules are met to determine if corresponding transactions should be approved or rejected automatically. As an example and not by way of limitation, the transaction protocol runbook may specify a list of values such as dates, amounts, regular expressions that match words, etc. for the automated approval process. These values may be specified in the runbook. In the automated authentication process, a lambda analyzer may review and approve or reject the transaction according to the user requirements. Although this disclosure describes particular automated authentication processes in a particular manner, this disclosure contemplates any suitable automated authentication process in any suitable manner.

In particular embodiments, the blockchain cybersecurity platform may access, by a cybersecurity authentication service of the blockchain cybersecurity platform, from a mempool of the blockchain cybersecurity platform, transaction data associated with a protected first function of a first blockchain transaction protocol associated with a first user and a first blockchain network. The blockchain cybersecurity platform may then access, by the cybersecurity authentication service of the blockchain cybersecurity platform, a transaction protocol runbook associated with the first user and the first blockchain transaction protocol. In particular embodiments, the transaction protocol runbook may comprise one or more preconfigured conditions associated with the protected first function. The blockchain cybersecurity platform may then determine, based at least in part on the transaction protocol runbook, that the protected first function is eligible to be analyzed by an automated decisional logic module of the cybersecurity authentication service. In particular embodiments, the blockchain cybersecurity platform may determine, by the automated decisional logic module, based at least in part on the transaction data, that each preconfigured condition associated with the protected first function is satisfied. The blockchain cybersecurity platform may then generate, by the automated decisional logic module, based at least in part on the one or more preconfigured conditions being satisfied, an authentication object for the protected first function. In particular embodiments, the blockchain cybersecurity platform may generate, by the cybersecurity authentication service, responsive to the authentication object being generated, signed transaction data based on the accessed transaction data and a private encryption key. The signed transaction data may be configured to update a second blockchain transaction protocol associated with the blockchain cybersecurity platform and the first blockchain transaction protocol to indicate that the protected first function is authenticated. In particular embodiments, the blockchain cybersecurity platform may further transmit, by the cybersecurity authentication service, to the first blockchain network, a transaction bundle comprising the accessed transaction data and the signed transaction data.

Certain technical challenges exist for the automated authentication process by the cybersecurity authentication service. One technical challenge may include automatically determining whether a protected function should be authenticated. The solution presented by the embodiments disclosed herein to address this challenge may be using an automated decisional logic module based on specific runbook rules and machine-learning models to determine whether each preconfigured condition is satisfied.

Certain embodiments disclosed herein may provide one or more technical advantages. A technical advantage of the embodiments may include efficient and secured cybersecurity authentication service as servers may automatically review and approve or reject the transaction according to the user requirements, thereby further protecting private/sensitive transaction data.

In particular embodiments, the cybersecurity authentication service may be based on a manual authentication process. The manual authentication process may incorporate runbook rule structure pertaining to the tiers (i.e., authority classifications) of functions and cybersecurity authorities. In the manual authentication process, an incident response team may personally review and approve/reject a transaction according to the user requirements. The incident response team may monitor the cybersecurity authentication service at all times and respond to alerts as soon as possible or within a previously agreed time. Although this disclosure describes particular manual authentication processes in a particular manner, this disclosure contemplates any suitable manual authentication process in any suitable manner.

In particular embodiments, the blockchain cybersecurity platform may receive, by a cybersecurity authentication service of the blockchain cybersecurity platform, transaction data associated with a protected first function of a first blockchain transaction protocol associated with a first user and a first blockchain network. The blockchain cybersecurity platform may then assign, by the cybersecurity authentication service, a first authority classification of a plurality of authority classifications to the protected first function. In particular embodiments, the first authority classification may be assigned based at least in part on a transaction protocol runbook associated with the first user and the protected first function. The transaction protocol runbook may comprise one or more preconfigured conditions associated with the protected first function. In particular embodiments, the blockchain cybersecurity platform may then access, by a first cybersecurity authority of a plurality of cybersecurity authorities associated with the cybersecurity authentication service, via a cybersecurity authentication interface, the transaction data associated with the protected first function and the transaction protocol runbook. The first cybersecurity authority may have an authority classification corresponding to the first authority classification. The blockchain cybersecurity platform may then determine, by the first cybersecurity authority, that the protected first function should be authenticated based on each preconfigured condition associated with the protected first function being satisfied. In particular embodiments, the blockchain cybersecurity platform may input, by the first cybersecurity authority, via the cybersecurity authentication interface, an authentication of the protected first function. The blockchain cybersecurity platform may further transmit, by the cybersecurity authentication service, to the first blockchain network, responsive to the authentication of the protected first function, a transaction bundle configured to update a second blockchain transaction protocol associated with the blockchain cybersecurity platform and the first blockchain transaction protocol to indicate that the protected first function is authenticated.

Certain technical challenges exist for the manual authentication process by the cybersecurity authentication service. One technical challenge may include determining the authority classification for a protected function. The solution presented by the embodiments disclosed herein to address this challenge may be determining the authority classification based on the transaction protocol runbook and different factors such as risk, sensitivity, complexity, etc. as the protected function may be evaluated comprehensively based on these factors using the transaction protocol runbook.

Certain embodiments disclosed herein may provide one or more technical advantages. A technical advantage of the embodiments may include further improved security of a protected function as the cybersecurity authentication service may be based on a tiered approval process where an escalation to a higher-level cybersecurity authority may be triggered when necessary to guarantee a secured and correct authentication for the function. Certain embodiments disclosed herein may provide none, some, or all of the above technical advantages. One or more other technical advantages may be readily apparent to one skilled in the art in view of the figures, descriptions, and claims of the present disclosure.

In particular embodiments, the cybersecurity authentication service may be based on transaction simulations for both manual and automated authentication processes. The transaction simulation module may perform transaction simulations for a protected function based on the transaction data associated with the function. The cybersecurity authentication service may then use the simulation outputs and validation/verification rules according to the transaction protocol runbook to determine whether the protected function should be authenticated. Although this disclosure describes performing particular transaction simulations in a particular manner, this disclosure contemplates performing any suitable transaction simulation in any suitable manner.

In particular embodiments, the blockchain cybersecurity platform may receive, by a cybersecurity authentication service of the blockchain cybersecurity platform, transaction data associated with a protected first function of a first blockchain transaction protocol associated with a first user and a first blockchain network. The blockchain cybersecurity platform may then access, by the cybersecurity authentication service of the blockchain cybersecurity platform, a transaction protocol runbook associated with the first user and the first blockchain transaction protocol. In particular embodiments, the transaction protocol runbook may comprise one or more preconfigured conditions associated with the protected first function. The blockchain cybersecurity platform may then determine, by the cybersecurity authentication service, that each preconfigured condition is satisfied for the protected first function based at least in part on the received transaction data. In particular embodiments, the blockchain cybersecurity platform may generate, via a blockchain transaction simulation module, one or more transaction simulations for the protected first function based at least in part on the transaction data. Each transaction simulation may indicate one or more predicted outcome states associated with the first blockchain network based on the protected first function being executed based on the received transaction data. In particular embodiments, the blockchain cybersecurity platform may then determine, by the cybersecurity authentication service, that the protected first function should be authenticated based at least in part on one or more of the generated transaction simulations and the determination that each preconfigured condition is satisfied. The blockchain cybersecurity platform may further transmit, by the cybersecurity authentication service, to the first blockchain network, responsive to the determination that the protected first function should be authenticated, a transaction bundle configured to update a second blockchain transaction protocol associated with the blockchain cybersecurity platform and the first blockchain transaction protocol to indicate that the protected first function is authenticated.

Certain technical challenges exist for using transaction simulations for the cybersecurity authentication service. One technical challenge may include generating effective transaction simulations for a protected function. The solution presented by the embodiments disclosed herein to address this challenge may be generating the transaction simulations based on a risk of the function, a sensitivity of the function, a complexity of the function, an importance of the function, a transaction volume of the function, a function type, a blockchain contract type of the smart contract, a preconfigured flag requiring transaction simulations to be generated for the function, or a default authentication protocol configured by the blockchain cybersecurity platform as these different factors may enable the transaction simulations to capture a vast variety of scenarios to be considered by the cybersecurity authentication service.

Certain embodiments disclosed herein may provide one or more technical advantages. A technical advantage of the embodiments may include a comprehensive authentication process as the cybersecurity service may be based on transaction simulations that simulate the transaction execution to prevent any potential security risk for the protected functions. Certain embodiments disclosed herein may provide none, some, or all of the above technical advantages. One or more other technical advantages may be readily apparent to one skilled in the art in view of the figures, descriptions, and claims of the present disclosure.

In particular embodiments, the cybersecurity authentication service may be easy to integrate with the user's contract. The cybersecurity authentication service may be a smart contract native and may be able to be integrated with just a few (e.g., 5) additional lines of code. As an example and not by way of limitation, the code may comprise the proxy address and a modifier. In particular embodiments, the proxy address may be given to a user once a proxy contract (i.e., proxy blockchain transaction protocol) is deployed. With the additional lines of code, no storage modification may be made on the user contract. The additional lines of code may allow the cybersecurity authentication service to be added to any code, no matter the storage layout. Although this disclosure describes particular contract integrations in a particular manner, this disclosure contemplates any suitable contract integration in any suitable manner.

In particular embodiments, the blockchain cybersecurity platform may receive, at a proxy blockchain transaction protocol associated with the blockchain cybersecurity platform and a first blockchain network, based on a persistent address associated with the proxy blockchain transaction protocol, transaction data associated with a protected first function of a first blockchain transaction protocol associated with a first user and the first blockchain network. The proxy blockchain transaction protocol may be configured to redirect the received transaction data to an address associated with a receiving node of the blockchain cybersecurity platform. The blockchain cybersecurity platform may then receive, at the receiving node of the blockchain cybersecurity platform, the redirected transaction data associated with the protected first function. In particular embodiments, the blockchain cybersecurity platform may access, by a cybersecurity authentication service of the blockchain cybersecurity platform, a transaction protocol runbook associated with the first user and the first blockchain transaction protocol. The transaction protocol runbook may comprise one or more preconfigured conditions associated with the protected first function. In particular embodiments, the blockchain cybersecurity platform may then determine, by the cybersecurity authentication service, that the protected first function should be authenticated based on each preconfigured condition associated with the protected first function being satisfied. The blockchain cybersecurity platform may further transmit, by the cybersecurity authentication service, to the first blockchain network, responsive to the determination that the protected first function should be authenticated, a transaction bundle configured to update a second blockchain transaction protocol associated with the blockchain cybersecurity platform and the first blockchain transaction protocol to indicate that the protected first function is authenticated.

Certain technical challenges exist for integrating the cybersecurity authentication service with a user contract. One technical challenge may include efficiency of the integration with the user contract. The solution presented by the embodiments disclosed herein to address this challenge may be using a persistent proxy address as the persistent proxy address may efficiently redirect transactions to the cybersecurity authentication service for authentications and no storage modification may be made on the user contract due to the persistent proxy address.

Certain embodiments disclosed herein may provide one or more technical advantages. A technical advantage of the embodiments may include improved security of integration for user contracts as the proxy blockchain transaction protocol may be associated with administrative privileges on all proxied products associated with the cybersecurity authentication service, conforming to particular security standard, and can only be updated by a cybersecurity authority having a restricted authority classification. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2 illustrates an example front end where a user may use the cybersecurity authentication service.

FIG. 3 illustrates an example user interface showing contracts, functions, and permits.

FIG. 4 illustrates an example user interface for showing the permit detail and permit state.

FIG. 5 illustrates an example user interface showing an approval of a transaction.

FIG. 6 illustrates an example user interface showing a rejection of a transaction.

FIG. 13A illustrates an example dashboard showing an available contract.

FIG. 13B illustrates an example dashboard showing example protected functions associated with a contract.

FIGS. 14A-14E illustrate an example process for checking transactions of functions protected by the cybersecurity authentication service.

FIGS. 16A-16C illustrates an example dashboard for sending a transaction to a function protected by the cybersecurity authentication service.

DESCRIPTION OF EXAMPLE EMBODIMENTS

Figure 1:
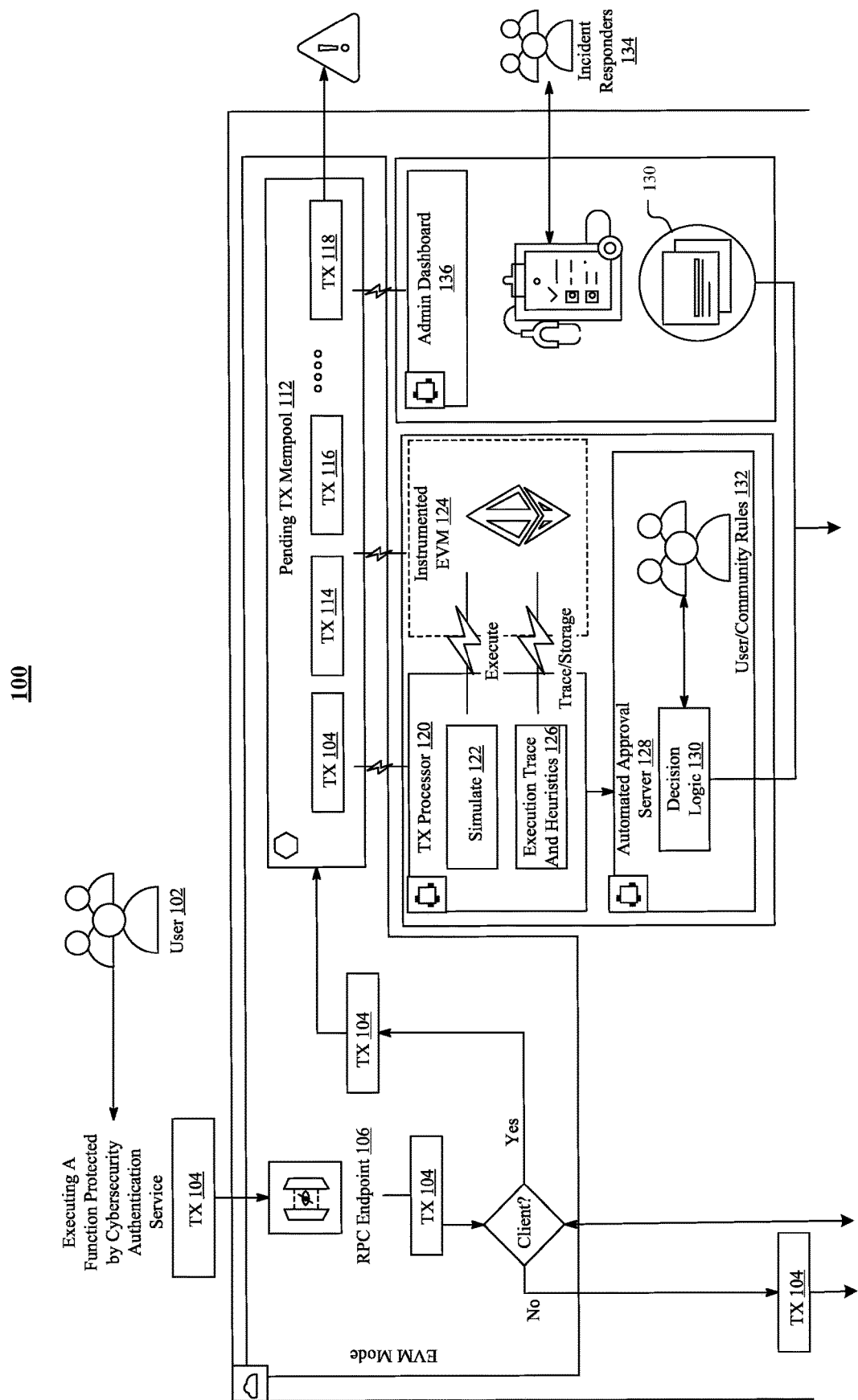
FIG. 1 illustrates an example flow diagram associated with the cybersecurity authentication service.
Figure 1:
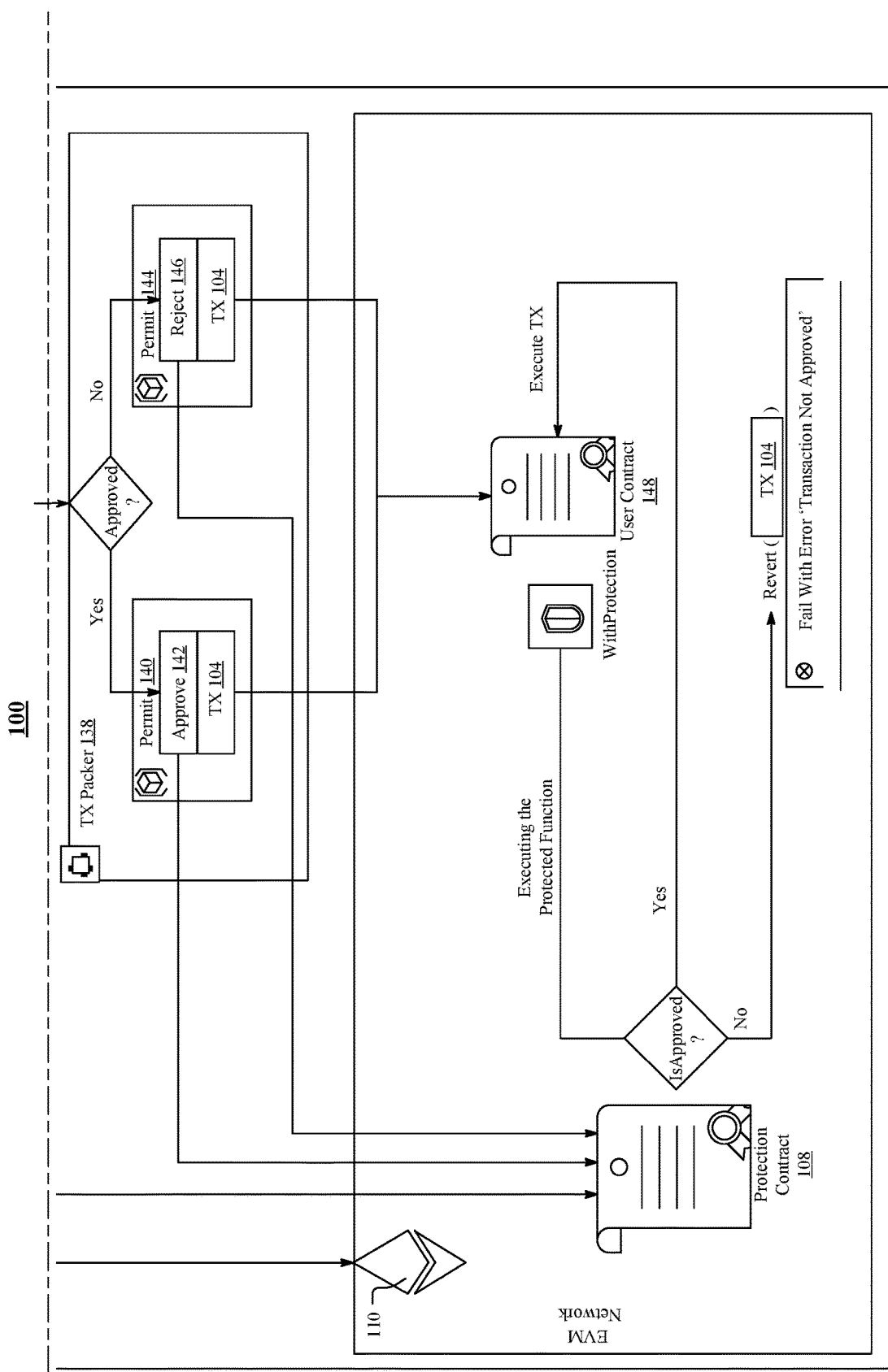

Cybersecurity Authentication Service on Blockchain Cybersecurity Platforms for On-Chain Actions In particular embodiments, a blockchain cybersecurity platform may utilize a cybersecurity authentication service to bridge the gap between decentralized and centralized administration of blockchain transaction protocols (i.e., smart contracts) to protect users (who may be clients of the blockchain cybersecurity platform) and developers of smart contracts on blockchains. The cybersecurity authentication service may be an information security service commissioned to serve an organization (centralized or decentralized) as a third-party witness to the signing of important on-chain actions. In particular embodiments, the cybersecurity authentication service may allow users to protect critical functions for owned smart contracts by registering them into the blockchain cybersecurity platform. Once registered, the cybersecurity authentication service may approve or deny transactions of said functions, in order to prevent misuse or attack against protected contracts and to deter fraud. Examples of important transactions the cybersecurity authentication service may be used to deter fraud for may comprise emergency withdrawal within a particular response time (e.g., less than 10 minutes), contract upgrades within a particular response time (e.g., less than 48 hours), change of ownership within a particular response time (e.g., less than 48 hours), DAO (decentralized autonomous organization)-proposal related payments within a particular response time (e.g., less than 48 hours), vendor payments within a particular response time (e.g., less than 48 hours), and insurance protocol claim payments within a particular response time (e.g., less than 48 hours). Although this disclosure describes securing particular transactions by particular systems in a particular manner, this disclosure contemplates securing any suitable transaction by any suitable system in any suitable manner.

In particular embodiments, the blockchain cybersecurity platform may receive, at a receiving node of the blockchain cybersecurity platform, transaction data associated with a first function of a first blockchain transaction protocol associated with a first user and a first blockchain network. The blockchain cybersecurity platform may then determine that the first function is protected by the blockchain cybersecurity platform based on the transaction data comprising a modifier associated with the blockchain cybersecurity platform. In particular embodiments, the blockchain cybersecurity platform may store, in a mempool of the blockchain cybersecurity platform, the transaction data associated with the protected first function. The blockchain cybersecurity platform may then access, by a cybersecurity authentication service of the blockchain cybersecurity platform, a transaction protocol runbook associated with the first user and the first blockchain transaction protocol. In particular embodiments, the transaction protocol runbook may comprise one or more preconfigured conditions associated with the protected first function. The blockchain cybersecurity platform may further determine, by the cybersecurity authentication service, whether the protected first function should be authenticated by determining, based at least in part on the transaction data, whether each preconfigured condition is satisfied. As used herein, authentication may comprise authentication and approval. In particular embodiments, the blockchain cybersecurity platform may update, if each preconfigured condition associated with the protected first function is satisfied, a second blockchain transaction protocol associated with the blockchain cybersecurity platform and the first blockchain transaction protocol. The second blockchain transaction protocol may be updated to indicate that the protected first function is authenticated.

For centralized finance, developers or owners of blockchain transaction protocols (e.g., smart contracts) may face the problems of reduced user trust, custody risks, and key management loss/theft. For centralized finance, users of blockchain transaction protocols may face the problems of loss of control or ownership, lack of transparency, and risk of a "rug pull" (i.e., a scam). As an example and not by way of limitation, a scenario of a "rug pull" may be that a developer may attract investors to a new cryptocurrency project and then pull out before the project is built, leaving the investors with a worthless currency. For decentralized finance, developers or owners of blockchain transaction protocols may face the problems of loss of control/ownership, malicious governance, and slow reaction time. For decentralized finance, users of blockchain transaction protocols may face the problems of failure in consensus, higher responsibility, and slow reaction time.

To address the aforementioned problems, the embodiments disclosed herein utilize a cybersecurity authentication service on a blockchain cybersecurity platform to provide a layer of security that may be currently missing in blockchain transaction protocols (e.g., smart contracts). The cybersecurity authentication service may protect developers of blockchain transaction protocols by removing the risk of completely revoking contract ownership, providing rapid responses to enable secure operations on blockchain transaction protocols, reducing personal risk that comes with single key custody, and enhancing community/investor confidence in the blockchain platform. The cybersecurity authentication service may protect users of blockchain transaction protocols by removing the risk of centralized administration and liquidity access, providing security oversight to validate operations on blockchain transaction protocols as legitimate, and creating a verifiable source to check that blockchain transaction protocols are secured. As a result, the embodiments disclosed herein may have a technical advantage of enhanced security for smart contracts as the cybersecurity authentication service may determine whether protected functions in a smart contract should be authenticated for corresponding transactions.

In particular embodiments, the cybersecurity authentication service may integrate different elements that conform into an effective and easy-to-use authentication service for on-chain actions. In particular embodiments, the first blockchain transaction protocol may comprise a first on-chain executable smart contract and the second blockchain transaction protocol may comprise a second on-chain executable smart contract. As an example and not by way of limitation, the cybersecurity authentication service may be associated with a protection contract and a user contract. However, users may only need to interact with their own user contracts. In particular embodiments, transactions may be directed to a remote procedural call (RPC) server, which may redirect them accordingly. If a transaction interacts with a function protected by the cybersecurity authentication service, an alerting and notification system may be triggered to let the cybersecurity authentication service know that a protected function was called. After that, the transaction may be passed to one or more servers associated with a blockchain cybersecurity platform, where it may be either manually approved/rejected by an incident response team or automatically approved/rejected according to a transaction protocol runbook. In particular embodiments, the cybersecurity authentication service may be generic to different blockchain networks without changes or with minimum changes to its implementations.

FIG. 1 illustrates an example flow diagram 100 associated with the cybersecurity authentication service. A user 102 who owns a smart contract may submit a transaction (TX) 104 executing a function (e.g., withdraw) protected by the cybersecurity authentication service. In particular embodiments, the receiving node may comprise an endpoint based on a remote procedure call (RPC). The transaction 104 may be directed to an RPC server via an RPC endpoint 106. In particular embodiments, the user 102 may configure the RPC endpoint 106. In other words, the address associated with the receiving node may be configurable by the blockchain cybersecurity platform. The current address of the RPC endpoint 106 may depend on the network used. This address may be configured in the user's 106 wallet of choice or the code or program which interacts with the blockchain. Then the user 106 may interact with the cybersecurity authentication service transparently. The user may add the RPC server to a software cryptocurrency wallet. As an example and not by way of limitation, the software cryptocurrency wallet may be available as a browser extension and as a mobile app. In particular embodiments, configuring the RPC server on the software cryptocurrency wallet may be as follows. First, the user 106 may go to their networks to add a blockchain network. The user 102 may then specify the RPC address as the new RPC URL. The user 106 may then specify the chain identifier. The user 102 may further specify other necessary information accordingly. At last, the user 102 may save these configurations.

In particular embodiments, the RPC server may then check the transaction 104 against the protection contract 108 (i.e., the second blockchain transaction protocol), as illustrated in FIG. 1 (continued), to determine if the user 102 is a client of the cybersecurity authentication service. If the user 102 is not a client, the transaction 104 may be directed to an Ethereum virtual machine (EVM) 110 in the EVM network, as illustrated in FIG. 1 (continued). If the user 102 is a client, the transaction 104 may be put into a pending transaction mempool 112 (i.e., an organized queue where transactions are stored and sorted before being added to a newly created block). The pending transaction mempool 112 may store other transactions, e.g., transaction 114, transaction 116, and transaction 118. The pending transaction mempool 112 may act like a cache, where the transactions are waiting to be authenticated and approved/rejected. The transactions (e.g., transaction 104) may be then directed to a transaction processor 120. The transaction processor 120 may simulate 122 the transaction 104 by executing it using instrumented EVM 124. The transaction processor 120 may additionally use execution trace and heuristics 126 for trace/storage via the instrumented EVM 124.

In particular embodiments, the results from the transaction processor 120 may be further directed to an automated approval server 128. The automated approval server 128 may use decision logic 130 generated from user/community rules 132 to automatically determine whether to approve or reject the transaction 104. In particular embodiments, the decision logic 130 may be coded into the smart contract.

In particular embodiments, the pending transaction mempool 112 may alert incident responders 134. The incident responders 134 may access an admin dashboard 136 to determine, based on the decision logic 130, whether to approve or reject the transaction 104.

Continuing to FIG. 1 (continued), the determination from both the automated approval server 128 and the admin dashboard 136 may be directed to a transaction packer 138. If the transaction 104 is approved, a permit 140 may sign an approve state 142 to the transaction 104. The approve state 142 may indicate that the transaction 104 with its transaction data is approved by the cybersecurity authentication service. The approved/signed transaction 142 may be further sent to the protection contract 108 to update it. If the transaction 104 is rejected, another permit 144 may sign a reject state 146 to the transaction 104. After that, only the original transaction 104 may be sent to the user contract 148, which may have the default setting of rejecting transactions if it does not see an approval update. In other words, a default state in the second blockchain transaction protocol for all protected functions may be that each protected function should be rejected. The transaction 104 may then go to the user contract 148 (i.e., the first blockchain transaction protocol). If the user contract 148 is with protection by the cybersecurity authentication service, the function associated with the transaction 104 may be checked against the protection contract 108 to see if it is approved. If the transaction 104 for the function is approved, an on-chain action may be executing the transaction 104 according to the user contract 148. If the transaction 104 for the function is not approved, an on-chain action may be reverting the transaction 104. As an example and not by way of limitation, the transaction 104 may fail with an error message: transaction not approved.

In particular embodiments, execution of the protected first function may be associated with one or more second functions associated with the first blockchain network. One or more of the second functions may be protected by the blockchain cybersecurity platform. In particular embodiments, determining that the protected first function should be authenticated may comprise determining that the one or more protected second functions should be authenticated. In particular embodiments, one or more of the second functions may be associated with one or more second blockchain transaction protocols.

FIG. 2 illustrates an example front end 200 where a user may use the cybersecurity authentication service. In particular embodiments, the user may interact with a dashboard 210 in order to use the different capabilities of the cybersecurity authentication service (no command line or code needed). As an example and not by way of limitation, the user may see different projects 220 and latest permits 230. The user may search for a project by name, token name, or contract address.

FIG. 3 illustrates an example user interface 300 showing contracts, functions, and permits. As an example and not by way of limitation, the contracts 310, functions 320, and permits 330 may be shown after the user selects DEMOCLIENT>TESTCONTRACT>EMERGENCY WITHDRAW( ). The user interface 300 may additionally show the permit detail 340 and permit state 350.

FIG. 4 illustrates an example user interface 400 for showing the permit detail 410 and permit state 420. As an example and not by way of limitation, the permit detail 410 may be shown after the user selects a particular permit (e.g., "Permit ID 13").

In particular embodiments, the decisions of the cybersecurity authentication service may comprise "approve" and "reject". FIG. 5 illustrates an example user interface 500 showing an approval of a transaction. The user interface 500 may show the transactions details 510, which may include overview 520, internal transactions 530, and state 540. FIG. 6 illustrates an example user interface 600 showing a rejection of a transaction. The user interface 600 may show the transaction details 610, which may include overview 620, internal transactions 630, and state 640.

In particular embodiments, in transaction exchanges protected by the cybersecurity authentication service, there may be several entities that interact with each other. As an example and not by way of limitation, these entities may include the entities listed in Table 1. As can be seen, there may be a transaction simulation module, which may be associated with the blockchain cybersecurity platform. In particular embodiments, the blockchain transaction simulation module may be based at least in part on one or more machine-learning models configured to determine whether the protected first function should be authenticated based on one or more risk metrics associated with the protected first function and one or more predetermined thresholds associated with the one or more risk metrics, respectively.

TABLE 1

A list of entities that interact with each other in transaction exchanges protected by the cybersecurity authentication service.

| Entity | Description |
| --- | --- |
| User/Client | The entity that interacts directly with the smart contract protected by the cybersecurity authentication service |
| RPC (Remote Procedure Call) Server (lambda) | Lambda that acts as the server to which all transactions are directed |
| Analyzer message queuing service | Where the transactions wait to be processed |
| Analyzer (lambda) | Lambda triggered if the transaction is Type I |
| Transaction simulation module | Simulates the transaction execution |
| No-SQL database | Database of transactions protected by cybersecurity authentication service |
| Provider | Blockchain provider |

In particular embodiments, the cybersecurity authentication service may be based on transaction simulations for both manual and automated authentication processes. The transaction simulation module may perform transaction simulations for a protected function based on the transaction data associated with the function. The cybersecurity authentication service may then use the simulation outputs and validation/verification rules according to the transaction protocol runbook to determine whether the protected function should be authenticated. Although this disclosure describes performing particular transaction simulations in a particular manner, this disclosure contemplates performing any suitable transaction simulation in any suitable manner.

In particular embodiments, the blockchain cybersecurity platform may receive, by a cybersecurity authentication service of the blockchain cybersecurity platform, transaction data associated with a protected first function of a first blockchain transaction protocol associated with a first user and a first blockchain network. The blockchain cybersecurity platform may then access, by the cybersecurity authentication service of the blockchain cybersecurity platform, a transaction protocol runbook associated with the first user and the first blockchain transaction protocol. In particular embodiments, the transaction protocol runbook may comprise one or more preconfigured conditions associated with the protected first function. The blockchain cybersecurity platform may then determine, by the cybersecurity authentication service, that each preconfigured condition is satisfied for the protected first function based at least in part on the received transaction data. In particular embodiments, the blockchain cybersecurity platform may generate, via a blockchain transaction simulation module, one or more transaction simulations for the protected first function based at least in part on the transaction data. Each transaction simulation may indicate one or more predicted outcome states associated with the first blockchain network based on the protected first function being executed based on the received transaction data. In particular embodiments, the blockchain cybersecurity platform may then determine, by the cybersecurity authentication service, that the protected first function should be authenticated based at least in part on one or more of the generated transaction simulations and the determination that each preconfigured condition is satisfied. The blockchain cybersecurity platform may further transmit, by the cybersecurity authentication service, to the first blockchain network, responsive to the determination that the protected first function should be authenticated, a transaction bundle configured to update a second blockchain transaction protocol associated with the blockchain cybersecurity platform and the first blockchain transaction protocol to indicate that the protected first function is authenticated.

In particular embodiments, the one or more transaction simulations may be generated via the blockchain transaction simulation module in response to a request to generate the one or more transaction simulations received via a cybersecurity authentication interface. The transaction simulations for the protected first function may be generated based at least in part on one or more factors comprising one or more of a risk metric associated with the protected first function, a sensitivity metric associated with the protected first function, a complexity metric associated with the protected first function, an importance metric associated with the protected first function, a transaction volume associated with the protected first function, a function type associated with the protected first function, a blockchain transaction protocol type associated with the first blockchain transaction protocol, a preconfigured flag requiring transaction simulations to be generated for the protected first function, or a default authentication protocol configured by the blockchain cybersecurity platform. Generating the transaction simulations based on a risk of the function, a sensitivity of the function, a complexity of the function, an importance of the function, a transaction volume of the function, a function type, a blockchain contract type of the smart contract, a preconfigured flag requiring transaction simulations to be generated for the function, or a default authentication protocol configured by the blockchain cybersecurity platform may be an effective solution for addressing the technical challenge of generating effective transaction simulations for a protected function, as these different factors may enable the transaction simulations to capture a vast variety of scenarios to be considered by the cybersecurity authentication service.

In particular embodiments, execution of the protected first function may be associated with one or more second functions associated with the first blockchain network. One or more of the transaction simulations may further indicate one or more predicted outcome states for the one or more second functions based on the protected first function being executed. As discussed above, the embodiments disclosed herein may have a technical advantage of a comprehensive authentication process as the cybersecurity service may be based on transactions simulations that simulate the transaction execution to prevent any potential security risk for the protected functions.

When calling a function protected by the cybersecurity authentication service, the blockchain cybersecurity platform may act differently depending on the type of transaction sent by the user. According to the responses, transactions may be divided in the following groups or types: transactions that modify the blockchain state (Type I), calls and gas estimations (Type II), transaction retrievals (Type III), and rest of the transactions (Type IV).

Transactions that modify the blockchain state (Type I) may be those that will modify the state of a contract or an account by the interaction with the blockchain. These types of transactions may call either a "send-transaction" RPC method or a "send-raw-transaction" RPC method on the RPC server (lambda). As the state changes after interacting with the contract by means of the execution of the protected function, they may be processed and approved. In particular embodiments, the transaction life cycle may be as follows. First, the user may send the transaction to the RPC server (lambda). The RPC server (lambda) may then identify the "send-transaction" or "send-raw-transaction" RPC method on the transaction. The RPC server (lambda) may then add the transaction to the analyzer message queuing service to be processed, calculate the matching transaction hash and send it to the user. The analyzer (lambda) may be then triggered to process the transaction. In particular embodiments, two or more possibilities may be presented with the analyzer. As an example and not by way of limitation, one possibility may be that the transaction interacts with a function protected by the cybersecurity authentication service. The appropriate action in response may be executed by the blockchain cybersecurity platform and the original transaction may be sent to the provider and executed. As another example and not by way of limitation, another possibility may be that the transaction does not interact with a function protected by the cybersecurity authentication service. The original transaction may be sent to the provider and executed. The blockchain cybersecurity platform may further indicate that the original transaction has been processed.

Calls and gas estimations (Type II) may be a type of transactions that, while they do interact with the protected function, they are not recorded on the blockchain. Therefore, there may be no change in the state. This type of transactions may use the "call" and "estimate-gas" RPC methods on the RPC server (lambda), which may execute the function call without introducing any changes. The "call" RPC method may be aimed to obtain some kind of return value, and the "estimate-gas" RPC method may be used to determine how much a transaction may cost (in gas) before committing it to the blockchain. In particular embodiments, the life cycle for such transaction may be as follows. First, the user may make the request to the RPC server (lambda). The RPC server (lambda) may then identify that the transaction contains either a "call" or "estimate-gas" RPC method. The RPC server (lambda) may then send the transaction. If it is a "call" RPC method, the RPC server (lambda) may modify the request changing the storage of the cybersecurity authentication service to bypass the response of the cybersecurity authentication service and the transaction may be sent to the provider. If it is an "estimate-gas" RPC method, the RPC server (lambda) may send the transaction to the transaction simulation module. The transaction may be then executed. The result of the requested execution may be then returned to the user. In particular embodiments, the transaction simulation module may be built based on traces for historical transactions or simulated transactions enabled by blockchain providers. The blockchain cybersecurity platform may get all the different traces for various transactions and build the transaction simulation module accordingly.

Transaction retrievals (Type III) may be aimed to retrieve information of transactions. In particular embodiments, it may be necessary to ask the blockchain network to provide its hash to retrieve transaction information. To do so, a "get-transaction-by-hash" RPC method may be used. When interacting with the cybersecurity authentication service, in order to retrieve a transaction, the following may occur. First, the user may make the request to the RPC server (lambda). The RPC server (lambda) may then identify that the transaction contains the "get-transaction-by-hash" RPC method. The RPC server (lambda) may then retrieve the transaction from the no-SQL database. If the transaction is not in the no-SQL database, the transaction may be forwarded to the provider. If the transaction is in the no-SQL database, the transaction information may be retrieved. The response may be further sent to the user.

The rest of the transactions (Type IV) may include those that can use a wide range of different RPC methods (e.g., RPC API). If they do not correspond with the type of transactions included in transactions that modify the blockchain state (Type I), transaction retrievals (Type II), or calls and gas estimations (Type III), they may belong to this group. The life cycle of the Type VI transaction may be as follows. First, the user may make the request to the RPC server (lambda). The RPC server (lambda) may then forward the transaction to the provider to be executed. The provider may then execute the transaction. The result of the execution may be further transmitted to the user.

Figure 7:
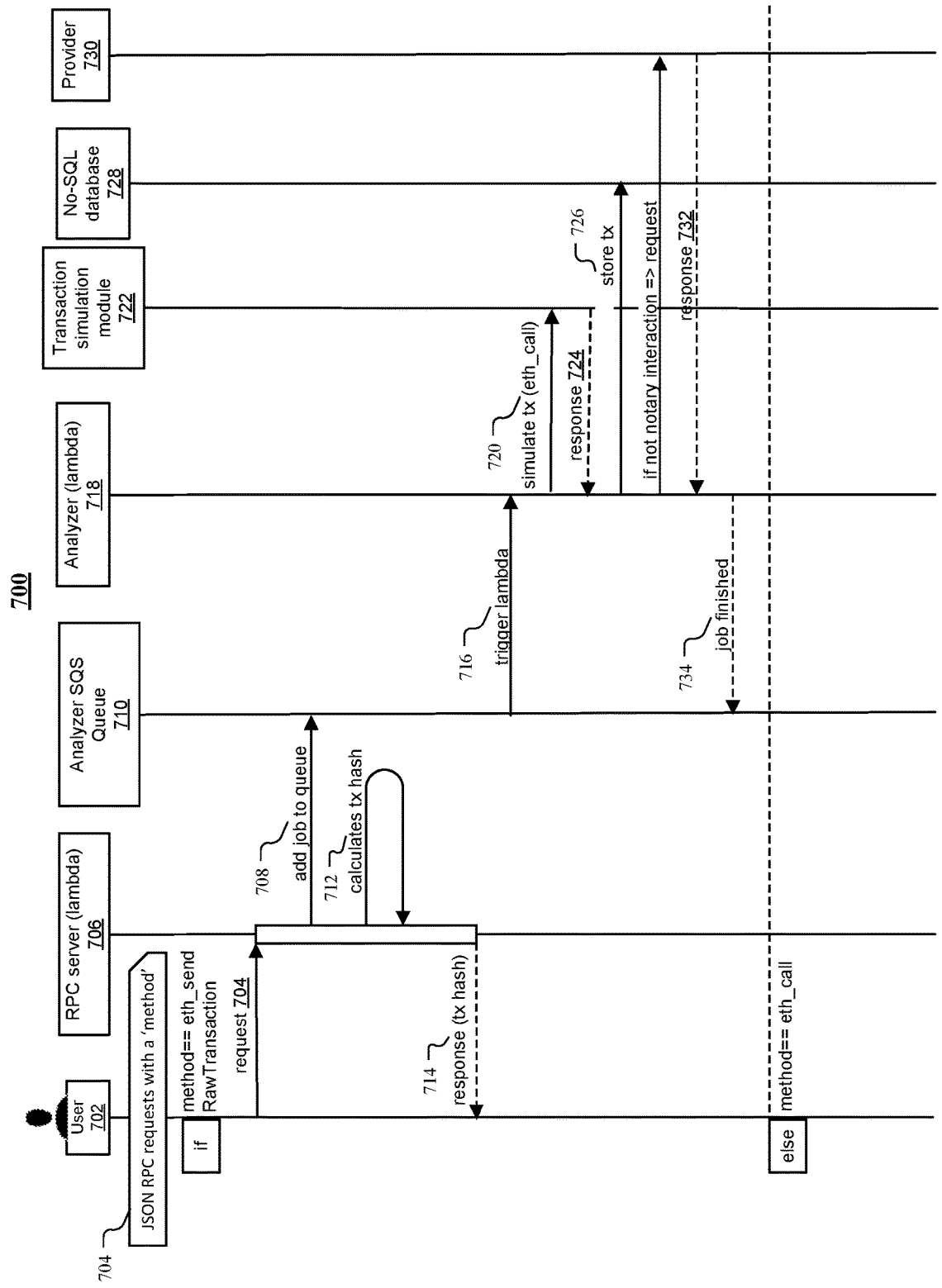
FIG. 7 illustrates an example sequence diagram for different types of transactions.
Figure 7:
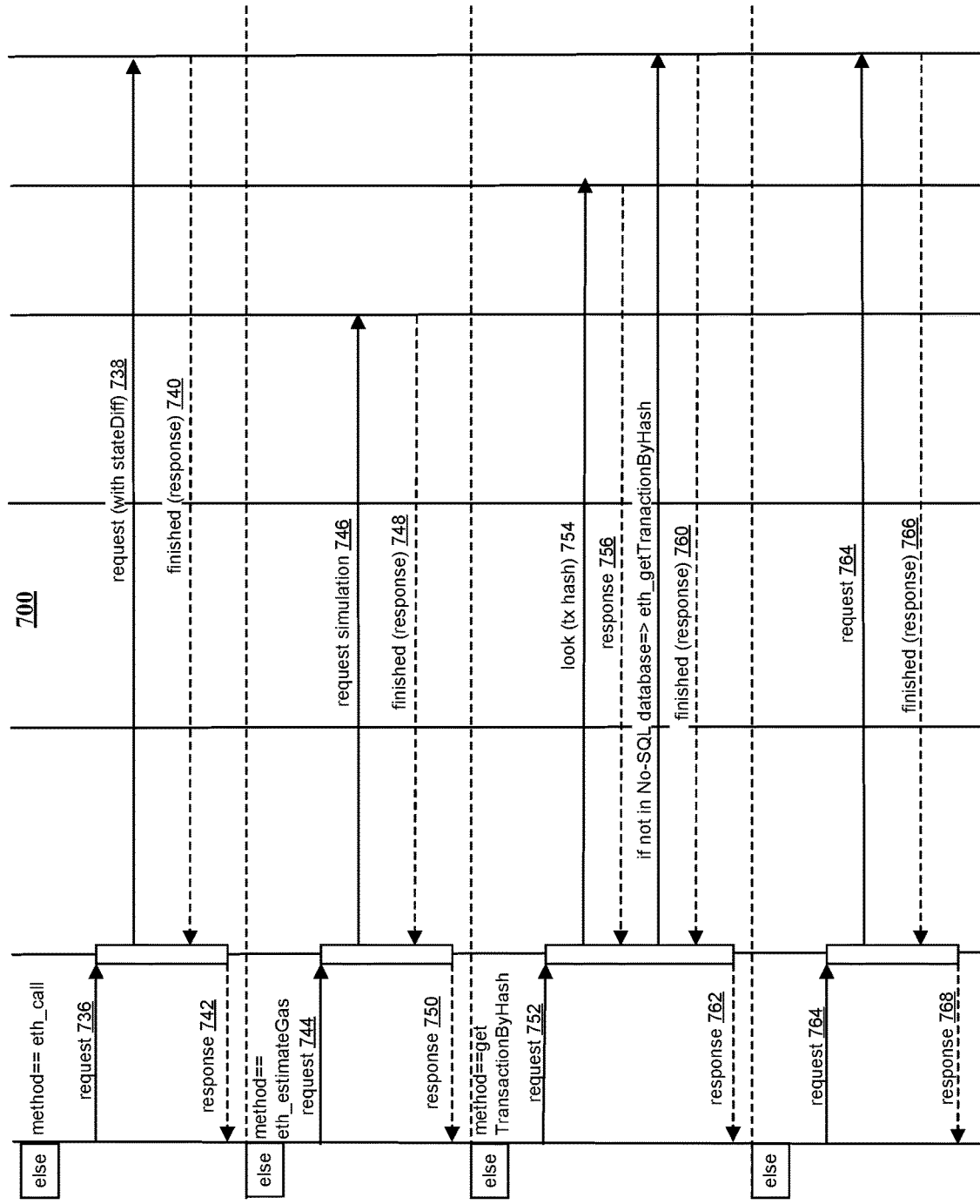

FIG. 7 illustrates an example sequence diagram 700 for different types of transactions. In particular embodiments, to use the cybersecurity authentication service, all user transactions may be redirected to the RPC server (lambda). The RPC server (lambda) may identify a transaction according to the method it calls and send it either directly to the blockchain provider, or to the analyzer message queuing service associated with the cybersecurity authentication service. As illustrated in FIG. 7, a user 702 may send JSON RPC requests with a 'method' 704. If the method is "eth_sendRawTransaction", a request 704 may be directed to the RPC server (lambda) 706. The RPC server (lambda) 706 may then add a job to the queue 708 with respect to the analyzer SQS queue 710. The RPC server (lambda) 706 may also calculate a transaction hash 712. The response with the transaction hash 714 may be returned to the user 702. The analyzer SQS queue 710 may then trigger lambda 716. In particular embodiments, the analyzer (lambda) 718 may simulate the transaction 720 with the function "eth_call". Optionally, the transaction simulation module 722 may return a response 724 to the analyzer (lambda) 718. In particular embodiments, the analyzer (lambda) 718 may store the transaction 726 in a no-SQL database 728. If it is not an interaction with the cybersecurity authentication service, the analyzer (lambda) 718 may send the request to a blockchain provider 730. Alternatively, if it interacts with the cybersecurity authentication service, the analyzer (lambda) 718 may send the request to the blockchain provider 730 after the appropriate action in response is executed by the blockchain cybersecurity platform (note that the action in response process is not shown in FIG. 7). Optionally, the provider 730 may return a response 732 to the analyzer (lambda) 718. The analyzer (lambda) 718 may further notify the analyzer SQS queue 710 that the job is finished 734.

Referring now to FIG. 7 (continued), else if the method is "eth_call", a request 736 may be directed to the RPC server (lambda) 706. The RPC server (lambda) 706 may send the request with state difference 738 to the provider 730. Optionally, the provider 730 may return a finished response 740 to the RPC server (lambda) 706. Optionally, the RPC server (lambda) 706 may return a response 742 to the user 702.

Else if the method is "eth_estimateGas", a request 744 may be directed to the RPC server (lambda) 706. The RPC server (lambda) 706 may request simulation 746 from the transaction simulation module 722. Optionally, the transaction simulation module 722 may return a finished response 748 to the RPC server (lambda) 706. Optionally, the RPC server (lambda) 706 may return a response 750 to the user 702.

Else if the method is "getTransactionByHash", a request 752 may be directed to the RPC server (lambda) 706. The RPC server (lambda) 706 may identify the transaction hash 754 from the no-SQL database 728. Optionally, the no-SQL database 728 may return a response 756 to the RPC server (lambda) 706. If it is not in the no-SQL database 728, the RPC server (lambda) 706 may use the "eth_getTransactionByHash" to check with the provider 730. Optionally, the provider 730 may return a finished response 760 to the RPC server (lambda) 706. Optionally, the RPC server (lambda) 706 may return a response 762 to the user 702.

Else for all other methods, a request 764 may be directed to the RPC server (lambda) 706. The RPC server (lambda) 706 may direct the request 764 to the provider 730. Optionally, the provider 730 may return a finished response 766 to the RPC server (lambda) 706. Optionally, the RPC server (lambda) 706 may return a response 768 to the user 702.

Table 2 is a summary table identifying the transaction types, methods, and actions for the transaction schema illustrated in FIG. 7. As discussed above, the embodiments disclosed herein may have a technical advantage of a transactional level authentication as the cybersecurity authentication service may review protected functions at a transaction-by-transaction basis, making it a preventative solution for smart contracts.

TABLE 2

Summary table of transaction types.

| Type | Methods | Actions |
|------|---------|---------|
| Type I | send-transaction<br>send-raw-transaction | Execute response of cybersecurity authentication service |
| Type II | call<br>estimate-gas | Bypass response of cybersecurity authentication service |
| Type III | get-transaction-by-hash | Check no-SQL database and, if necessary, forward to provider |
| Type IV | rest of the methods | Forwarded directly to provider |

In particular embodiments, the blockchain cybersecurity platform may use one or more servers for the cybersecurity authentication service. When a transaction comprising a protected function is submitted, it may be reviewed and approved/rejected by the servers. In particular embodiments, the cybersecurity authentication service may be based on different kinds of authentication methods, e.g., manual authentication and automatic authentication.

In particular embodiments, the cybersecurity authentication service may be based on a manual authentication process. The manual authentication process may incorporate runbook rule structure pertaining to the tiers (i.e., authority classifications) of functions and cybersecurity authorities. In the manual authentication process, an incident response team may personally review and approve/reject a transaction according to the user requirements. The incident response team may monitor the cybersecurity authentication service at all times and respond to alerts as soon as possible or within a previously agreed time. Although this disclosure describes particular manual authentication processes in a particular manner, this disclosure contemplates any suitable manual authentication process in any suitable manner.

In particular embodiments, the blockchain cybersecurity platform may receive, by a cybersecurity authentication service of the blockchain cybersecurity platform, transaction data associated with a protected first function of a first blockchain transaction protocol associated with a first user and a first blockchain network. The blockchain cybersecurity platform may then assign, by the cybersecurity authentication service, a first authority classification of a plurality of authority classifications to the protected first function. In particular embodiments, the first authority classification may be assigned based at least in part on a transaction protocol runbook associated with the first user and the protected first function. The transaction protocol runbook may comprise one or more preconfigured conditions associated with the protected first function. In particular embodiments, the blockchain cybersecurity platform may then access, by a first cybersecurity authority of a plurality of cybersecurity authorities associated with the cybersecurity authentication service, via a cybersecurity authentication interface, the transaction data associated with the protected first function and the transaction protocol runbook. The first cybersecurity authority may have an authority classification corresponding to the first authority classification. The blockchain cybersecurity platform may then determine, by the first cybersecurity authority, that the protected first function should be authenticated based on each preconfigured condition associated with the protected first function being satisfied. In particular embodiments, the blockchain cybersecurity platform may input, by the first cybersecurity authority, via the cybersecurity authentication interface, an authentication of the protected first function. The blockchain cybersecurity platform may further transmit, by the cybersecurity authentication service, to the first blockchain network, responsive to the authentication of the protected first function, a transaction bundle configured to update a second blockchain transaction protocol associated with the blockchain cybersecurity platform and the first blockchain transaction protocol to indicate that the protected first function is authenticated.

In particular embodiments, the authority classifications of protected functions may be classified according to the funds involved and the impact on the operation of a project. As disclosed herein, a project may refer to any user, entity, or system that creates a smart contract covered by the cybersecurity authentication service. The following describes some example authority classifications. A first authority classification may include critical functions comprising all the functions that when called, cause a movement of funds in the project (e.g., emergency withdraw). A second authority classification may include priority functions comprising all the functions that, although they do not cause a movement of funds, do have a direct impact on the operation of the project (e.g., ownership changes, pause the contract, upgrade the contract, etc.). A third authority classification may include regular functions comprising all the functions that, without causing a movement of funds or having a direct impact on the operation of the project, carry out some type of change, and for this reason, are protected by the cybersecurity authentication service (e.g., add an account to the whitelist, threshold changes, etc.).

According to the authority classifications of functions, decisions may be taken by different cybersecurity authorities associated with the incident response team. As an example and not by way of limitation, cybersecurity authorities may include higher authority, authorized authority (e.g., two or more officers on watch in different time zones covering a particular time period, e.g., 24 hours), and basic authority (e.g., someone responsible and with enough knowledge for authorizing type 3 functions). In general, higher authority may take decisions in functions of the first authority classification, authorized authority may take decisions in functions of the second authority classification, and basic authority may take decisions in functions of the third authority classification. However, a basic authority may need the approval of the authorized authority and an authorized authority may need the approval of the higher authority.

In particular embodiments, there may be runbook metadata associated with the protected functions. As an example and not by way of limitation, the metadata associated with an NFT smart contract may comprise priority. For example, the priority may be 3, meaning to approve if the NFT-metadata is well formed or non-offensive. The NFT-metadata may follow an objective metadata format standard (e.g., per ERC-721). The runbook metadata may additionally comprise reasons that a function would need to be called, possible NFT-metadata changes that would need to be made, who should request, who should approve, whether the user would notify the cybersecurity authentication service ahead of function call and identify the metadata parameters to be changed, etc. As another example and not by way of limitation, the runbook metadata associated with the burn NFT function may comprise priority. For example, the priority may be 1, which is a higher authority. The runbook-metadata associated with the burn NFT function may additionally indicate that there are no standard times or it belongs to one or more whitelists. As another example, the metadata associated with the burn NFT function may indicate it is not whitelisted, which assumes one burn address, requires authorities to be notified, has secondary confirmation (e.g., via email), and has lost keys access (e.g., a password or a multi-factor authentication). As another example and not by way of limitation, the metadata associated with the transfer NFT function may comprise priority. For example, the priority may be 1, indicating it may be escalated to an authorized authority. The metadata may also indicate it requires a notification via a communication channel, specify an attack or a key compromise, and identify a particular security standard (e.g., OpenZeppelin) to be used. As yet another example and not by way of limitation, the runbook metadata associated with the transfer ownership function may comprise priority. For example, the priority may be 2, indicating it may be escalated to a higher-level cybersecurity authority.

In particular embodiments, responsive to receiving the transaction data associated with a first function, a first authority classification of a plurality of authority classifications may be assigned by the cybersecurity authentication service to the protected first function. The first authority classification may be assigned based at least in part on the transaction protocol runbook. In particular embodiments, the first authority classification for the protected first function may be assigned based at least in part on one or more factors comprising one or more of a risk metric associated with the protected first function, a sensitivity metric associated with the protected first function, a complexity metric associated with the protected first function, an importance metric associated with the protected first function, a transaction volume associated with the protected first function, a function type associated with the protected first function, a blockchain transaction protocol type associated with the first blockchain transaction protocol, a preconfigured flag requiring authentication by a cybersecurity authority associated with the cybersecurity authentication service, a preconfigured flag permitting authentication by an automated decisional logic module, a customized classification configuration configured by one or more entities associated with the first blockchain transaction protocol, or a default classification configured by the blockchain cybersecurity platform. As an example and not by way of limitation, the blockchain transaction protocol type may be a blockchain bridge contract. In particular embodiments, one or more of the factors may be based at least in part on the transaction protocol runbook. Determining the authority classification based on the transaction protocol runbook and different factors such as risk, sensitivity, complexity, etc. may be an effective solution for addressing the technical challenge of determining the authority classification for a protected function as the protected function may be evaluated comprehensively based on these factors using the transaction protocol runbook.

In particular embodiments, the determination of whether the protected first function should be authenticated may be determined by a first cybersecurity authority of a plurality of cybersecurity authorities associated with the cybersecurity authentication service. The first cybersecurity authority may have an authority classification corresponding to the first authority classification. In particular embodiments, the blockchain cybersecurity platform may determine that one or more of the preconfigured conditions associated with the protected first function are not satisfied. The blockchain cybersecurity platform may further generate an incident report configured for a first cybersecurity authority associated with the cybersecurity authentication service.

In particular embodiments, the cybersecurity authentication service may be based on a tiered approval process. Determining whether the protected first function should be authenticated may be further based on an escalation to a second cybersecurity authority of the plurality of cybersecurity authorities to determine whether the protected first function should be authenticated. In particular embodiments, a first cybersecurity authority may determine that the protected first function requires an escalation to a second cybersecurity authority of the plurality of cybersecurity authorities. The second cybersecurity authority may have an authority classification greater than the first authority classification. In alternative embodiments, the escalation to the first cybersecurity authority may be based on the automated decisional logic module making one or more determinations based on one or more factors comprising one or more of the preconfigured conditions not being satisfied, the preconfigured conditions being insufficient to determine whether the protected first function should be authenticated, or one or more transaction simulations generated for the protected first function based on the transaction data. As a result, the embodiments disclosed herein may have a technical advantage of further improved security of a protected function as the cybersecurity authentication service may be based on a tiered approval process where an escalation to a higher-level cybersecurity authority may be triggered when necessary to guarantee a secured and correct authentication for the function.

In particular embodiments, the escalation to the second cybersecurity authority may be based at least in part on one or more factors comprising one or more of a risk metric associated with the protected first function, a sensitivity metric associated with the protected first function, a complexity metric associated with the protected first function, an importance metric associated with the protected first function, a transaction volume associated with the protected first function, a function type associated with the protected first function, a blockchain transaction protocol type associated with the first blockchain transaction protocol, a preconfigured flag requiring escalation to a second cybersecurity authority associated with the cybersecurity authentication service, a customized escalation protocol configured by one or more entities associated with the first blockchain transaction protocol, or a default escalation protocol configured by the blockchain cybersecurity platform. Take the change metadata function as an example. This function may be not high risk, which may be assigned as a first level for authentication. If a function is high risk, a second-level authentication, e.g., more privileged authority level authentication, may be required. If a function is critical such as withdrawals or transfers, the authentication may be escalated to the top level. The tiered authentication process may be on a function-per-function basis. In particular embodiments, the tiered authentication process may be specified per function during the creation of the transaction protocol runbook. In particular embodiments, the tier level for each function may change.

Figure 8:
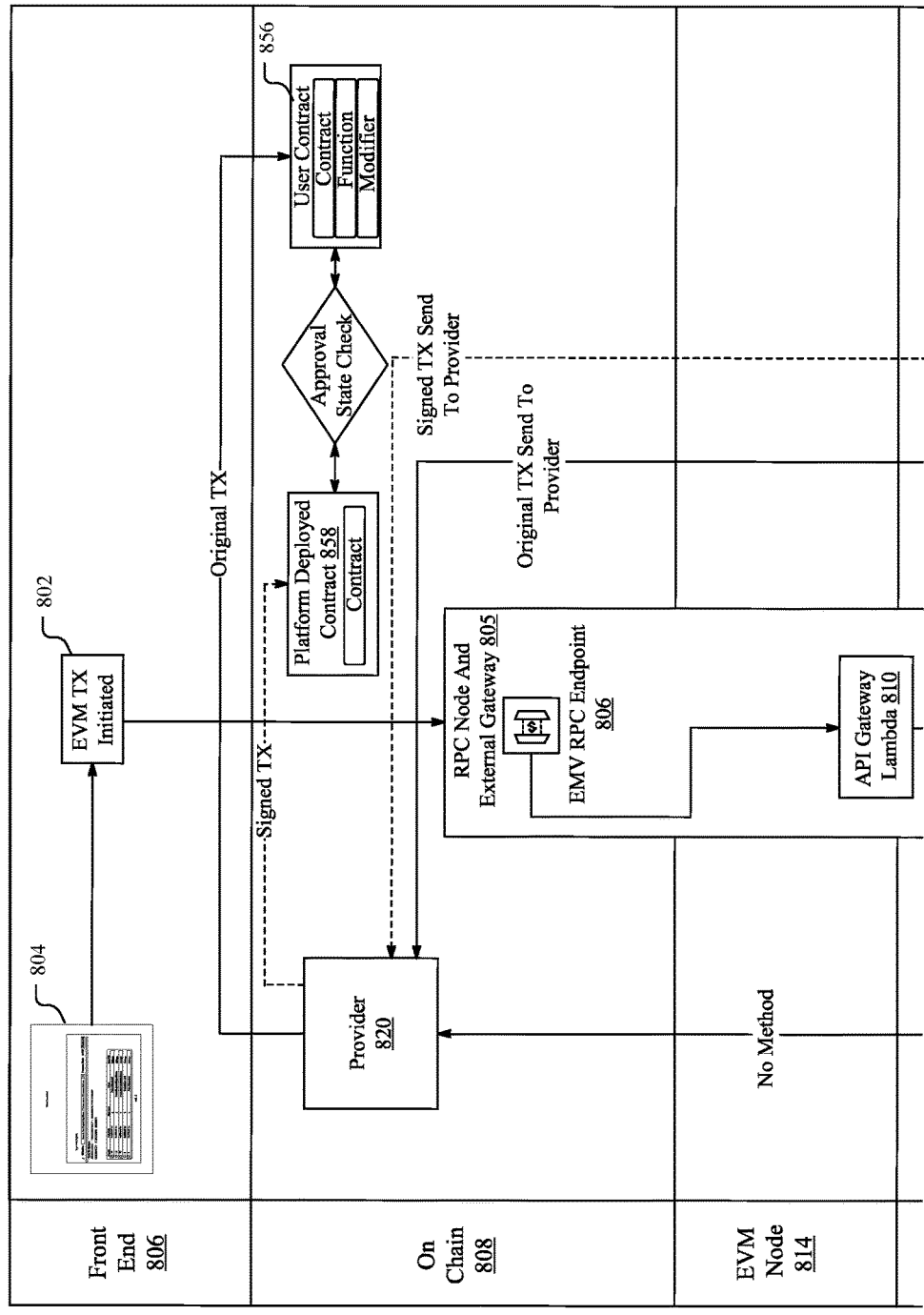
FIG. 8 illustrates an example architecture of the manual authentication process.
Figure 8:
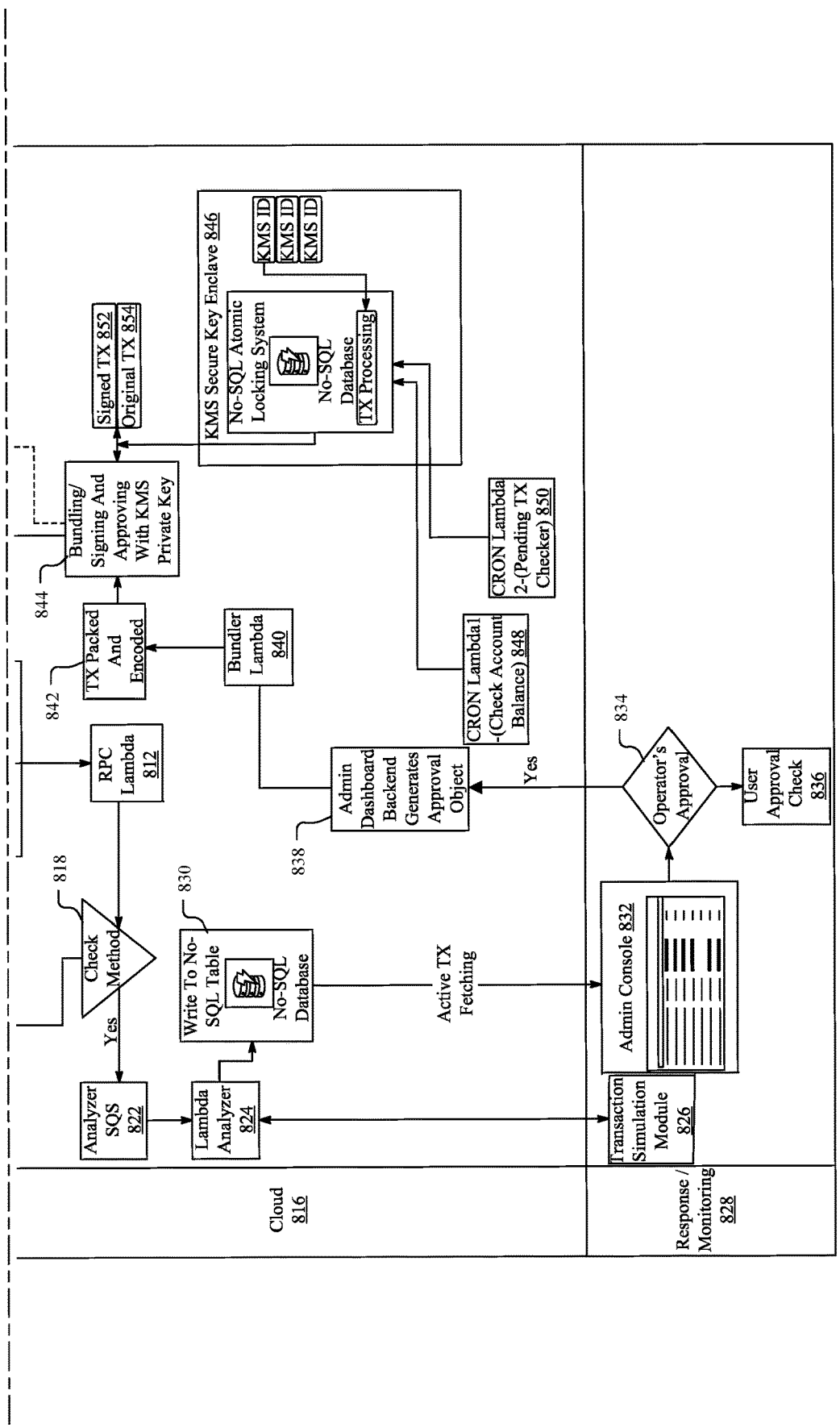

FIG. 8 illustrates an example architecture 800 of the manual authentication process. In particular embodiments, the manual authentication process may be the following. At step 802, the EVM transaction may be initiated, but not in exclusivity, from a dashboard 804 in the frontend 806 by the user. As an example and not by way of limitation, alternatively the EVM transaction may be initiated by Etherscan or any other type of blockchain interaction as long as it is connected to the RPC node. The initiated transaction may be directed to an RPC node and external gateway 805, specifically an EVM RPC endpoint 806, which may be on or connected to chain 808. The transaction may be further directed from the EVM RPC endpoint 806 via an API gateway lambda 810 to the RPC server (lambda) 812, as illustrated in FIG. 8 (continued). The API gateway lambda 810 may be associated with the EVM node 814.

Now referring to FIG. 8 (continued), on the cloud 816, the RPC server (lambda) 812 may check the transaction and act accordingly. At step 818, the RPC server (lambda) 812 may check the method called by the transaction. If there is no method, the transaction may be directed to the provider 820 on or connected to chain 808. If the method is a protected function, the transaction may be directed to the analyzer SQS 822. The analyzer SQS 822 may direct the transaction to the lambda analyzer 824. The lambda analyzer 824 may communicate with the transaction simulation module 826, which may be part of the response/monitoring 828. The simulation results may be returned to the lambda analyzer 824. At step 830, the lambda analyzer 824 may write the transaction to a no-SQL table of the no-SQL database. An admin console 832, which is part of the response/monitoring 828, may then perform active transaction fetching from the no-SQL database.

At step 834, it may be determined whether there is an operator's approval. In particular embodiments, the incident response team may access the admin console 832 associated with the cybersecurity authentication service and review the transaction (and optionally a simulation of the transaction) according to the transaction protocol runbook, i.e., user approval check 836 as illustrated in FIG. 8 (continued). In particular embodiments, the incident response team may use the transaction simulation module 826 as a tool to get assurance on their decisions that an expected functionality is following the runbook or not. If the transaction passes all the requirements, the incident response team may approve it. If the transaction fails any of the requirements, the incident response team may reject the execution of the transaction.

The process may then proceed to be on cloud 816. At step 838, the admin dashboard backend may generate an approval object (i.e., a petition object for an approval of the transaction) containing the previous decision. The approval object may then trigger a bundler lambda 840. At step 842, the transaction may be packed and encoded. If the petition is approved, at step 844, the bundler lambda 840 may bundle/sign and approve the transaction with a key generated and stored under a key management service (KMS) that has enough funds. This key may not be available again until the transaction is mined. In particular embodiments, the key may be generated by a KMS secure key enclave 846. The KMS secure key enclave 846 may comprise a no-SQL atomic locking system comprising a no-SQL database. KMS IDs may be accessed by the no-SQL atomic locking system for transaction processing. The no-SQL atomic locking system may additionally access CRON lambda 1—(check account balance) 848 and CRON lambda 2—(pending transaction tracker) 850.

The newly signed transaction 852 (if generated) and the original transaction 854 may be sent to the appropriate provider 820 on or connected to chain 808. The provider 820 may send the transactions to the blockchain. The original transaction may interact with the user's contract 856 comprising contract, function, and modifier. The lambda generated transaction (i.e., signed transaction) may interact with the smart contract protected by the cybersecurity authentication service (i.e., the platform deployed contract 858).

In particular embodiments, the cybersecurity authentication service may be based on an automated authentication process. The automated approval process may be based on specific runbook rules in conjunction with an automated decisional logic module associated with the cybersecurity authentication service. The automated decisional logic module may comprise rules and the blockchain cybersecurity platform may check if these rules are met to determine if corresponding transactions should be approved or rejected automatically. As an example and not by way of limitation, the transaction protocol runbook may specify a list of values such as dates, amounts, regular expressions that match words, etc. for the automated approval process. These values may be specified in the runbook. In the automated authentication process, a lambda analyzer may review and approve or reject the transaction according to the user requirements. Although this disclosure describes particular automated authentication processes in a particular manner, this disclosure contemplates any suitable automated authentication process in any suitable manner.

In particular embodiments, the blockchain cybersecurity platform may access, by a cybersecurity authentication service of the blockchain cybersecurity platform, from a mempool of the blockchain cybersecurity platform, transaction data associated with a protected first function of a first blockchain transaction protocol associated with a first user and a first blockchain network. The blockchain cybersecurity platform may then access, by the cybersecurity authentication service of the blockchain cybersecurity platform, a transaction protocol runbook associated with the first user and the first blockchain transaction protocol. In particular embodiments, the transaction protocol runbook may comprise one or more preconfigured conditions associated with the protected first function. The blockchain cybersecurity platform may then determine, based at least in part on the transaction protocol runbook, that the protected first function is eligible to be analyzed by an automated decisional logic module of the cybersecurity authentication service. In particular embodiments, the blockchain cybersecurity platform may determine, by the automated decisional logic module, based at least in part on the transaction data, that each preconfigured condition associated with the protected first function is satisfied. The blockchain cybersecurity platform may then generate, by the automated decisional logic module, based at least in part on the one or more preconfigured conditions being satisfied, an authentication object for the protected first function. In particular embodiments, the blockchain cybersecurity platform may generate, by the cybersecurity authentication service, responsive to the authentication object being generated, signed transaction data based on the accessed transaction data and a private encryption key. The signed transaction data may be configured to update a second blockchain transaction protocol associated with the blockchain cybersecurity platform and the first blockchain transaction protocol to indicate that the protected first function is authenticated. In particular embodiments, the blockchain cybersecurity platform may further transmit, by the cybersecurity authentication service, to the first blockchain network, a transaction bundle comprising the accessed transaction data and the signed transaction data.

In particular embodiments, the cybersecurity authentication service may comprise an automated decisional logic module. Determining whether the protected first function should be authenticated may be based at least in part on the automated decisional logic module determining whether each preconfigured condition is satisfied. In particular embodiments, the automated decisional logic module may be based at least in part on one or more machine-learning models configured to determine whether the protected first function should be authenticated based on one or more risk metrics associated with the protected first function and one or more predetermined thresholds associated with the one or more risk metrics, respectively. Using an automated decisional logic module based on specific runbook rules and machine-learning models to determine whether each preconfigured condition is satisfied may be an effective solution for addressing the technical challenge of automatically determining whether a protected function should be authenticated.

Figure 9:
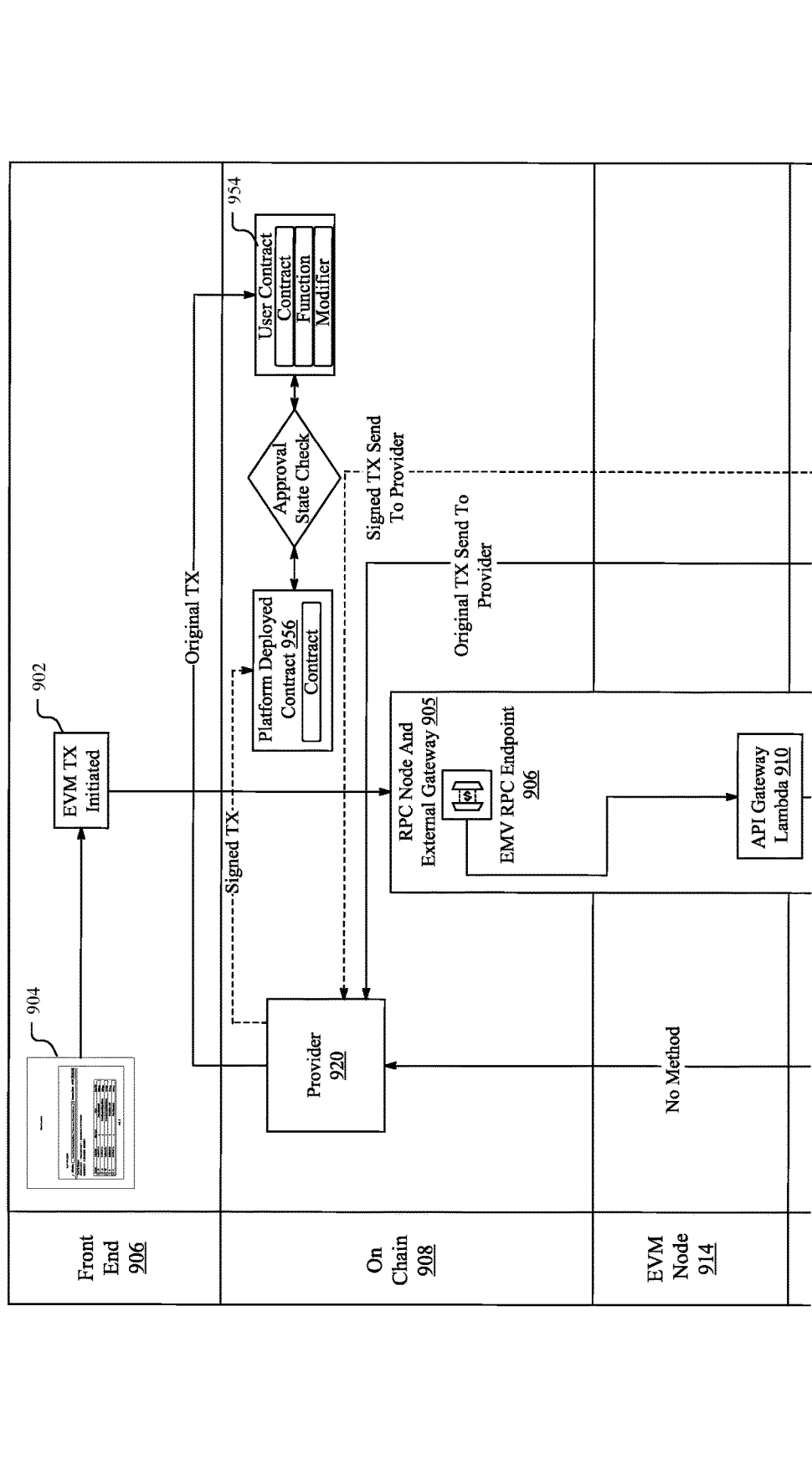
FIG. 9 illustrates an example architecture of the automated authentication process.
Figure 9:
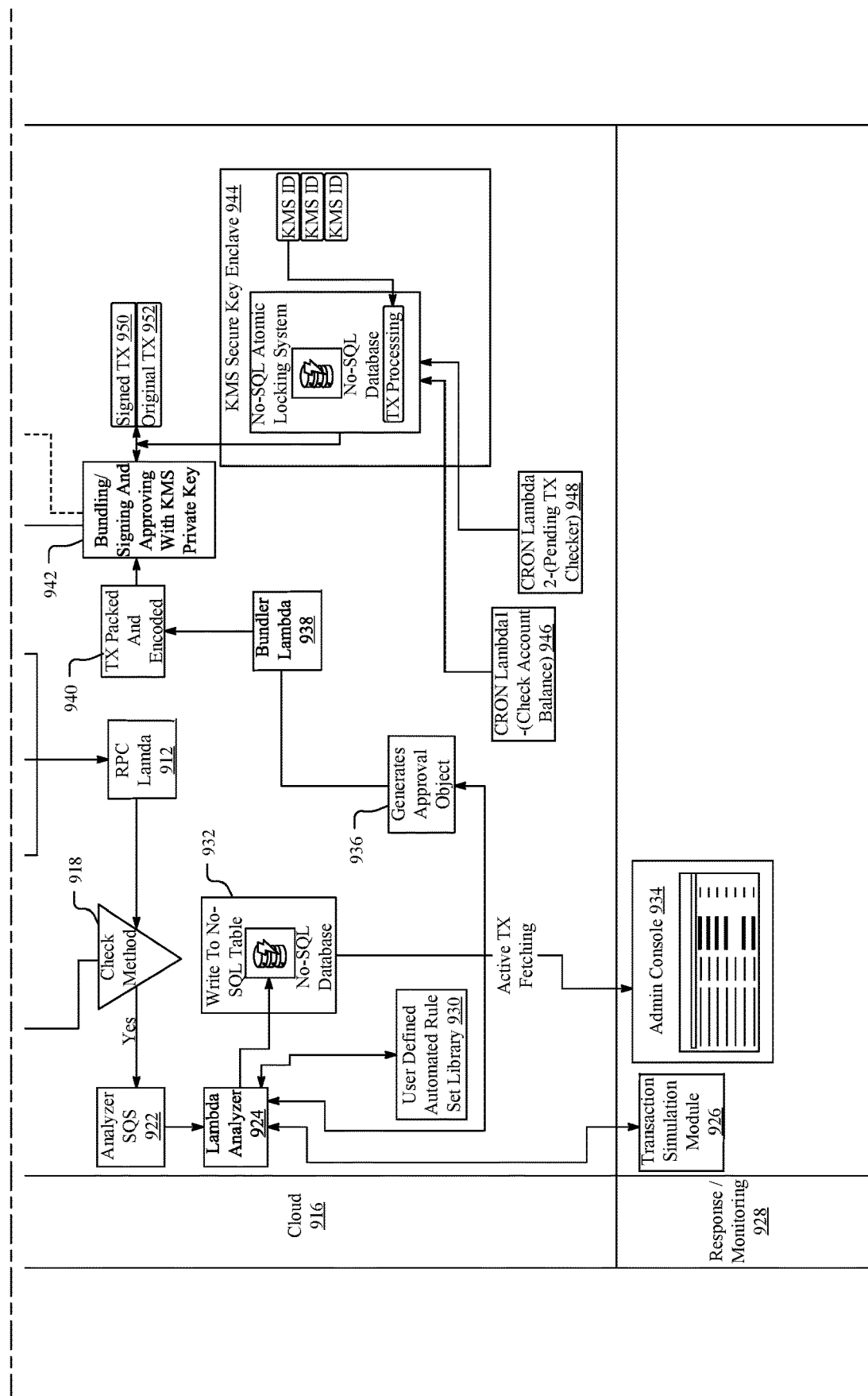

FIG. 9 illustrates an example architecture 900 of the automated authentication process. In particular embodiments, the automated authentication process may be the following. At step 902, the EVM transaction may be initiated from a dashboard 904 in the frontend 906 by the user. As an example and not by way of limitation, alternatively the EVM transaction may be initiated by Etherscan or any other type of blockchain interaction as long as it is connected to the RPC node. The initiated transaction may be directed to an RPC node and external gateway 905, specifically an EVM RPC endpoint 906, which may be both on or connected to chain 908. The transaction may be further directed from the EVM RPC endpoint 906 via an API gateway lambda 910 to an RPC server (lambda) 912, as illustrated in FIG. 9 (continued). The API gateway lambda 910 may be associated with the EVM node 914.

Now referring to FIG. 9 (continued), on the cloud 916, the RPC server 912 may check the transaction and act accordingly. At step 918, the RPC server 912 may check the method called by the function. If there is no method, the transaction may be directed to the provider 920 on or connected to chain 908. If the method is a protected function, the transaction may be directed to the analyzer SQS 922. The analyzer SQS 922 may direct the transaction to a lambda analyzer 924. In particular embodiments, the lambda analyzer 924 may parse out the transaction to detect which function is in the code. The lambda analyzer 924 may communicate with a transaction simulation module 926, which may be part of the response/monitoring 928. The simulations, which may be optional, may be used in relation to specific rules/requirements of a transaction protocol runbook to be used in the approval process. In other words, the blockchain cybersecurity platform may use simulation outputs and validation/verification rules according to the transaction protocol runbook. As illustrated in FIG. 9 (continued), the lambda analyzer 924 may access user defined automated rule set library 930 simultaneously while communicating with the transaction simulation module 926. The lambda analyzer 924 may then review the transaction and simulation according to the transaction protocol runbook. As an example and not by way of limitation, a transaction comprising a burn function may need to be reviewed. Every time the burn function is called, one may only want to burn an NFT (non-fungible tokens) of even numbers. Odd numbers may always stay on there. Accordingly, based on whether the number of NFT is odd, the lambda analyzer 924 may automatically determine whether to approve the function. If the transaction passes all the requirements, the lambda analyzer 924 may approve it. If the transaction fails any of the requirements, the lambda analyzer 924 may reject the execution of the transaction.

At step 932, the lambda analyzer 924 may write the transaction to a no-SQL table of a no-SQL database. An admin console 934, which is part of the response/monitoring 928, may then perform active transaction fetching from the no-SQL database.

Back on the cloud 916, the lambda analyzer 924 may generate an approval object containing the previous decision at step 936. The approval object may trigger the bundler lambda 938. At step 940, the transaction may be packed and encoded. If the petition is approved, the bundler lambda 938 may bundle/sign and approve a transaction with a key generated and stored under a key management service (KMS) that has enough balance at step 942. This key may not be available again until the transaction is mined. In particular embodiments, the key may be generated by a KMS secure key enclave 944. The KMS secure key enclave 944 may comprise a no-SQL atomic locking system comprising a no-SQL database. KMS IDs may be accessed by the no-SQL atomic locking system for transaction processing. The no-SQL atomic locking system may additionally access CRON lambda 1—(check account balance) 946 and CRON lambda 2-(pending transaction tracker) 948.

The newly signed transaction 950 (if generated) and the original transaction 952 may be sent to the appropriate provider 920 on or connected to chain 908. The provider 920 may send the transactions to the blockchain. The original transaction may interact with the user's contract 954 comprising contract, function, and modifier. The lambda generated transaction (i.e., signed transaction) may interact with the smart contract protected by the cybersecurity authentication service (i.e., the platform deployed contract 956).

As discussed above, the automated authentication process may result in a technical advantage of efficient and secured cybersecurity authentication service as servers may automatically review and approve or reject the transaction according to the user requirements, thereby further protecting private/sensitive transaction data.

In particular embodiments, the cybersecurity authentication service may adaptively determine whether to use the manual authentication process or automated authentication process. In particular embodiments, determining that the protected first function is eligible to be analyzed by the automated decisional logic module may be based at least in part on one or more factors comprising one or more of a risk metric associated with the protected first function, a sensitivity metric associated with the protected first function, a complexity metric associated with the protected first function, an importance metric associated with the protected first function, a transaction volume associated with the protected first function, a function type associated with the protected first function, a blockchain transaction protocol type associated with the first blockchain transaction protocol, a preconfigured flag requiring authentication by a cybersecurity authority associated with the cybersecurity authentication service, a preconfigured flag permitting authentication by an automated decisional logic module, or a default eligibility protocol configured by the blockchain cybersecurity platform. As an example and not by way of limitation, if a function is as simple as determining whether a variable is above or below a threshold, the authentication process for that function may be automated. However, if a function is complicated such as a governance proposal, the authentication process for that function may be manual. As another example and not by way of limitation, if the function is an emergency withdraw that can drain the funds of an entire contract, the function may be manually reviewed. In particular embodiments, automated authentication process may be particularly suitable for high-volume transactions. In particular embodiments, the cybersecurity authentication service may utilize a hybrid solution where both manual and automated authentication processes are used. As an example and not by way of limitation, every single transaction may be manually authenticated, but the cybersecurity authentication service may also provide some information about the automatically executed runbook.

In particular embodiments, the cybersecurity authentication service may additionally use ad-hoc feedback as a fallback solution for complicated runbook situations. Determining whether the protected first function should be authenticated may be further based on ad-hoc feedback subsequent to the determination of whether each preconfigured condition is satisfied. In particular embodiments, the ad-hoc feedback may be required based on the preconfigured conditions being insufficient to determine whether the protected first function should be authenticated. As an example and not by way of limitation, one situation may be that a function is executed but for some reason it doesn't meet any approval or rejection criteria in the transaction protocol runbook, e.g., a condition is missed on the runbook. As another example and not by way of limitation, if there is a contract upgrade function called and the upgrade is for a completely different logic, the transaction protocol runbook may not be able to predict what users will upgrade it to in the future. In this way, the cybersecurity authentication service may recommend rejecting it, trying again, and upgrading in a different way, which may be considered ad hoc feedback for the unpredictable situations. In other words, ad hoc feedback may be useful for notarization requests that don't follow the transaction protocol runbook or don't include the decisional logic that is expected. As another example and not by way of limitation, if the execution is not a definite approval (i.e., approval with low confidence), the cybersecurity authentication service may use ad hoc feedback to fail the transaction since one may always execute transaction again but may not be able to un-execute it.

In particular embodiments, the cybersecurity authentication service may be easy to integrate with the user's contract. The cybersecurity authentication service may be a smart contract native and may be able to be integrated with just a few (e.g., 5) additional lines of code. As an example and not by way of limitation, the code may comprise the proxy address and a modifier. In particular embodiments, the proxy address may be given to a user once a proxy contract (i.e., proxy blockchain transaction protocol) is deployed. With the additional lines of code, no storage modification may be made on the user contract. The additional lines of code may allow the cybersecurity authentication service to be added to any code, no matter the storage layout. Although this disclosure describes particular contract integrations in a particular manner, this disclosure contemplates any suitable contract integration in any suitable manner.

In particular embodiments, the blockchain cybersecurity platform may receive, at a proxy blockchain transaction protocol (e.g., proxy contract) associated with the blockchain cybersecurity platform and a first blockchain network (e.g., user contract), based on a persistent address (e.g., proxy address) associated with the proxy blockchain transaction protocol, transaction data associated with a protected first function of a first blockchain transaction protocol associated with a first user and the first blockchain network. The proxy blockchain transaction protocol may be configured to redirect the received transaction data to an address associated with a receiving node of the blockchain cybersecurity platform. The blockchain cybersecurity platform may then receive, at the receiving node of the blockchain cybersecurity platform, the redirected transaction data associated with the protected first function. In particular embodiments, the blockchain cybersecurity platform may access, by a cybersecurity authentication service of the blockchain cybersecurity platform, a transaction protocol runbook associated with the first user and the first blockchain transaction protocol. The transaction protocol runbook may comprise one or more preconfigured conditions associated with the protected first function. In particular embodiments, the blockchain cybersecurity platform may then determine, by the cybersecurity authentication service, that the protected first function should be authenticated based on each preconfigured condition associated with the protected first function being satisfied. The blockchain cybersecurity platform may further transmit, by the cybersecurity authentication service, to the first blockchain network, responsive to the determination that the protected first function should be authenticated, a transaction bundle configured to update a second blockchain transaction protocol (e.g., protection contract) associated with the blockchain cybersecurity platform and the first blockchain transaction protocol to indicate that the protected first function is authenticated.

In particular embodiments, the proxy address may be the same even if a code upgrade takes place. As an example and not by way of limitation, the pseudo code may be:

```
Authentication constant authentication_address = Authentication(PROXY_ADDRESS);
    modifier withAuthentication ( ) {
        authentication_address.checkEnter(msg.sender, msg.sig, msg.data, 0);
        _;
        authentication_address.checkLeave(msg.sig);
    }
```
In particular embodiments, the modifier may be added on each function to be protected. As an example and not by way of limitation, the pseudo code may be:
```
function functionToProtect( ) external withAuthentication {
    // function code
}
```

In particular embodiments, the transaction data may be received at the proxy blockchain transaction protocol based on the modifier comprising the persistent address associated with the proxy blockchain transaction protocol. The proxy blockchain transaction protocol can only be updated by a cybersecurity authority having a restricted authority classification. Using a persistent proxy address may be an effective solution for addressing the technical challenge of efficiency of the integration with the user contract as the persistent proxy address may efficiently redirect transactions to the cybersecurity authentication service for authentications and no storage modification may be made on the user contract due to the persistent proxy address.

In particular embodiments, the modifier associated with the blockchain cybersecurity platform may be configured to require that the first blockchain transaction protocol determine whether there is an update to a state of the protected first function in the second blockchain transaction protocol before the first blockchain transaction protocol is permitted to execute the protected first function. In particular embodiments, when each preconfigured condition associated with the protected first function is satisfied, the second blockchain transaction protocol may be updated based on each preconfigured condition being satisfied, and the modifier may permit the first blockchain transaction protocol to execute the protected first function based on the update to the second blockchain transaction protocol. In particular embodiments, one or more of the preconfigured conditions associated with the protected first function may be not satisfied. Accordingly, the second blockchain transaction protocol may be not updated based on the one or more preconfigured conditions not being satisfied. In addition, the modifier may prevent the first blockchain transaction protocol from executing the protected first function based on an absence of an update to the second blockchain transaction protocol.

In particular embodiments, a smart contract associated with a proxy admin may be a contract that has all the administrative privileges on all proxied products associated with the cybersecurity authentication service. The proxy admin may need particular contracts, which may be contracts conforming to a particular security standard (e.g., OpenZeppelin). As an example and not by way of limitation, one contract may be ownable, which provides basic access control mechanism. As another example and not by way of limitation, another contract may be a contract necessary to provide a proxy pattern to support upgrading contracts (e.g., transparent upgradeable proxy). As a result, the embodiments disclosed herein may have a technical advantage of improved security of integration for user contracts as the proxy blockchain transaction protocol may be associated with administrative privileges on all proxied products associated with the cybersecurity authentication service, conforming to particular security standard, and can only be updated by a cybersecurity authority having a restricted authority classification.

In particular embodiments, the proxy admin may utilize different functions. One function may be constructor, which may give the ownership of the contract to the owner. The arguments for this function may comprise the address of the owner of the contract. As an example and not by way of limitation, the pseudo code for this function may be:

```
constructor(address _owner) {
    _transferOwnership(_owner);
}.
```

Another function may be get-proxy-implementation, which may return the current implementation of the proxy. The arguments for this function may comprise the proxy to get the implementation from. The returns for this function may comprise the address of the proxy. As an example and not by way of limitation, the pseudo code for this function may be:

```
function getProxyImplementation(TransparentUpgradeableProxy proxy) public view returns
(address) {
    (bool success, bytes memory returndata) = address(proxy).staticcall(hex"5c60da1b");
    require(success);
    return abi.decode(returndata, (address));
}
```

Another function may be get-proxy-admin, which may return the current address of the administrator of the proxy. The arguments for this function may comprise the proxy to get the administrator address from. The returns for this function may comprise the address of the administrator of the proxy. As an example and not by way of limitation, the pseudo code for this function may be:

```
function getProxyAdmin(TransparentUpgradeableProxy proxy) public view returns
(address) {
    (bool success, bytes memory returndata) = address(proxy).staticcall(hex"f851a440");
```

```
  require(success);
  return abi.decode(returndata, (address));
}
```

Another function may be change-proxy-admin, which may change the administrator of the contract proxy to a new administrator address. Only the owner of the contract may call this function. The arguments for this function may comprise proxy contract and new address of the administrator. As an example and not by way of limitation, the pseudo code for this function may be:

```
function changeProxyAdmin(TransparentUpgradeableProxy proxy, address newAdmin) public
onlyOwner {
  proxy.changeAdmin(newAdmin) ;
}
```

Another function may be upgrade, which may upgrade the proxy to a new implementation. Only the owner of the contract may call this function. The arguments for this function may comprise proxy to update and address of the new implementation. As an example and not by way of limitation, the pseudo code for this function may be:

```
function upgrade(TransparentUpgradeableProxy proxy, address
implementation) public
onlyOwner
    proxy.upgradeTo(implementation);
}
```

Another function may be upgrade-and-call, which may upgrade the proxy to a new implementation and call a function on the new implementation. Only the owner of the contract can call this function. The arguments for this function may comprise the proxy to update, address of the new implementation, and call data. As an example and not by way of limitation, the pseudo code for this function may be:

```
function upgradeAndCall(TransparentUpgradeableProxy proxy, address implementation, bytes
memory data) public payable onlyOwner {
  proxy.upgradeToAndCall{value: msg.value}(implementation, data);
}
```

In particular embodiments, a proxy blockchain transaction protocol associated with the blockchain cybersecurity platform may comprise the proxy address that the users may use on their contracts to interact with the cybersecurity authentication service. The proxy blockchain transaction protocol may be fixed. Only the cybersecurity authentication service's implementation itself may be changed if code needs to be upgraded. The storage for the cybersecurity authentication service may reside in this contract. The storage contract of the cybersecurity authentication service may exist to take care of storage layout. The proxy blockchain transaction protocol may need a contract of transparent upgradeable proxy, which may be a contract necessary to provide a transparent proxy pattern.

In particular embodiments, the proxy blockchain transaction protocol may utilize different functions. One function may be constructor, which may initialize an upgradeable proxy managed by admin, backed by the implementation at logic, and optionally initialized with data. The arguments for this function may comprise the address of the implementation of the logic, address of the administrator, and optional constructor data. In particular embodiments, the blockchain cybersecurity platform may utilize upgradeable contracts as mechanisms to improve the security of smart contracts.

Being able to fix any potential vulnerabilities or bugs and upgrade the contract may ensure the scalability of the smart contract.

In particular embodiments, users of the cybersecurity authentication service may be added based on user onboarding actions. In order to add a new user to the blockchain cybersecurity platform, a POST request to the selected blockchain network may be sent. The petition object for the POST request may comprise data fields as shown in the following example petition, replacing name to indicate the desired name for the user and logo to indicate the path to the logo image. As an example and not by way of limitation, the pseudo code for the petition object of the POST request may be:

```
{
    "method": "authentication_addUser",
    "id": "72477d67-d4bb-4485-8ddb-6b0cc03baef6",
    "jsonrpc": "2.0",
    "params": {
```

-continued

```
        "name": "User",
        "logo": "/logo.png"
    }
}
```

In order to add functions and contracts belonging to a user to the blockchain cybersecurity platform, a POST petition object to the selected network URL may be sent. The petition object may comprise the following, replacing username to the user name, address to the contract address in hexadecimal, name to the name of the contract, and application binary interface (ABI) to the ABI of the contract, name of functions to the name of the function or functions, priority of functions to the priority of the function, proxy if the contract is a proxy (true for proxy, false in the contrary case), and implementation-address to the address of the implementation of the contract. As an example and not by way of limitation, the pseudo code for adding functions and contracts may be:

```
{
  "method": "authentication_addContractAndFunction",
  "id": "6d267504-444b-4aed-9532-58dbba7712f4",
  "jsonrpc": "2.0",
  "params": {
    "userName": "User",
    "contracts": [
      {
        "address": "0x392B90b7a073Bb96Df93A0c8c50328f4fbA879D6",
        "name": "Contract",
        "abi": [ { "inputs": [ ], "name": "test", "outputs": [ ], "stateMutability":
"nonpayable", "type": "function"}, {"inputs": [ ], "name": "test1", "outputs": [ ],
"stateMutability": "payable", "type": "function"}, {"inputs": [{ "internalType":
"uint256", "name": "v", "type": "uint256"}, "name": "test2", "outputs" [ ],
"stateMutability": "nonpayable", "type": "function"}, {"inputs": [ ], "name":
"test3", "outputs": [ ], "stateMutability": "payable", "type": "function"},
{"inputs": [ ], "name": "test4", "outputs": [ ], "stateMutability": "payable", "type":
"function"}],
        "functions": [
          {"name": "test", "priority": 1},
          {"name": "test1", "priority": 2},
          {"name": "test2", "priority": 3},
          {"name": "test3", "priority": 3},
          {"name": "test4", "priority": 1},
        ],
        "proxy": false,
        "implementationAddress": null
      }
    ]
  }
}
```

In particular embodiments, changing the state of a user may be based on user onboarding actions. In order to change whether a user is protected by the cybersecurity authentication service or not, a POST petition to the selected blockchain network (i.e., a petition object for the selected network) may be sent. The petition object may comprise the following, replacing user-ID to the user ID of the user and value to the new value (true for protected, false to remove protection). As an example and not by way of limitation, the pseudo code may be:

```
{
  "method": " authentication_setUserProtected",
  "id": "5a1ed644-0170-45eb-80b7-a886fbc3cb46",
  "jsonrpc": "2.0",
  " params": {
    "userId":
"0xee46a4313172b7a98ce4bf29842b39a4f158ccf6641c7eaa288514f20e62f26f",
    "value": true
  }
}
```

In particular embodiments, to change the state of protection assigned to a contract, a POST petition object to the selected blockchain network may be sent. The petition object may comprise the following, replacing address to the address of the contract to change and value to the new value (true for protected, false to remove protection). As an example and not by way of limitation, the pseudo code may be:

```
{
  "method": "authentication_setContractProtected".
  "id": "1c32e825-5f46-4c0f-903d-2103678eb89e",
  "jsonrpc": "2.0",
  "params": {
    "address": "0x9e000f57B8183c057fAFb330e569d2dd9e841412",
    "value": true
  }
}
```

In particular embodiments, to change the state of protection assigned to a contract, a POST petition object to the selected blockchain network may be sent. The petition object may comprise the following, replacing address to the address of the contract to change, selector to the function selector, and value to the new value (true for protected, false to remove protection). As an example and not by way of limitation, the pseudo code may be:

```
{
  "method": "authentication_setFunctionProtected",
  "id": "e739421a-85f2-4a52-9bd0-04c855253881",
  "jsonrpc": "2.0",
  "params": {
    "address": "0x9e000f57B8183c057fAFb330e569d2dd9e841412",
    "selector": "0xf8a8fd6d",
    "value": true
  }
}
```

In particular embodiments, in order to fund an approver for the cybersecurity authentication service, a POST petition object to the selected blockchain network may be sent. The petition object may comprise the following, replacing address to the address of the approver and amount to the quantity to send to the key (may be rounded to 4-6 decimals if the value is large). As an example and not by way of limitation, the pseudo code may be:

```
{
   "method": " authentication_fundApprover",
   "id": "6092fa39-a06b-45ea-b276-f1af5ed5e6de",
   "jsonrpc": "2.0",
   "params": {
      "address": "0x0750095498314d63a0f4922b53657350a5549b97",
      "amount": 0.005
   }
}
```

In particular embodiments, to add a key to the cybersecurity authentication service, a POST petition object to the selected blockchain network may be sent. The petition object may comprise the following, replacing master to indicate if the new key is a master key (true for master key, false if not a master key). As an example and not by way of limitation, the pseudo code may be:

```
{
    "method": "authentication_addKey",
    "id": "05b0cec8-a5d6-4c97-84bd-8cb0a1c68f93",
    "jsonrpc": "2.0",
    "params": {
       "master": true
    }
}
```

In particular embodiments, to update the ACLs for the admin dashboard of the cybersecurity authentication service, a POST petition object to the selected blockchain network may be sent. The petition object may comprise the following, a list of rules in which roles need to be replaced, the role to define, and allows which include the list of resources and permissions defined for that role. The petition may also include a list of users in which the email should be replaced with the user email, and role with the desired role for that user. As an example and not by way of limitation, the pseudo code may be:

```
{
    "method": "authentication_setACL",
    "id": "0cbfdd70-c2bd-494d-9312-247551f2d2a6",
    "jsonrpc": "2.0",
    "params": {
    "rules": [
       {
          "roles": "higher-authority",
          "allows": [
             {
                "resources": "approve",
                "permissions": "*"
             },
             {
                "resources": "send",
                "permissions": "*"
             },
             {
                "resources": "post",
                "permissions": "*"
             }
          ]
       },
       {
```
```
          "roles": "authorized-authority",
          "allows": [
             {
                "resources": "approve",
                "permissions": [
                   "p3",
                   "p2"
                ]
             },
             {
                "resources": "send",
                "permissions": [
                   "p3",
                   "p2"
                ]
             },
             {
                "resources": "post",
                "permissions": [
                   "authentication_fundApprover",
                   "authentication_getKeys",
                   "authentication_getUser",
                   "authentication_getUsers",
                   "authentication_addContractAndFunction",
                   "authentication_addUser"
                ]
             }
          ]
       },
       {
          "roles": "basic-authority",
          "allows": [
             {
                "resources": "approve",
                "permissions": [
                   "p3"
                ]
             },
             {
                "resources": "send",
                "permissions": [
                   "p3"
                ]
             },
             {
                "resources": "post",
                "permissions": [
                   "authentication_fundApprover",
                   "authentication_getKeys",
                   "authentication_getUser",
                   "authentication_getUsers"
                ]
             }
          ]
       },
       {
          "roles": "security-analyst",
          "allows": [ ]
       }
    ],
    "users": [
       {
          "email": "user1 email address",
          "role": "higher-authority"
       },
       {
          "email": "user2 email address",
          "role": "authorized-authority"
       },
       {
          "email": "user3 email address",
          "role": "security-analyst"
       }
    ]
 }
}
```

In particular embodiments, to set the system configuration for the cybersecurity authentication service, a POST petition object to the selected blockchain network may be sent. The petition object may comprise the following, data associated with the current environment, the transaction simulation module, including access key used to access the module, the URL of the module for the simulations, user which includes the name of the account to be used in the module for simulations, project which includes the module project name, cybersecurity authentication service comprising simulation which includes slot in which will be stored the "is_simulation" variable and value to change the "is_simulation" variable for indicating that it is a simulation, interface which allows setting the list of available callable functions in the cybersecurity authentication service, name of the function that must be included in the user contracts and that interacts with the cybersecurity authentication system when the approval may need to be done, the message to be shown to the user when the transaction is rejected, average cost for an approval transaction in gas, and average cost for adding a contract and a function to the system in gas. The general configuration data may also comprise the equivalent name for each type of data included on the database, the name of the SQS in the blockchain cybersecurity platform, RPC configuration variables including check nonce to indicate if the nonce of the account is checked, percentage to be added to any estimate-gas petition (i.e., a petition object to estimate-gas) to avoid invalid predictions, fixed quantity of gas to be added to the estimated gas calculated for an approve call based on the added cost of executing the check-leave function when it is not a simulation, fixed quantity of gas to be added to the estimated gas calculated for an approve call based on the added cost of executing the check-enter function when it is not a simulation, analyzer which includes configuration for the analyzer lambda including the default priority of the transaction and send-on error to indicate if the analyzer should send the transaction if it is going to revert the transaction, key checker to define the times a key should be able to call an approval before a low balance alert is emitted and the times a key should be able to call the function to add contract and functions to the cybersecurity authentication service before a low balance alert is emitted, bundler including fixed quantity (e.g., in wei, which is the smallest denomination of ether—one ether=1,000,000,000,000,000,000 wei ($10^{18}$)) added to the gas cost to mine the transaction faster in the chain, admin including fixed quantity (e.g., in wei) added to the gas cost to mine the transaction faster in the chain, region for the KMS, and notifications which allows setting a list of alerting and notification channels available for the blockchain cybersecurity platform. It also allows setting a list of compatible chains, specifying enabled which sets if the chain is enabled for the current environment, ID which is the chain ID wanted to be assigned, authentication ID which is the ID of the chain to set in the cybersecurity authentication service, key which is the network distinctive ID, name which is the chain name, native currency comprising name which is the cryptocurrency name, symbol which is the symbol of the currency, decimals which indicates the number of decimals for the currency, providers which sets a list of the available providers to which transactions will be redirected, explorers which specify a list of the available explorers on which the transactions can be consulted, a testing instance which indicates if the current network is a testing instance, provider of cybersecurity authentication service which includes the URL for the RPC server for that chain, and address of cybersecurity authentication service which is the address of the interactive authentication instance deployed in the current blockchain network.

In particular embodiments, retrieving system information may be retrieving information related to the chain, such as available keys. In order to get the available keys, a POST petition object to the selected blockchain network may be sent. The petition object may comprise the method, ID, RPC, and parameters. As an example and not by way of limitation, the pseudo code may be:

```
{
    "method": " authentication_getKeys",
    "id": "8426a7b2-81f2-47e7-8593-8cbeedf23091",
    "jsonrpc": "2.e",
    "params": {
    }
}
```

In particular embodiments, the retrieved information may comprise a list of keys for the blockchain cybersecurity platform in a particular format (e.g., JSON), containing master, chain ID, hash, key ID, balance, to-fund, using, and address. Master may indicate if it is a master key. A key may be a master key when it can create other keys and add users to the blockchain cybersecurity platform. Chain ID may be the blockchain network ID. Hash may be the hash of the current signed transaction. Hash may be contained only if the transaction is waiting for mining. Key ID may be the ID of the KMS. Balance may be the balance of the key. "To-fund" may indicate if the address funds are below the minimum and a refund is needed. "Using" may indicate if the key is being used. When a key is used it may be blocked until the transaction is mined. Address may be the address of the key on the chain. As an example and not by way of limitation, the pseudo code for the retrieved information may be:

```
{
  "jsonrpc": "2.0",
  "id": "8d26a7b2-81f2-47e7-8593-8cb8edf23091",
  "result": [
    {
      "master": false,
      "chainId": 4,
      "hash": null,
      "keyId": "a6lbabf8-3022-474d-alc6-101917a04f82",
      "balance": "0x138e43dfd61548b",
      "tofund": false,
      "using": false,
      "address": "0xe967fb6a4920b4d5602e72c13f79ed96bd8e5a59"
    }
    {
      "master": true,
      "chainId": 4,
      "hash": null,
      "keyId": "af6921c9-8179-4366-8dfa-67f8504cd34a",
      "balance": "0x1068b7a89cbal18",
      "tofund": false,
      "using": false,
      "address": "0x999dcb8b42def935d5f814496ab7d488228b8c56"
    }
    {
      "master": false,
      "chainId": 4,
      "hash": null,
      "keyId": "c146ba63-3ac6-4cfb-b5a7-5elc193d96c2",
      "balance": "0x149ae750c7387a4",
      "tofund": false,
      "using": false,
      "address": "0x7502e9666c9087578293a73caa2fe81108588d98"
    }
  ]
}
```

In particular embodiments, in order to get the current configuration data for the chain, a POST petition object to the selected blockchain network may be sent. The petition object may comprise one or more of the method, ID, JSON RPC, or parameters. As an example and not by way of limitation, the pseudo code for the petition object may be:

```
}
    "method": " authentication_getConfig",
    "id": "d2d4d213-d865-484c-a4d4-b77f0aee6e2b",
    "jsonrpc": "2.0",
    "params": {
    }
}
```

In particular embodiments, the retrieved information may comprise the chain configuration data for the blockchain cybersecurity platform. As an example and not by way of limitation, the chain configuration data may be in JSON format. Regarding chain configuration data, it may comprise "enabled" which indicates if the chain is enabled for the current environment, ID which is the chain ID, authentication ID which is the ID of the chain in the cybersecurity authentication service, key which is the network distinctive ID, name which is the chain name, native currency comprising name which is the cryptocurrency name, symbol which is the symbol of the currency, decimals which indicates the number of decimals for the currency, providers which include a list of the available providers to which transactions will be redirected, explorers which include a list of the available explorers on which the transactions can be consulted, a testing instance which indicates if the current network is a testing instance, provider of cybersecurity authentication service which includes the URL for the RPC server for that chain, and address of cybersecurity authentication service which is the address of the interactive authentication instance deployed in the current blockchain network. Regarding general configuration data, it may comprise data associated with the current environment, the transaction simulation module, including access key used to access the module, the URL of the module for the simulations in the given chain, user which includes the name of the account used in the module for simulations, project which includes the module project name, cybersecurity authentication service comprising simulation which includes slot in which is stored the "is simulation" variable and value to change the "is simulation" variable for indicating that it is a simulation, interface which includes a list of available callable functions in the cybersecurity authentication service, name of the function that may have to be included in the user contracts and that interacts with the cybersecurity authentication service when the approval may need to be done, the message shown to the user with the transaction is rejected, average cost for an approval transaction in gas, and average cost for adding a contract and a function to the system in gas. The general configuration data may also comprise the equivalent name for each type of data included on the database, the name of the SQS in the blockchain cybersecurity platform, RPC configuration variables including check nonce which indicates if the nonce of the account is checked, percentage added to any estimate-gas petition (i.e., a petition object to estimate-gas) to avoid invalid predictions, fixed quantity of gas added to the estimated gas calculated for an approve call based on the added cost of executing the check-leave function when it is not a simulation, fixed quantity of gas added to the estimated gas calculated for an approve call based on the added cost of executing the check-enter function when it is not a simulation, analyzer which includes configuration for the analyzer lambda including the default priority of the transaction and send-on error indicating if the analyzer should send the transaction if it is going to revert the transaction, key checker including the times a key should be able to call an approval before a low balance alert is emitted and the times a key should be able to call the function to add contract and functions to the cybersecurity authentication service before a low balance alert is emitted, bundler including fixed quantity (e.g., in wei, which is the smallest denomination of ether—one ether=1,000,000,000,000,000,000 wei ($10^{18}$)) added to the gas cost to mine the transaction faster in the chain, admin including fixed quantity (e.g., in wei) added to the gas cost to mine the transaction faster in the chain, region for the KMS, and notifications which include a list of the current alerting and notification channels available for the blockchain cybersecurity platform.

In particular embodiments, the blockchain cybersecurity platform may retrieve general information, including information related to a user and information of all the users. In order to get the data associated to a user, a POST petition object to the selected blockchain network may be sent. The petition object may comprise the method, ID, JSON RPC, parameters, and name which is the user name. As an example and not by way of limitation, the pseudo code for the POST petition object may be:

```
{
    "method": "authentication_getUser",
    "id": "3dd13117-61bc-40af-be09-ffee4fa37818",
    "jsonrpc":"2.0",
    "params": {
        "name": "User"
    }
}
```

In particular embodiments, the retrieved information may comprise the user data. As an example and not by way of limitation, the user data may be in JSON format. In particular embodiments, the user data may comprise the ID associated to the user, the logo of the user to show in the front end, and the name of the user. As an example and not by way of limitation, the pseudo code for the retrieved information may be:

```
{
    "jsonrpc": "2.0",
    "id": "3dd13117-61bc-40af-be09-ffee4fa37818",
    "result": (
        {
            "id":
            "0xee46a4313172b72b7a98ce4f29842b39a4f158ccf6641c7eaa288514f20e62f26f",
            "logo": logo link,
            "name": "User"
        }
```

```
    }
}
```

In order to get the data associated with all users, a POST petition object to the selected blockchain network may be sent. The petition object may comprise the method, ID, JSON RPC, and parameters. As an example and not by way of limitation, the pseudo code for the POST petition object may be:

```
{
    "method": "authentication_getUsers",
    "id": "6bc1019b-9803-4e0b-90d8-8dd89610ff8d",
    "jsonrpc":"2.0",
    "params":
    }
}
```

In particular embodiments, the retrieved information may comprise a list of user data (e.g., in JSON format) comprising the ID associated to the user, the logo of the user to show in the front end, and the name of the user. As an example and not by way of limitation, the pseudo code of the retrieved information may be:

```
{
  "jsonrpc": "2.0",
  "id": "6bc1019b-9803-4e0b-8dd89610ff8d",
  "result": [
    {
      "id":
"0xbe9edc04eeb30c3b2b9450bc476e7d2fa84dbed75b804b238ab212fcc77b3570",
      "logo": "/logo.png",
      "name": "Johnny Test"
    },
    {
      "logo": "logo link",
      "id":
"0x32b922eb5b4bf0cdcd41fbdafe1637777b59cb5502f9954686ea63b1c956d13c",
      "name": "User2"
    },
    {
      "id":
"0xee46a4313172b7a98ce4bf29842b39a4f158ccf6641c7eaa288514f20e62f26f",
      "logo": "logo link",
      "name": "User"
    }
  ]
}
```

In particular embodiments, the cybersecurity authentication service may enable solving an alert effectively and efficiently. A monitor and alerting system may be available on different channels associated with production, staging, and development. As an example and not by way of limitation, the channels may comprise one or more of an admin dashboard, a professional messaging program, an incident response platform, or a messaging application. Alerts may be received through different channels, so the incident response team may always have the latest data in a redundant way. The monitor and alerting system may handle different types of alerts which are solved by different actions. In particular embodiments, actions may be taken using each of those channels, so even if the service of one or more channels is down, it may not affect the blockchain cybersecurity platform. Table 3 lists example alerts and actions.

TABLE 3

Example alerts and actions.

| Alert | Meaning | Action |
|---|---|---|
| P[1-3]-Approval-[NETWORK] | A new transaction of priority P needs approval in the network | Approve or reject a transaction |
| New manual approval | NETWORK A new manual approval has been submitted | — |
| [TYPE]- Balance below threshold | The balance of a key of type TYPE is below the limit | Give funds to the key |
| [TYPE]- Balance resolved | The balance of the key has been augmented | — |

In order to solve the alert of "P[1-3]—Approval—[NETWORK]", the incident response team may approve or reject the transaction that originated the message. To do so, the incident response team may select the appropriate action and send the transaction in through the admin dashboard. After that, the incident response team may make sure that the original transaction has been executed correctly and resolve the alert manually.

In particular embodiments, the alert of "[TYPE]—Balance below threshold" may mean that a key has less balance than the limit. A key may be a MASTER key or APPROVER key. As an example and not by way of limitation, one corresponding alert may be "APPROVER—Balance below threshold". To solve the alert, balance may be sent to the address, including the following steps of checking the destination address (e.g., address field) and the minimum amount of cryptocurrency in the alert, going to the admin dashboard, and following the steps specifying how to fund an approver. As another example and not by way of limitation, another corresponding alert may be "MASTER-Balance below threshold". To solve this alert, balance may be sent to the address, including the following steps of checking the destination address (e.g., address field) and the minimum amount of cryptocurrency in the alert and manually sending the funds to that address.

In particular embodiments, the blockchain cybersecurity platform may pause or resume the cybersecurity authentication service. On a server associated with the blockchain cybersecurity platform, administrative actions may be done through a particular URL. It may be possible to pause the blockchain cybersecurity platform for any reason. When paused, any new request may be stopped. In order to pause the cybersecurity authentication service, a POST petition object to the selected blockchain network may be sent. The petition object may comprise the method, ID, JSON RPC, and parameters in which "enabled" may be replaced to indicate if the blockchain cybersecurity platform will be able to accept requests, e.g., true for active, false to pause the blockchain cybersecurity platform. As an example and not by way of limitation, the pseudo code for the POST petition object may be:

```
{
  "method": "authentication_setEnabled",
  "id": "b4ec8680-e34b-4ec6-8aeb-9fee9ff2b220"
  "jsonrpc":"2.0",
  "params": {
    "enabled": false
  }
}
```

In particular embodiments, the blockchain cybersecurity platform may utilize the pause function as mechanisms to improve the security of smart contracts. In case of a possible attack or being warned by someone about a vulnerability in the contract, being able to pause the contract may prevent any attacker from taking any action.

In order to resume the functionality of the cybersecurity authentication service, a POST petition object to the selected blockchain network may be sent. The petition object may comprise the method, ID, JSON RPC, and parameters in which "enabled" may be replaced to indicate if the blockchain cybersecurity platform will be able to accept request, e.g., true for active, false to pause the system. As an example and not by way of limitation, the pseudo code for the POST petition object may be:

```
{
  "method": "authentication_setEnabled",
  "id": "71f9687c-4ce3-4c48-9589-4e610ac6dcbd",
  "jsonrpc": "2.0"
  "params": {
    "enabled": true
  }
}
```

In particular embodiments, to deploy each of the contracts that control the functionality of the cybersecurity authentication service, the commands listed in Table 4 may be provided.

TABLE 4

Commands for function control.

| Contract | Text |
|---|---|
| Admin | ./deploy.py admin --network <NET> |
| Proxy | ./deploy.py proxy --network <NET> |
| Cybersecurity authentication service | ./deploy.py authentication --network <NET> |

In particular embodiments, there may be a configuration file comprising network specifications for the different blockchain networks the cybersecurity authentication service is compatible with. It may be later used by the deploy header to identify the network requirements. Table 5 lists example information of the configuration file.

TABLE 5

Information of the configuration file.

| Variable | Description |
|---|---|
| Chain ID | The network chain ID |
| TEST INSTANCE | If the current network is a testing instance |
| PREDICTION_MARKET_ADDRESS | Prediction market address |
| ENVIRONMENT: | API key to the named service (usually block explorer of the chain) |
| [NAME]_TOKEN | |

In particular embodiments, a user may upgrade the cybersecurity authentication service. To upgrade the cybersecurity authentication service, the command "./deploy.py authentication upgrade—network network_name" may be executed replacing network_name with the desired network name.

In particular embodiments, in order to access the administrator console, the desired network may be selected on a specified address. The administrator console may show the priority of the transaction. As an example and not by way of limitation, the priority may be from 1 to 3, being 1 the highest priority. The administrator console may also show the hash of the transaction, user name of owner of the contract that interacts with the transaction, address originator of the transaction and nonce of the address, link to the simulation of the transaction, and action to take. As an example and not by way of limitation, the actions may comprise "send" which sends the original transaction after the rejection of the transaction, "approve" which approves all calls within the original transactions, and "reject" which rejects all calls within the original transactions. The administrator console may additionally show the status of the transaction. Table 6 lists example status of a transaction. The administrator console may further show time passed (e.g., in seconds) since the transaction was received and time passed (e.g., in seconds) since the simulation of the transaction on the transaction simulation module was executed.

TABLE 6

Example status of a transaction.

| Status | Description |
|---|---|
| No interaction with the cybersecurity authentication service | No action required |
| Pending sub-call approvals | Pending an action for the incident response team |
| Approved | The transaction is sent to the provider approved |
| Rejected | The transaction is sent to the provider rejected |
| Ready to send | The transaction is ready to send |
| Transaction reverted: Contract is not tracked | Contract is not tracked by the cybersecurity authentication service, transaction reverted |
| Transaction reverted: [OTHER] | The transaction reverted for something else not related to the cybersecurity authentication service |

In particular embodiments, by clicking on the transaction, hash information on the selected transaction may be consulted. This data may show the following information listed in Tables 7-8.

TABLE 7

Example transaction information.
Transaction information
Data about the transaction in the blockchain cybersecurity platform

| Field | Description |
|---|---|
| approveTx | Approve transaction object |
| tx | Transaction object |
| timestamp | Timestamp of the transaction |
| status | Status of the transaction |
| priority | Priority of the transaction |
| simulation | Simulation object |
| chain ID | The blockchain network chain ID |
| hash | Hash of the selected transaction |
| transaction raw | Raw transaction |
| isError | If the transaction fails |
| approvals | Approval object |

TABLE 8

Example transaction information.
Information about the transaction in the chain

| Field | Description |
|---|---|
| block hash | Hash of the block |
| access list | Transaction access list |
| transactionIndex | Integer of the transaction index position in the block |
| type | Transaction type |
| nonce | Nonce of the transaction |
| input | Transaction data input |
| r | Output of a signature by a digital signature algorithm |
| s | Output of a signature by a digital signature algorithm |
| chain ID | Chain ID of the blockchain |
| v | Parity value |
| block number | Number of the block |
| gas | Maximum number of gas units the transaction consumes |
| max priority fee per gas | Amount of gas intended to serve as a tip to the miner who processes the transaction |

TABLE 8-continued

Example transaction information.
Information about the transaction in the chain

| Field | Description |
|---|---|
| from | Sender of the transaction |
| to | Designatory of the transaction |
| max fee per gas | Maximum gas fee a user is willing to pay for the transaction to be processed |
| value | Quantity (e.g., in Wei) sent in the transaction |
| hash | Transaction hash |
| gas price | Quantity (e.g., in Wei) the user is willing to pay per gas unity |

In particular embodiments, a breakdown of the transaction may also be consulted, showing data per function call to a function protected by the cybersecurity authentication service. One section may show the priority of the transaction. As an example and not by way of limitation, the priority may be from 1 to 3, with 1 being the highest priority. It may also show the contract address that contains the function, user name indicating the user to which the contract belongs, address sender of the call, function name and action to take. As an example and not by way of limitation, the actions may comprise "approve" which approves the current call within the original transaction, and "reject" which rejects the current call within the original transaction. The administrator console may additionally show the status of the call. Table 9 lists example status of a call.

TABLE 9

Example status of a call.

| Status | Description |
|---|---|
| Pending Approval | Pending an action for the incident response team |
| Approved | The call was approved |
| Rejected | The call was rejected |

In particular embodiments, by clicking on the simulation ID, a teammate of the incident response team may be redirected to a transaction simulator on the transaction simulation module to review how the transaction would be executed on the chain.

As previously described, there may be a transaction protocol runbook used by the cybersecurity authentication service. In this document, a playbook for the operation of the cybersecurity authentication service may be defined. In particular embodiments, the runbook may be generic. In particular embodiments, the runbook may be user specific. Users may develop and approve each individual transaction protocol runbook. In particular embodiments, one or more of the preconfigured conditions may be predetermined by one or more entities (e.g., users) associated with the first blockchain transaction protocol. During the user onboarding process, a user may decide the functions they want to protect and what authority classifications should those functions be. In addition, the user may decide how quickly that function has to be applied, in order to assign a cybersecurity authority of responsibility. Each user may have their own transaction protocol runbook. The transaction protocol runbook may be available for the incident response team including security analysts and authorities. In particular embodiments, the blockchain cybersecurity platform may determine that one or more of the preconfigured conditions associated with the protected first function are not satisfied. The blockchain cybersecurity platform may further generate an incident report configured for one or more entities associated with the first blockchain transaction protocol. A transaction protocol runbook associated with a protected function may be an effective solution for addressing the technical challenge of effectively determining whether the protected function of a smart contract should be authenticated, as the runbook may specify preconfigured conditions developed by entities associated with the smart contract and the function should be authenticated when all the preconfigured conditions are satisfied.

In particular embodiments, the responsibilities of security analysts of the incident response team may comprise monitoring the admin dashboard/console and notifications in case a function wants to be called using the cybersecurity authentication service, checking logs in the alert channels and identifying problems in the cybersecurity authentication service, being able to do a first assessment of the situation (e.g., simulations in the transaction simulation module), and escalating the alert to the appropriate cybersecurity authority. A flow example may be described as follows. In particular embodiments, an alert may be triggered in a notification system, which may indicate a user wants to call a function protected by the cybersecurity authentication service. The security analysts may check the alert in the dashboard. The security analysts may optionally perform the simulation in the transaction simulation module. The security analysts may then classify the feature of the function according to the specific transaction protocol runbook. A cool-off period may be started in order to escalate the decision to the right cybersecurity authority. The right cybersecurity authority (with previous approval if needed) may then approve and send the protected function. The security analysts may then monitor if the transaction is successfully executed in the blockchain. The security analysts may further inform the user if the transaction is successful. In the event that the transaction is rejected, the security analysts may inform the user that it is rejected and the reason for the rejection.

In particular embodiments, the transaction protocol runbook may define and prescribe the specific sequence of actions and rules the cybersecurity authentication service may take upon receiving a call for a protected function. The runbook may comprise programmable decision-logic for evaluating and approving or rejecting the call for the protected function. In particular embodiments, a specific and unique runbook may exist for each protected function. Runbooks may be upgradeable and mutable. In other words, they may not reside on chain. For authentication service on demand, runbooks may be developed in a spatial data flow application. In particular embodiments, runbook protections may be based on different strategies, e.g., address whitelisting/blacklist, time, events, state-based rules, etc.

In particular embodiments, the cybersecurity authentication service may provide runbook templates for different functions. As an example and not by way of limitation, the cybersecurity authentication service may provide a runbook template for transferring ownership. This may be a standard template for initiating protections on a transferred ownership or similar function. In particular embodiments, not all criteria may be relevant for every implementation, but all criteria may be considered. Users may have different protection strategies based on their own particular risk tolerance. When onboarding this function to the cybersecurity authentication service, the security analysts may take either a whitelisting or blacklisting approach to initiating protection rules. In particular embodiments, a whitelisting approach may be the recommended configuration. In some cases, the user may not prefer to provide a whitelisted wallet to which the security analysts may only allow the transfer of ownership. In this case, if this function would need to be executed for a legitimate purpose, the security analysts may need rules to guide their actions. The runbook template may anticipate how a security analyst needs to respond in this scenario. The process for updating this type of runbook may be properly defined and transparent to the security analysts, authorities, and users.

In particular embodiments, a runbook taxonomy may define the structured and modular taxonomy, logic, and rules used to develop and execute transaction protocol runbooks associated with the cybersecurity authentication service. Every protected function may have a unique set of instructions and processing actions. Creating structured logic and rules that will be consistent across all runbooks may be important to anticipating common user concerns that should be discussed, defined, and documented during user onboarding. A structured taxonomy may enable integration specialists to more easily create standardized rules and clearly-defined response actions to be taken on behalf of the user by the security analysts and appropriate cybersecurity authority. The following may be an example taxonomy:

[ADDRESS]: Wallet ADDRESS
[CHANNEL]: communication platform
[ALIAS]: identifiable and verifiable individual in/with [CHANNEL] (Screen Name, Handle)
[BASIC AUTHORITY]: Basic authority access control list (ACL)
[HIGHER AUTHORITY]: Higher authority approval ACL
[AUTHORIZED AUTHORITY]: Authorized authority approval ACL
[ALLOW]: Approve transaction
[DENY]: Reject transaction
[SA]: Security Analyst
[STATE]: Mode of being of a variable (e.g., same, less than, different)
[VARIABLE]: Some value that can be changed through the execution of the program (e.g., balance, total supply . . . , etc.) [TIME]: Period of time/measurement of time. 24H GMT.
[CONDITION]: Event that triggers an [ALERT]
[RUNBOOKCHANGESCHANNELS]: Channel/s used to notify [SA] of changes on the
[NOTIFICATIONCHANNEL]: Channel/s used to notify about [SA] actions (usually public)
[RUNBOOK]: Set of instructions regarding a function; defines the set of actions an [SA] uses to process a cybersecurity authentication service [ALERT]
[INSTRUCTIONS]: directs [SA] to process change [STATE] or [VARIABLE]; received from [ALIAS] in [CHANNEL]
[TYPE1]: refers to Critical Functions protected with the cybersecurity authentication service
[TYPE2]: refers to Priority functions protected with the cybersecurity authentication service
[TYPE3]: refers to Basic authority functions protected with the cybersecurity authentication service
[ALERT]: alert generated by the protected function call
[CHECK]: analytical action taken by [SA]
[RUGPULL]:
[INSIDER THREAT]:
[FLASH LOAN]:
[WHALE ATTACK]:

[THREAT INTELLIGENCE]:
[STANDARD SIMULATION]: Standard transaction data points that an SA will execute/simulate
[UPDATE]: provides latest known information about an [ALERT] and [SIMULATION] to client via [CHANNEL]
[OPTION]: Standard item for discussion with client on pivot action taken by [SA]
[LEGAL]: Consults with identified legal counsel or entity about an identified risk In particular embodiments, the user may configure a transaction protocol runbook for protected functions by selecting from a set of categories and rules, including address-based rules, time-based rules, events-based rules, state-based rules, and other rules. There may be runbook basic assumptions. As an example and not by way of limitation, an assumption may be a [TYPE2], [AUTHORIZED AUTHORITY] [ALERT] unless otherwise specified. As another example and not by way of limitation, another assumption may be that a user may be represented by [2] distinct identifiable and verifiable [ALIAS] who act on behalf of the protected smart-contract function. As yet another example and not by way of limitation, another yet assumption may be that a user may interact with [SA] [AUTHORIZED AUTHORITY] via [2][CHANNEL] a primary (e.g., a messaging platform) and a secondary (a messaging application).

In particular embodiments, the transaction protocol runbook may comprise address-based rules (either or). For the address-based rules, the programmable criteria may be as follows.

Address-based rules (EITHER OR):
    [IF] Whitelisting:
        [ALLOW] [IF] transfer ownership TO [ADDRESS1] or [ADDRESS2]
    [IF] Blacklisting
        [DENY] [IF] is not acceptable transfer ownership [TO ADDRESS]
            [SIMULATE] [TO ADDRESS BLACKLIST]—Threat intel (implied sanctioned wallet blacklist cross check—]
            [TO ADDRESS old [ADDRESS1] [example: use case scenario: project discovers whitelisted address has been compromised]
        [ALLOW] if [SA] receives advance notice [AT LEAST] [72 hrs] before allowed approval window [TIME] when received via [AT LEAST] [2] of the following approval communications channels and aliases:
            Notification in [RUNBOOKCHANGESCHANNELS] approved by [user]
            [text_new_INSTRUCTIONS] must include [at minimum]
                [INSTRUCTION: 'update wallet whitelist][OLD WALLET][NEW WALLET] [VALID REASON][EFFECTIVE: Immediate/at designated time/window]
        [SA/AUTHENTICATION ACTION] Post approval images to [NOTIFICATIONCHANNEL]
        [OPTION][INITIATE PAUSE] [e.g., Wait 12 hrs]
        [OPTION] Cell phone call from [+X-XXX-XXX-XXXX] to [HIGHER AUTHORITY]
        Pre-shared Authentication challenge/response codes confirmed In particular embodiments, the transaction protocol runbook may comprise time-based rules (either or). For the time-based rules, the programmable criteria may be as follows.

Time-based rules (EITHER OR):
    Whitelisting
        [ALLOW] this function if [ONLY] allowed in [TIME]
            Identify scheduling windows or periods when transaction shall only be permitted
            [APPROVE] [ONLY] [TIME] [example: every Tuesday from 0800Z to 1200Z (Example: "Ok our standard dev schedule is to do X activity every third Tuesday from 1p-3p EST, this is allowed only in that window")]
    Blacklist.
        This function should [NOT] be allowed in [TIME WINDOW]
        [ALLOW] if [SA] receives advance notice [AT LEAST] [72] hrs before allowed approval window when received via [AT LEAST] [2] of the following approval communications channels and aliases:
            Notification in [RUNBOOKCHANGESCHANNELS] approved by [user]
            [text_new_INSTRUCTIONS] must include [at minimum]
                [INSTRUCTION: 'update time whitelist'][OLD TIME][NEW TIME][VALID REASON] [EFFECTIVE: Immediate/at designated time]
            [SA] [UPDATE] Crop/Post approval images to [NOTIFICATION CHANNEL]
        [OPTION] [INITIATE PAUSE] [e.g., Wait 12 hrs]
        [OPTION] Cell phone call from [+X-XXX-XXX-XXXX] to [HIGHER AUTHORITY]
        Pre-shared Authentication challenge/response codes confirmed In particular embodiments, the transaction protocol runbook may comprise events-based rules (either or). For the events-based rules, the programmable criteria may be as follows.

Events-based rules (EITHER OR):
    Whitelisting.
        [ALLOW] this function if [CONDITION] happens:
            [CONDITION] Criteria 1 (example: vote, only allow [FUNCTION] if a valid governance proposal passed with greater than 50% of vote and no voting share was greater than [X]
    Blacklist
        [DENY] this function if [CONDITION] happens:
            Criteria 1 (example: the majority of the vote came from a single address)
        [OPTION][ALLOW] if [Security Analysts] receives advance notice [at least] [72] hrs before allowed approval window when received via [AT LEAST] [2] of the following approval communications [CHANNEL] and [ALIAS]:
            Notification in [RUNBOOK CHANGES CHANNELS] approved by [user]
            [text_new_INSTRUCTIONS] must include [AT MINIMUM]
                [INSTRUCTION: 'update trigger event/condition'][OLD CONDITION][NEW CONDITION] [VALID REASON][EFFECTIVE: Immediate/at designated time]
            [SA][ACTION][UPDATE] Post approval images to [CHANNEL]
        [INITIATE PAUSE] [e.g., Wait 12 hrs]

[OPTION][SA] Cell phone call from [+X-XXX-XXX-XXXX] to [HIGHER AUTHORITY]
Pre-shared Authentication challenge/response codes confirmed or other secrets validation methodology In particular embodiments, the transaction protocol runbook may comprise state-based rules (either or). For the state-based rules, the programmable criteria may be as follows.

State-based rules (EITHER OR):
Whitelisting
[ALLOW] if this [VARIABLE] if [STATE] from before.
Blacklist.
[DENY] if this [VARIABLE] if [STATE] from before.
NEVER allow if [BALANCE] in function which functionality should not change the balance is [DIFFERENT] NEVER allow Before/After scheduled DAO governance function
[ALLOW] if [SA] receives advance notice [at least] [72] hrs before allowed approval window when received via [at least] [2] of the following approval communications channels and aliases:
Notification in [RUNBOOKCHANGESCHANNELS] approved by [user]
[text_new_INSTRUCTIONS] must include [at minimum]
[INSTRUCTION: 'update state'][OLD STATE][NEW STATE][VALID REASON] [EFFECTIVE: Immediate/at designated time]
[INSTRUCTION: 'update variable'][OLD VARIABLE][NEW VARIABLE][VALID_REASON] [EFFECTIVE: Immediate/at designated time]
[SA/AUTHENTICATION ACTION] Post approval images to [NOTIFICATION CHANNEL.
[INITIATE PAUSE] [e.g., Wait 12 hrs]
[OPTION] Cell phone call from [+X-XXX-XXX-XXXX] to [HIGHER AUTHORITY]
Pre-shared Authentication challenge/response codes confirmed In particular embodiments, the transaction protocol runbook may be updated with changes responsive to user requests or recommendations from the cybersecurity authentication service. To various contracts, the cybersecurity authentication service may review those runbooks anytime the contracts need to be redeployed and/or updated. As an example and not by way of limitation, a standard in a contract has changed with a new function being added as part of the template. In this situation, the cybersecurity authentication service may review such changes and determine how to upgrade the contract. The runbook change may be due to the logic change.

Figure 10:
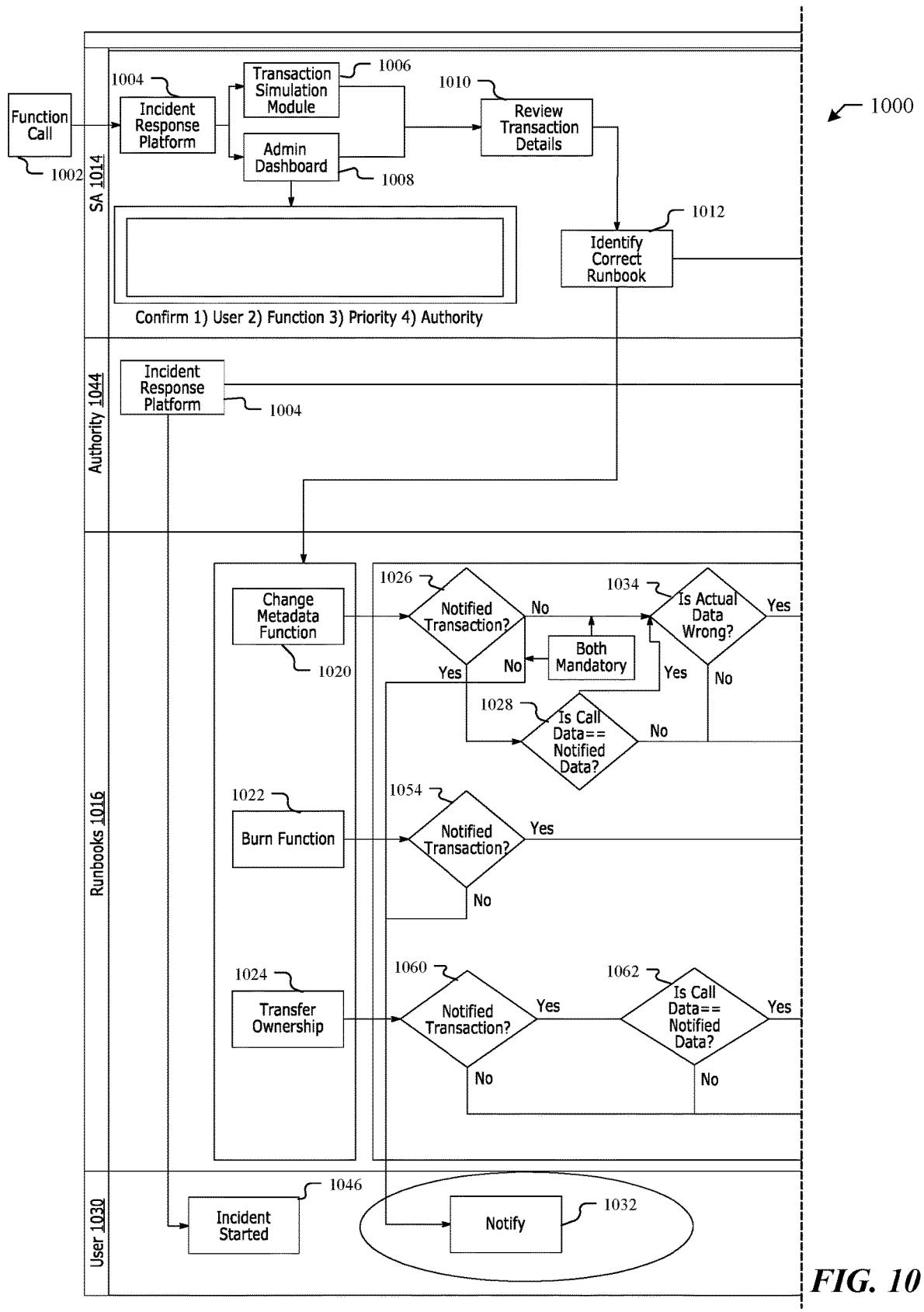
FIG. 10 illustrates an example flow diagram for using a transaction protocol runbook for a protected function.
Figure 10:
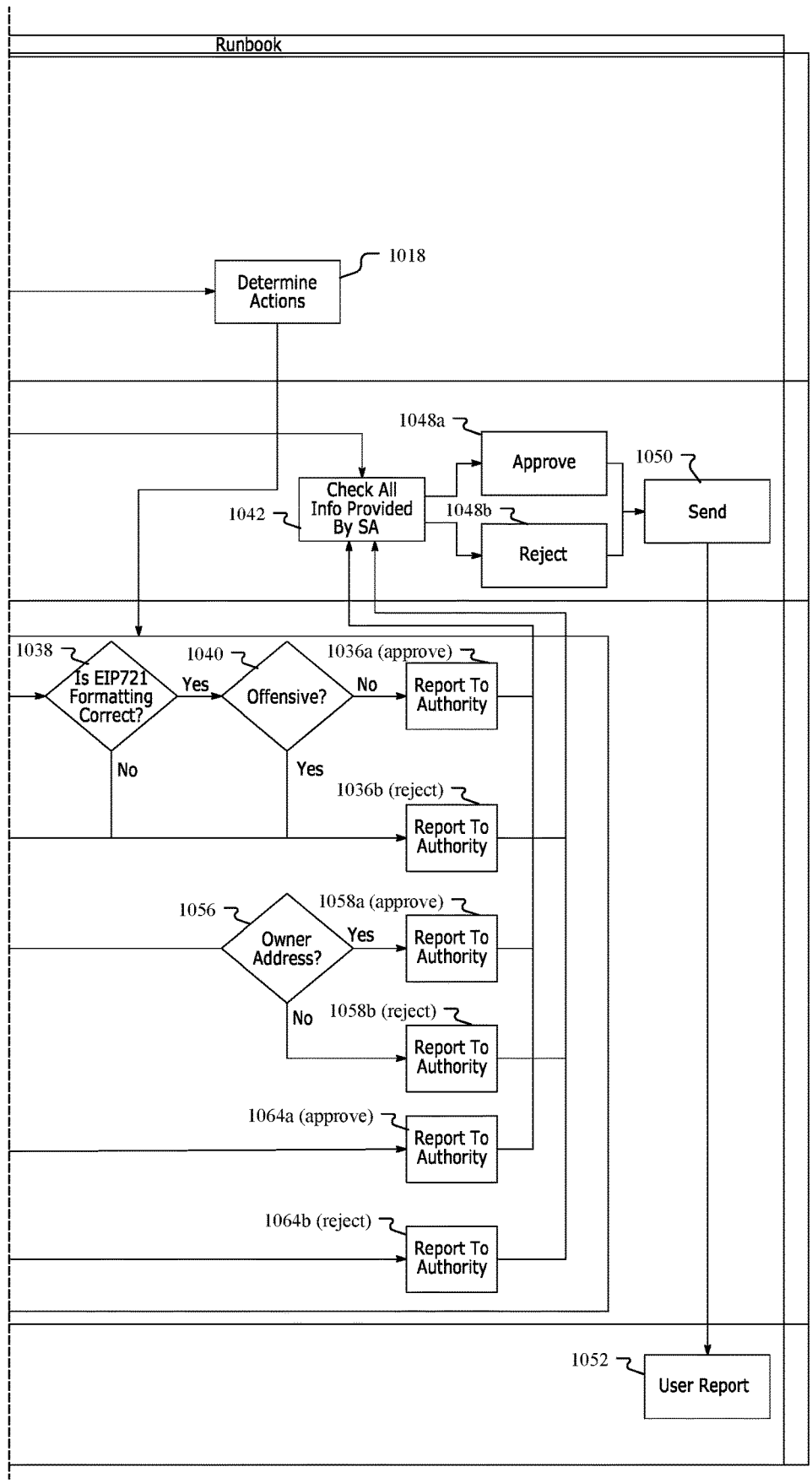

FIG. 10 illustrates an example flow diagram 1000 for using a transaction protocol runbook for a protected function. A function call 1002 may directed to an incident response platform 1004. The incident response platform 1004 may then send the function call to both the transaction simulation module 1006 and the admin dashboard 1008. As illustrated in FIG. 10, the admin dashboard 1008 may help confirm the user, the function, the priority of the function, and the authority. The cybersecurity authentication service may then review the transaction details at step 1010. The details may be used to identify the correct runbook at step 1012. In particular embodiments, one or more security analysts 1014 may be responsible for the above steps.

In particular embodiments, the identified runbooks 1016 may be then used to authenticate the protected functions. The cybersecurity authentication service may further determine actions 1018 (as illustrated in FIG. 10 (continued)) to be performed during the authentication of the protected functions. As an example and not by way of limitation, FIG. 10 shows three protected functions, namely "change metadata function 1020", "burn function 1022", and "transfer ownership 1024." If one of the functions gets executed by the owner of the contract, it may trigger the alert and how to respond to the alert may be based on the runbook. For example, the cybersecurity authentication service may get alerted that the "change metadata function 1020" is triggered. The cybersecurity authentication service may then check if the function is associated with a notified transaction at step 1026. If the function is associated with a notified transaction, the cybersecurity authentication service may check whether the called data is the same as the notified data at step 1028. As an example and not by way of limitation, the called data may comprise the update, the data being modified, etc. If the function is not associated with a notified transaction, the cybersecurity authentication service may notify the user 1030 at step 1032. At step 1034, the cybersecurity authentication service may check what data it is and why it was changed, e.g., whether the actual data is wrong because a user typed in the wrong URL and now the function is updating it to the correct URL if the called data is the same as the notified data or if the function is not associated with a notified transaction. The steps following the determination that the function is not associated with a notified transaction may be both mandatory. If the called data is not the same as the notified data, the cybersecurity authentication service may report to authority at step 1036a, which is illustrated in FIG. 10 (continued). If the data is wrong as determined at step 1034, this may be a correct reason to change, which may proceed with steps illustrated in FIG. 10 (continued).

As illustrated in FIG. 10 (continued), at step 1038, the cybersecurity authentication service may determine whether the EIP721 formatting is correct. If the EIP721 formatting is correct, the cybersecurity authentication service may determine whether the data is offensive at step 1040. If the EIP721 formatting is not correct, the cybersecurity authentication service may report to authority at step 1036b (reject). If the data is offensive as determined at step 1040, the cybersecurity authentication service may report to authority at step 1036b (reject). If the data is not offensive, the cybersecurity authentication service may report to authority at step 1036a (approve). After step 1036, the cybersecurity authentication service may check all information provided by the security analyst at step 1042. In particular embodiments, checking all information provided by the security analyst may involve the authority 1044, as illustrated in FIG. 10. Referring back to FIG. 10, the authority 1044 may access the incident response platform 1004 to check all information provided by the security analyst at step 1042. The authority 1044 may additionally use the incident response platform 1004 to notify the user 1030 of the incident started 1046.

Referring to FIG. 10 (continued) again, at step 1048a, the cybersecurity authentication service may approve executing the "change metadata function 1020." Alternatively at step 1048b, the cybersecurity authentication service may reject executing the "change metadata function 1020." At step 1050, the cybersecurity authentication service may send the decision to the blockchain. The cybersecurity authentication service may further generate a user report 1052 for the user 1030.

Referring to FIG. 10 now, for the "burn function 1022", the cybersecurity authentication service may check if the function is associated with a notified transaction at step 1054. If the function is associated with a notified transaction, the cybersecurity authentication service may check if the owner address is included at step 1056, which is illustrated in FIG. 10 (continued). If the function is not associated with a notified transaction, the cybersecurity authentication service may notify the user 1030 at step 1032. If the owner address is included as determined at step 1056, the cybersecurity authentication service may report to authority at step 1058*a* (approve). If the owner address is not included as determined at step 1056, the cybersecurity authentication service may report to authority at step 1058*b* (reject). After step 1058, the process is the same as for the "change metadata function 1020."

For the "transfer ownership 1024", the cybersecurity authentication service may check if the function is associated with a notified transaction at step 1060. If the function is associated with a notified transaction, the cybersecurity authentication service may check if the call data is the same as the notified data at step 1062. If the function is not associated with a notified transaction, the cybersecurity authentication service may report to authority at step 1064*a* (approve), which is illustrated in FIG. 10 (continued). If the call data is the same as the notified data as determined at step 1062, the cybersecurity authentication service may report to authority at step 1064*b* (reject). If the call data is not the same as the notified data as determined at step 1062, the cybersecurity authentication service may report to authority at step 1064*a* (approve). After step 1064, the process is the same as for the "change metadata function 1020."

Figure 11:
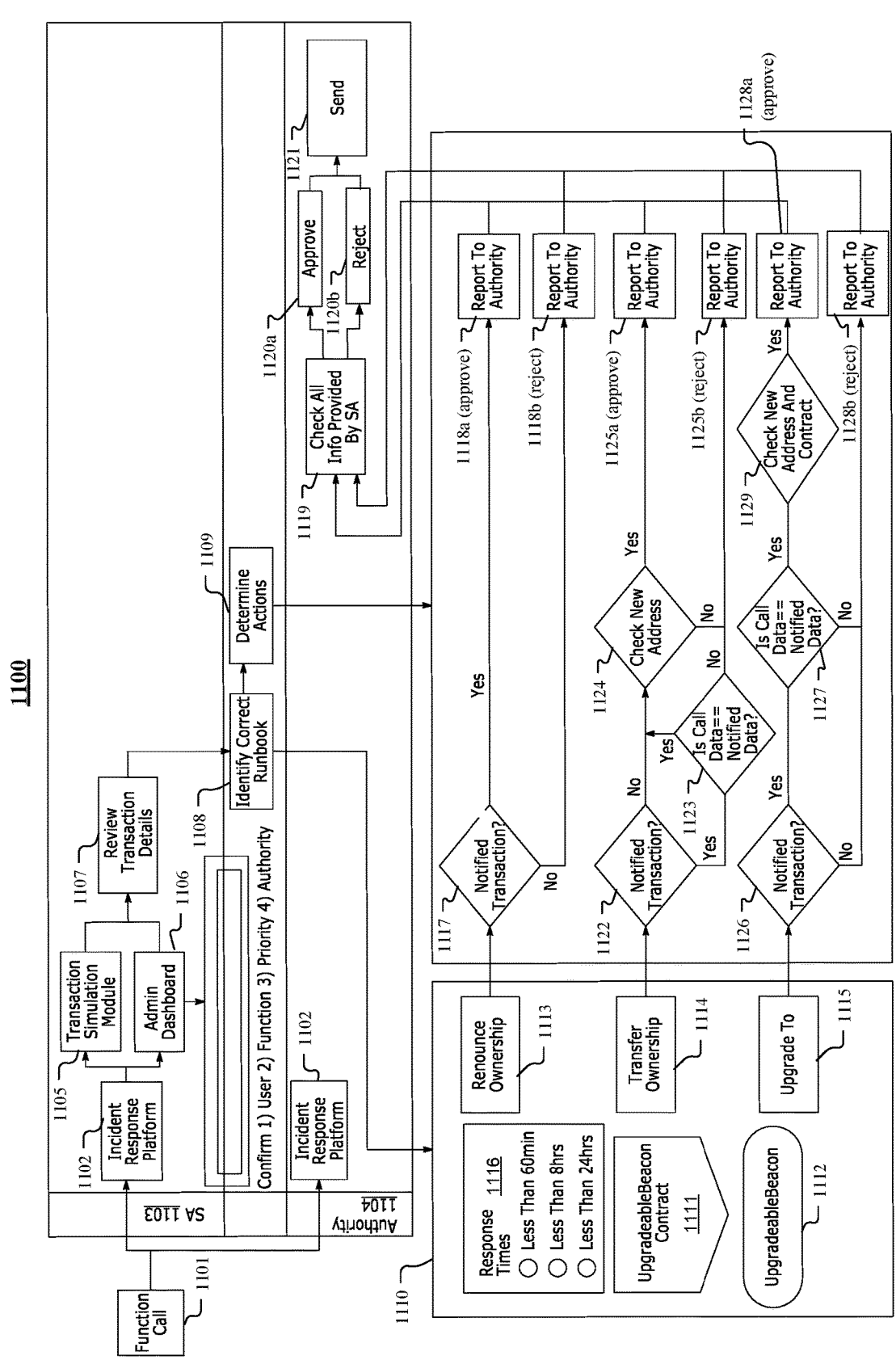
FIG. 11 illustrates another example flow diagram for using different transaction protocol runbooks for different protected functions.

FIG. 11 illustrates another example flow diagram 1100 for using different transaction protocol runbooks for different protected functions. A function call 1101 may directed to an incident response platform 1102, which may be accessed by both the security analyst 1103 and the authority 1104. The incident response platform 1102 may then send the function call to both the transaction simulation module 1105 and the admin dashboard 1106. As illustrated in FIG. 11, the admin dashboard 1106 may help confirm the user, the function, the priority of the function, and the authority. The cybersecurity authentication service may then review the transaction details at step 1107. The details may be used to identify the correct runbook at step 1108. In particular embodiments, the security analysts 1103 may be responsible for the above steps.

In particular embodiments, the identified runbooks may be then used to authenticate the protected functions. The cybersecurity authentication service may further determine actions 1109 to be performed during the authentication of the protected functions. As example and not by way of limitation, there may be three runbooks illustrated in FIG. 11 and FIG. 11 (continued). The first runbook 1110 may be for an upgradeable beacon contract 1111 for upgradeable beacon 1112. The related functions may comprise "renounce ownership 1113", "transfer ownership 1114", and "upgrade to 1115". The first runbook 1110 may additionally indicate the response times 1116 for the functions. For example, the response time for "renounce ownership 1113" may be less than 24 hours; the response time for "transfer ownership 1114" may be less than 8 hours; and the response time for "upgrade to 1115" may be less than 60 minutes.

For "renounce ownership 1113", the cybersecurity authentication service may determine if the function is associated with a notified transaction at step 1117. If it is associated with a notified transaction, the cybersecurity authentication service may report to authority at step 1118*a* (approve). If it is not associated with a notified transaction, the cybersecurity authentication service may report to authority at step 1118*b* (reject). After step 1118, the cybersecurity authentication service may check all information provided by the security analyst at step 1119. In particular embodiments, checking all information provided by the security analyst may involve the authority 1104. The authority 1104 may access the incident response platform 1102 to check all information provided by the security analyst at step 1119. At step 1120*a*, the cybersecurity authentication service may approve executing the "renounce ownership 1113." Alternatively at step 1120*b*, the cybersecurity authentication service may reject executing the "renounce ownership 1113." At step 1121, the cybersecurity authentication service may send the decision to the blockchain.

For "transfer ownership 1114", the cybersecurity authentication service may determine if the function is associated with a notified transaction at step 1122. If it is associated with a notified transaction, the cybersecurity authentication service may determine if the call data is the same as the notified data at step 1123. If it is not associated with a notified transaction or after determining the call data is the same as the notified data, the cybersecurity authentication service may check new address at step 1124. If the call data is not the same as the notified data or the address check is not passed, the cybersecurity authentication service may report to authority at step 1125*b* (reject). If the address check is passed, the cybersecurity authentication service may report to authority at step 1125*a* (approve). After step 1125, the process is the same as for the "renounce ownership 1113."

For "upgrade to 1115", the cybersecurity authentication service may determine if the function is associated with a notified transaction at step 1126. If it is associated with a notified transaction, the cybersecurity authentication service may determine if the call data is the same as the notified data at step 1127. If it is not associated with a notified transaction or if the call data is not the same as the notified data, the cybersecurity authentication service may report to authority at step 1128*b* (reject). If the call data is the same as the notified data, the cybersecurity authentication service may check new address and contract at step 1129. If the check is passed, the cybersecurity authentication service may report to authority at step 1128*a* (approve). After step 1128, the process is the same as for the "renounce ownership 1113."

Referring to FIG. 11 (continued 1), the second runbook 1130 may be for token factor 1131. The related functions may comprise "renounce ownership 1113", "transfer ownership 1114", "update beacon 1132", and "create token 1133". The second runbook 1130 may additionally indicate the response times 1116 for the functions. For example, the response time for "renounce ownership 1113" may be less than 24 hours; the response time for "transfer ownership 1114" may be less than 8 hours; and the response time for "update beacon 1132" and "create token 1133" may be less than 60 minutes. The processes for "renounce ownership 1113" and "transfer ownership 1114" may be the same as those for the first runbook 1110 as illustrated in FIG. 11.

For "update beacon 1132", the cybersecurity authentication service may determine if the function is associated with a notified transaction at step 1134. If it is associated with a notified transaction, the cybersecurity authentication service may determine if the call data is the same as the notified data at step 1135. If it is not associated with a notified transaction or if the call data is not the same as the notified data, the cybersecurity authentication service may report to authority at step 1136*b* (reject). If the call data is the same as the notified data, the cybersecurity authentication service may check new address and contract at step 1137. If the check is passed, the cybersecurity authentication service may report to authority at step 1136*a* (approve).

For "create token 1133", the cybersecurity authentication service may determine if the function is associated with a notified transaction at step 1138. If it is associated with a notified transaction, the cybersecurity authentication service may check arguments on data call at step 1139. If it is not associated with a notified transaction, the cybersecurity authentication service may report to authority at step 1140*b* (reject). If the check for the arguments is passed, the cybersecurity authentication service may report to authority at step 1140*a* (approve).

Referring to FIG. 11 (continued 2) and FIG. 11 (continued 3), the third runbook 1141 may be for NFT 1142. The related functions may comprise "renounce ownership 1113", "transfer ownership 1114", "set bonding curve 1143", "launch 1144", "set manager 1145", "set up voucher 1156", "claim NFT to owner 1157", and "set supplier 1158". The third runbook 1141 may additionally indicate the response times 1116 for the functions. For example, the response time for "renounce ownership 1113", "set bonding curve 1143", "set manager 1145", "set up voucher 1146", and "set supplier 1148" may be less than 24 hours; the response time for "transfer ownership 1114" and "launch 1144" may be less than 8 hours; and the response time for "claim voucher 1147" may be less than 60 minutes. The processes for "renounce ownership 1113" and "transfer ownership 1114" may be the same as those for the first runbook 1110 as illustrated in FIG. 11.

For "set bonding curve 1143", the cybersecurity authentication service may determine if the function is associated with a notified transaction at step 1146. If it is associated with a notified transaction, the cybersecurity authentication service may determine if the call data is the same as the notified data at step 1147. If it is not associated with a notified transaction or after determining the call data is the same as the notified data, the cybersecurity authentication service may check new address at step 1148. If the call data is not the same as the notified data or the address check is not passed, the cybersecurity authentication service may report to authority at step 1149*b* (reject). If the address check is passed, the cybersecurity authentication service may report to authority at step 1149*a* (approve).

For "launch 1144", the cybersecurity authentication service may determine if the function is associated with a notified transaction at step 1150. If it is associated with a notified transaction, the cybersecurity authentication service may report to authority at step 1151*a* (approve). If it is not associated with a notified transaction, the cybersecurity authentication service may report to authority at step 1151*b* (reject).

For "set manager 1145", the cybersecurity authentication service may determine if the function is associated with a notified transaction at step 1152. If it is associated with a notified transaction, the cybersecurity authentication service may determine if the call data is the same as the notified data at step 1153. If it is not associated with a notified transaction or after determining the call data is the same as the notified data, the cybersecurity authentication service may check new address at step 1154. If the call data is not the same as the notified data or the address check is not passed, the cybersecurity authentication service may report to authority at step 1155*b* (reject). If the address check is passed, the cybersecurity authentication service may report to authority at step 1155*a* (approve).

For "set up voucher 1156", the cybersecurity authentication service may determine if the function is associated with a notified transaction at step 1159. If it is associated with a notified transaction, the cybersecurity authentication service may determine if the call data is the same as the notified data at step 1160. If it is not associated with a notified transaction or after determining the call data is the same as the notified data, the cybersecurity authentication service may check buyer address at step 1161. If the call data is not the same as the notified data or the buyer address check is not passed, the cybersecurity authentication service may report to authority at step 1162*b* (reject). If the buyer address check is passed, the cybersecurity authentication service may check token ID at step 1163. If the check is passed, the cybersecurity authentication service may report to authority at step 1162*a* (approve).

For "claim NFT to owner 1157", the cybersecurity authentication service may determine if the function is associated with a notified transaction at step 1164. If it is associated with a notified transaction, the cybersecurity authentication service may determine whether the call data is the same as the notified data at step 1165. If the call data is the same as the notified data, the cybersecurity authentication service may report to authority at step 1166*a* (approve). If it is not associated with a notified transaction or after determining the call data is not the same as the notified data, the cybersecurity authentication service may report to authority at step 1166*b* (reject).

For "set supplier 1158", the cybersecurity authentication service may determine if the function is associated with a notified transaction at step 1167. If it is associated with a notified transaction, the cybersecurity authentication service may determine if the call data is the same as the notified data at step 1168. If it is not associated with a notified transaction or after determining the call data is the same as the notified data, the cybersecurity authentication service may check new address at step 1169. If the call data is not the same as the notified data or the address check is not passed, the cybersecurity authentication service may report to authority at step 1170*b* (reject). If the address check is passed, the cybersecurity authentication service may report to authority at step 1170*a* (approve).

In particular embodiments, user onboarding may specify a new user and new function(s). The onboarding may specify user entity, "Is DAO: True/False: FALSE", main website, main discord, develop team members, admin members, primary communication channel (e.g., main screenname and secondary screenname), backup communication channel, primary wallet, administrative paperwork signed/approved, contract location, and functions to be covered, close fail strategy/reject, safe escrow or provide to third-party know-your-customer (KYC) known entity or add-on module for the cybersecurity authentication service, escalation requirements/user side, primary, priority and tier, criteria for metadata changes, rule configurations (time-based, event-based, state-based, other(s)).

In particular embodiments, the smart contract may be used to keep track of the storage layout for the cybersecurity authentication service. Any new storage variable may be added at the end of this contract, extending the storage and solving storage collision. The variables associated with the smart contract may comprise structs exemplified in Tables 10-14.

TABLE 10

Variable of tracking.
Tracking
Used to track if a contract or function is tracked on the cybersecurity authentication service and if it's protected by the cybersecurity authentication service

| Value | Description |
| --- | --- |
| _isProtected | If a contract or a function is protected |
| _isTracked | If a contract or function is tracked |

TABLE 11

Variable of Function View.
Function View
Used to track a function of a contract that is being protected by the cybersecurity authentication service

| Value | Description |
| --- | --- |
| _functionSelector | Identifier of a function |
| _isProtected | If this function is protected |

TABLE 12

Variable of ContractView.
ContractView
Used to return a contract that is being protected by the cybersecurity authentication service

| Value | Description |
| --- | --- |
| _address | Identifier of a contract |
| _isProtected | If this contract is protected |

TABLE 13

Variable of User View.
User View
Struct used to return a user using the cybersecurity authentication service

| Value | Description |
| --- | --- |
| _id | Identifier of a user |
| _isProtected | If this user is protected |

TABLE 14

Variable of CallStackState.
CallStackState
Used to store all the calls that will be executed on the approved transaction

| Value | Description |
| --- | --- |
| toExecute | Contains the hash of the calls by order of execution |
| toExecuteCount | Contains the total calls that are approved and need to be executed. This is used to verify that all calls where executed when returning from the first protected call |
| numExecuted | Contains the number of already executed calls for this transaction |
| depth | Contains the call stack depth of protected functions. Used to validate the integrity when returning from the first call protected by the cybersecurity authentication service |

In particular embodiments, functions may be on a per-contract basis. Two functions with the same selector may not exist on the same contract. Two contracts with the same address may not exist in the same blockchain.

In particular embodiments, the variables associated with the smart contract may also comprise public variables exemplified in Table 15.

TABLE 15

Public variables.

| Name | Type | Description |
| --- | --- | --- |
| admin | Address | KMS wallet used for administrative purposes on the cybersecurity authentication service. The cybersecurity authentication service may not have control of the private key. |
| owner | Address | Address of the owner of the contract with the cybersecurity authentication service. It may be a multi-signature wallet controlled by multi peers. |

In particular embodiments, the variables associated with the smart contract may also comprise internal variables exemplified in Table 16.

TABLE 16

Internal variables.

| Name | Type | Description |
| --- | --- | --- |
| _users | bytes32[ ] | List of all tracked users by user id. Used to get all tracked users |
| _userTracking | mapping(bytes32 => Tracking) | Used to track registered users on the cybersecurity authentication service by mapping their userId to their tracking status |
| _userContracts | mapping(bytes32 => address[ ]) | Used to access all contract addresses for a specific user id. One user may have many contracts. |

TABLE 16-continued

Internal variables.

| Name | Type | Description |
|---|---|---|
| _contractTracking | mapping(address => Tracking) | Used to track registered contracts on the cybersecurity authentication service by mapping the contract address to their tracking status |
| _contractUser | mapping(address => bytes32) | Contains the user id for the given contract address |
| _contractFunctions | mapping(address => bytes4[ ]) | Used to access all function selectors for a specific contract address. |
| _functionTracking | mapping(address => mapping(bytes4 => Tracking)) | Used to get a function object tracking status based on the contract address and the function selector. It may be possible to have the same function signature for two different contracts |
| _callStackStates | mapping(address => CallStackState) | Contains the integrity (CallStackState) object used to validate an approval execution. The mapping key may be the transaction origin |
| _approversWhitelist | mapping(address => bool) | A whitelist mapping for all addresses allowed to approve tx on the cybersecurity authentication service. A new key may only be whitelisted when a KMS key is generated on the RPC backend. |
| _initialized | bool | Contains whether the cybersecurity authentication service has been initialized or not. |

In particular embodiments, the variables associated with the smart contract may also comprise private variables exemplified in Table 17.

TABLE 17

Private variables.

| Name | Type | Description |
|---|---|---|
| SIMULATION_SLOT | bytes32 | Slot used by the simulation to bypass approvals |

In particular embodiments, there may be a plurality of events associated with the cybersecurity authentication service. Table 18 lists some example events.

TABLE 18

Example events.

| Name | Arguments | Description |
|---|---|---|
| NewAdmin | address_old address_new | Emitted when the KMS admin changes |
| NewApprove | Bytes32_txHash | Emitted when there is a new approval on the system |
| NewUser | bytes32 indexed _userId | Emitted when a new user is added to the system |
| NewContract | bytes32 indexed _userId address _contractAddress | Emitted when a new contract is added to a user. |
| NewFunction | bytes32 indexed _userId address indexed | Emitted when a new function is registered into a contract |

TABLE 18-continued

Example events.

| Name | Arguments | Description |
| --- | --- | --- |
| NewUserProtection | _contractAddress<br>bytes4<br>_functionSelector<br>bytes32 indexed<br>_userId<br>bool _protected | Emitted when the status in the protection on a user changes |
| NewContractProtection | address indexed<br>_contractAddress,<br>bool _protected | Emitted when the status in the protection on a contract changes |
| NewFunctionProtection | address indexed<br>_contractAddress,<br>bytes4<br>_functionSelector<br>bool _protected | Emitted when the status in the protection on a function in a contract changes |
| ApproverAdded | address indexed<br>account | Emitted when an approver is added to the approversWhitelist |
| ApproverRemoved | address indexed<br>account | Emitted when an approver is removed from the approversWhitelist |
| UnprotectedExecuted | bytes32 indexed<br>_userId<br>address indexed<br>_contractAddress<br>bytes4 indexed<br>_functionSelector<br>bytes _callData<br>uint256 _value | Emitted when a function is not protected with the cybersecurity authentication service |

In particular embodiments, there may be a plurality of modifiers associated with the cybersecurity authentication service. Some example modifiers may be as follows. "onlyOwner" may be a modifier used to verify that the sender is an owner. "onlyAuthenticationAdmin" may be a modifier used to verify that the sender is the KMS administrative wallet. "onlyApprover" may be a modifier used to verify that the sender is approved by the cybersecurity authentication service. "userExists" may be a modifier used to verify that a user exists by using its {userId} identifier. As an example and not by way of limitation, the pseudo code for it may be "modifier userExists (bytes32 userId)." "contractExists" may be a modifier used to verify that a contract exists by using its {contractAddress} identifier. As an example and not by way of limitation, the pseudo code for it may be "modifier contractExists (address contractAddress)." "functionExists" may be a modifier used to verify that a function for a given contract exists by using its {functionSelector} identifier and the key parent {contractAddress} identifier. As an example and not by way of limitation, the pseudo code for it may be "modifier functionExists (address contractAddress, bytes4 functionSelector)." "initializer" may be a modifier used to verify that the contract is not initialized already.

In particular embodiments, there may be functions associated with the cybersecurity authentication service. All functions starting with "_" may be internal or private functions, e.g., _isContract. The following describes example functions and their corresponding arguments and returns. One function may be "initAuthentication", which may be used during initialization to transfer ownership to a multi-signature wallet and KMS administrative permissions. This function may be only called once during proxy initialization. The arguments for this function may comprise "newOwner" which may indicate the owner. It may only be allowed to change KMS admin wallet. The arguments may also comprise "newAdmin" which may indicate the KMS admin wallet. It may be allowed to administrate cybersecurity authentication service. The example pseudo code for this function may be "function initAuthentication (address newOwner, address newAdmin) external initializer."

Another function may be "_isContract", which may return true if an address is a contract. The arguments may comprise "addr" which is the address to check. The returns may comprise "bool" which may return true if the address is a contract. The example pseudo code for this function may be "function isContract (address addr) internal view returns (bool)." Another function may be "_is_simulation" which may return if this transaction is a simulation or a transaction to execute. The returns may comprise "bool" which may return true if the transaction is a simulation. The example pseudo code for this function may be "function _is_simulation( ) private view returns (bool is_simulation)." Another function may be "_addContractToUser" which may add a contract to a given {userId} and {contractAddress}. The arguments may comprise userId that is the ID of the user, contractAddress that is the address of the contract, and functionSelector that is the function identifier. The example pseudo code for this function may be "function _addContractToUser(bytes32 userId, address contractAddress) internal."

Another function may be "_addFunctionToContract", which may add a function to a given {userId} and {contractAddress}. The arguments may comprise contractAddress that is the address of the contract and functionSelector that is the function identifier. The example pseudo code for this function may be "function _addFunctionToContract (address contractAddress, bytes4 functionSelector) internal." Another function may be "functionProtected", which is used to check if any of the specified identifiers is not protected by the cybersecurity authentication service. The function may be called with a valid {contractAddress} and {functionSelector}. Otherwise, the returned value may be false, showing that the contract/function is not protected.

The arguments may comprise contractAddress indicating the contract where the functionSelector is from and functionSelector indicating the function identifier. The returns may comprise bool, which may return false if the user, the contract or the function is not protected. The example pseudo code for this function may be "function functionProtected(address contractAddress, bytes4 functionSelector) public view returns(bool)."

Another function may be "contractProtected" used to check if a {contractAddress} is not protected by the cybersecurity authentication service. The function may return false if the contract or the user is not protected. The arguments may comprise contractAddress indicating the contract to be checked. The returns may comprise bool, which may return false if the user or the contract is not protected. The example pseudo code for this function may be "function contractProtected(address contractAddress) public view returns(bool)." Another function may be "userProtected" used to check if a {userId} is not protected by the cybersecurity authentication service. The function may return false if the user is not protected. The arguments may comprise userId indicating the user to be checked. The returns may comprise bool, which may return false if the user or the contract is not protected. The example pseudo code for this function may be "function userProtected (bytes32 userId) external view returns(bool)."

Another function may be "getAllUsers", which returns a list of users. The returns may be UserView[ ] comprising the list of users. The example pseudo code for this function may be "function getAllUsers( ) external view returns (UserView[ ] memory)." Another function may be "getAllUserContracts" which returns a list of contracts from a specific user. The arguments may comprise userId indicating the ID of the user/owner of the contracts. The returns may comprise ContractView[ ] comprising the list of contracts. The example pseudo code for this function may be "getAllUserContracts (bytes32 userId) external view returns (ContractView[ ] memory)." Another function may be "getAllContractFunctions", which returns a list of functions for a given contract protected by the cybersecurity authentication service. The arguments may comprise contractAddress indicating the address of the contract from which to extract the functions from. The returns may be Function View[ ] comprising the list of functions. The example pseudo code for this function may be "function getAllContractFunctions (address contractAddress) external view returns(Function View[ ])."

Another function may be "addUser", which adds a user to the cybersecurity authentication service. The arguments may comprise userID, which is the user ID. The example pseudo code for this function may be "function addUser (bytes32 userId) external only AuthenticationAdmin." Another function may be "addContractAndFunction", which may add a function to a given {userId} and {contractAddress}. This may be the public interface for {_addContractToUser} and {_addFunctionToContract} functions if all the parameters are checked. Only KMS admin wallet may call it (only AuthenticationAdmin). The arguments may comprise userId indicating the ID of the user/owner for this contract, contractAddress indicating the address of the contract to add the function to, and functionSelector that is the function selector of the function desired to add. The example pseudo code for this function may be "function addContractAndFunction (bytes32 userID, address contractAddress, bytes4 functionSelector) external only AuthenticationAdmin userExists (userID))."

Another function may be "multiCall" which allows the contract to call multiple functions. It will be mainly used to add multiple users/contracts/functions into the authentication service contract. The arguments may comprise data indicating the function and arguments to call in bytes. The example pseudo code for this function may be "function multiCall (bytes[ ] calldata data) external onlyAuthenticationAdmin." Another function may be "getPermitHash" which returns the permit hash for a given transaction. The arguments may comprise callerAddress indicating the address of the caller of the transaction, contractAddress indicating the contract in which the function is defined, functionSelector indicating the selector of the function to call, callData indicating the arguments of the function call, and value indicating the quantity of wei sent on the original transaction. The returns may comprise bytes32 which is the keccak256 hash of the given arguments. The example pseudo code for this function may be "function getPermitHash (address callerAddress, address contractAddress, bytes4 functionSelector, bytes memory callData, unit256 value) public pure returns (bytes32)."

Another function may be "approve", which may approve a set of calls made by a {txOrigin} by generating a linked hash list of approved calls (permits) and storing them. Only an account approved by the cybersecurity authentication service may call it (onlyApprover). The arguments may comprise txOrigin that is the address of the originator of the transaction and approvalsArray that is the list of functions and arguments to call. The example pseudo code for this function may be "function approve (address txOrigin, bytes[ ] calldata approvalsArray) external only Approver." Another function may be checkEnter, which checks if the execution of a function with the given arguments and in a given order was approved. The contract and function may be registered on the blockchain cybersecurity platform. This may be one of the functions that would be added on the user modifiers. The arguments may comprise callerAddress indicating the address that initiates the transaction, functionSelector indicating the selector of the function called, callData comprising the arguments of the call, and value reflecting the quantity of wei sent on the original transaction. The example pseudo code for this function may be "function checkEnter (address callerAddress, bytes4 functionSelector, bytes calldata callData, uint256 value) external functionExists (msg.sender, functionSelector)."

Another function may be "checkLeave" which checks that the functions are executed in the approved order and whether they are all executed. The contract and function may be registered on the blockchain cybersecurity platform. This may be one of the functions that would be added on the user modifiers. The arguments may comprise functionSelector indicating the selector of the function called. The example pseudo code for this function may be "function checkLeave (bytes4 functionSelector) external." Another function may be "addApprover" which adds an approver to the whitelist. Only KMS admin wallet may call it (only AuthenticationAdmin). The arguments may comprise address which is the address of the approver. The example pseudo code for this function may be "function addApprover (address _address) external only AuthenticationAdmin." Another function may be "removeApprover" which removes an approver from the whitelist. Only KMS admin wallet may call it (only AuthenticationAdmin). The arguments may comprise _address which indicates the address of the approver. The example pseudo code for this function may be "function removeApprover(address _address) external only AuthenticationAdmin."

Another function may be "setUserProtected" which may change the protection state for the given {userId} and set it to {value}. Only KMS admin wallet may call it (onlyAuthenticationAdmin). The arguments may comprise userId which is the ID of the user and value which is the value to set the protection. The example pseudo code for this function may be "function setUserProtected(bytes32 userId, bool value) external only AuthenticationAdmin." Another function may be "setContractProtected" which may change the protection state for the given {contractAddress} and set it to {value}. Only KMS admin wallet may call it (only AuthenticationAdmin). The arguments may comprise contractAddress that is the address of the contract and value that is the value to set the protection. The example pseudo code for this function may be "function setContractProtected(address contractAddress, bool value) external only AuthenticationAdmin contractExists (contractAddress)." Another function may be "setFunctionProtected" which may change the protection state for the given contract/function and set it to {value}. Only KMS admin wallet may call it (only AuthenticationAdmin). The arguments may comprise contractAddress which is the address of the contract, functionSelector which is the identifier of the function, and value which is the value to set the protection. The example pseudo code for this function may be "function setFunctionProtected(address contractAddress, bytes4 functionSelector, bool value) external only AuthenticationAdmin contractExists (contractAddress) functionExists (contractAddress, functionSelector)."

Another function may be "setAdmin" which is present in case of AWS KMS failure or migration. This may allow the owner to set a new KMS admin wallet that will have privileges to add users, contracts and functions, and update them. The arguments may comprise newWallet which is the new wallet used for administrative purposes on the cybersecurity authentication service. The example pseudo code for this function may be "function setAdmin (address newWallet) external onlyOwner."

In particular embodiments, the blockchain cybersecurity platform may provide an interface to use the cybersecurity authentication service. As an example and not by way of limitation, the blockchain cybersecurity platform may provide an interface for the functions of checkEnter and checkLeave. The example pseudo code for these functions may be "function checkEnter (address, bytes4, bytes calldata, uint256) external" and "function checkLeave (bytes4) external", respectively.

In particular embodiments, there may be an abstract contract that the user contract may need to inherit in order to use the cybersecurity authentication service. There may be public variables in this abstract contract. As an example and not by way of limitation, a public variable may be the address of the current deployed smart contract.

In particular embodiments, the abstract contract may also comprise modifiers. As an example and not by way of limitation, one modifier may be "withAuthentication", which may be included when a function needs to be protected by the cybersecurity authentication service. The example pseudo code for this modifier may be:

```
modifier withAuthentication( ) {
    authentication.checkEnter(msg.sender, msg.sig, msg.data, 0);
    _;
    authentication.checkLeave(msg.sig)
}
```

As another example and not by way of limitation, another modifier may be "withAuthenticationPayable", which may be included when a function needs to be protected by the cybersecurity authentication service and it is a payable function. The example pseudo code for this modifier may be:

```
modifier withAuthenticationPayable( ) {
    authentication.checkEnter(msg.sender, msg.sig, msg.data, msg.value);
    _;
    authentication.checkLeave(msg.sig);
}
```

In particular embodiments, the integration of the cybersecurity authentication service with a user contract may comprise function selection. In order to integrate the cybersecurity authentication service with existing code, the user may need to identify the function or functions to be protected by the cybersecurity authentication service. In order to fully integrate a user contract with the cybersecurity authentication service, the user may need to provide the user name, the function or functions that the user wants to protect, the contract of function ABI (contract may be preferred), the contract address (if proxies are used, then the proxy address), the contract name to show on the front end, the wallet that may be used to create signatures for the function(s), if applicable, (it may be a multi-signature wallet), and a contract runbook.

In particular embodiments, the cybersecurity authentication service may be available as a software package (e.g., npm package). In order to include the cybersecurity authentication service in the user contract, the user may download the software package and inherit the cybersecurity authentication service in the user contract comprising the functions to be protected. Once the software package is installed, the user may use the cybersecurity authentication service by importing it. In particular embodiment, the function modifiers comprising function_nopayable and function_payable may be added to the protected function. Depending on if the function is payable or not, one should be used over another.

In particular embodiments, all the interactions a user needs with the cybersecurity authentication service may be completed by means of a front-end dashboard. The dashboard may allow connecting the user's wallet, looking up for users, contracts and transactions, and sending transactions to protected functions. As an example and not by way of limitation, to connect the user's wallet to the cybersecurity authentication service, the user may click on a "Connect your wallet" button on the dashboard and select the user's wallet, for which the wallet address may appear next to a "Connect" button. In order to use the cybersecurity authentication service to interact with contracts functions, the user may need to connect the wallet to the correct RPC server. In particular embodiments, the blockchain cybersecurity platform may log and monitor every transaction sent to the cybersecurity authentication service. Such log may be available for users to review in the front-end dashboard.

Figure 12:
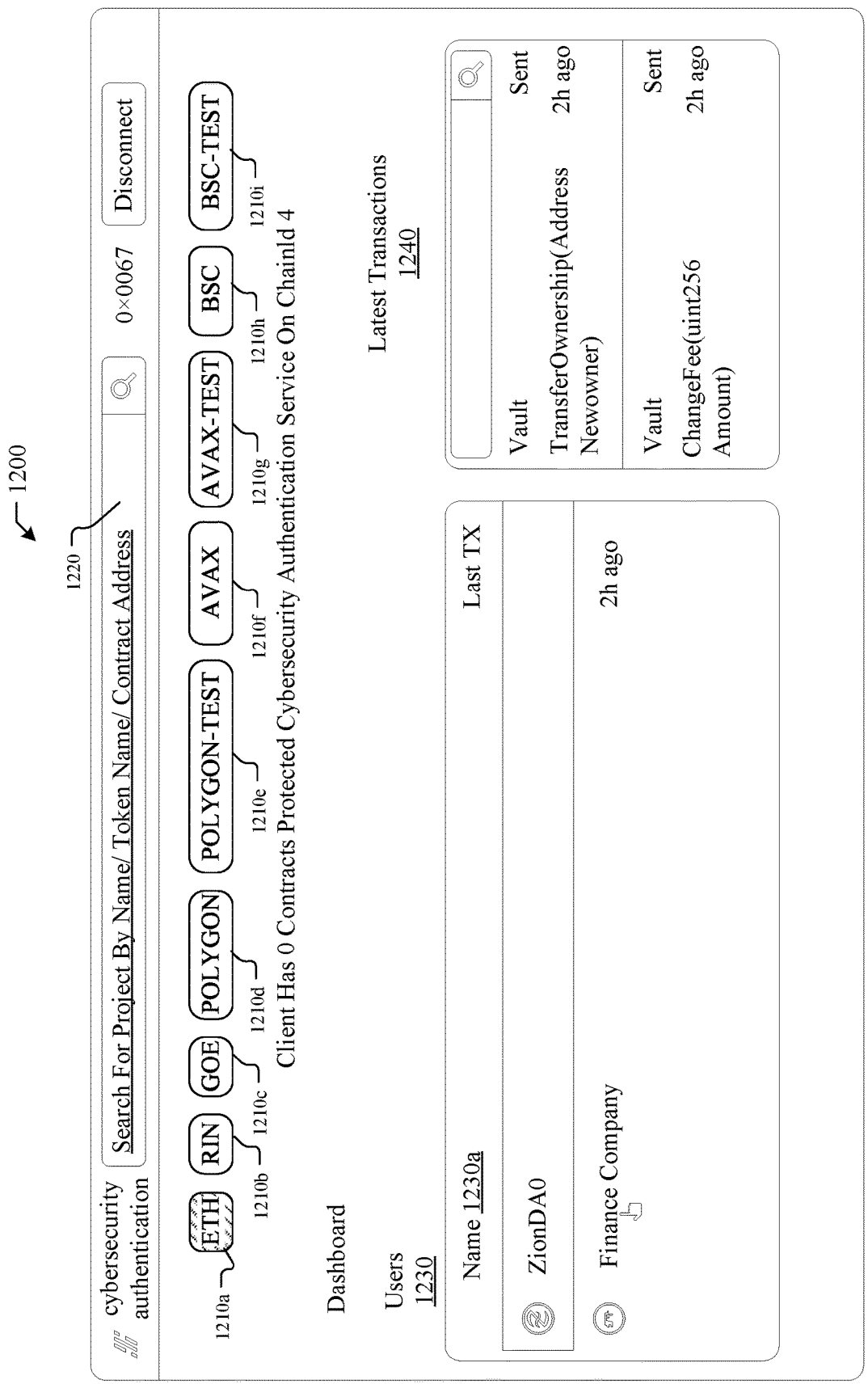
FIG. 12 illustrates an example dashboard.

FIG. 12 illustrates an example dashboard 1200. The dashboard 1200 may allow for changing the network. The cybersecurity authentication service may be available for a variety of networks such as ETH 1210a, RIN 1210b, GOE 1210c, POLYGON 1210d, POLYGON-TEST 1210e, AVAX 1210f, AVAX-TEST 1210g, BSC 1210h, and BSC-TEST 1210i. To consult data for a specific network, the user may select the network name among the available options. For example, the currently selected network may be ETH 1210a.

The dashboard 1200 may allow for looking for a user, token or address via a search bar 1220. The front end may be used to explore which users/projects or tokens use the cybersecurity authentication service as well as transactions that interact with the blockchain cybersecurity platform. This data may be accessible via search bar 1220 or navigating through the page. The dashboard 1200 may allow for navigating through the web page. Users/projects 1230 may be accessible from the front end. The dashboard 1200 may allow for checking the users/projects that use the cybersecurity authentication service. User and projects that use the cybersecurity authentication service may be available on the main page. The name 1230*a* of the user 1230 may be listed as well as the project or user logo. The dashboard 1200 may allow for checking the contracts protected by the cybersecurity authentication service. To be able to see the contracts that are protected by the cybersecurity authentication service, the user may select the user/project that owns the contract, check the available contracts associated with the user/project. Contract name, as well as address for the selected network and when the latest transactions 1240 that interacts with the cybersecurity authentication service may be shown.

Figure 13B:
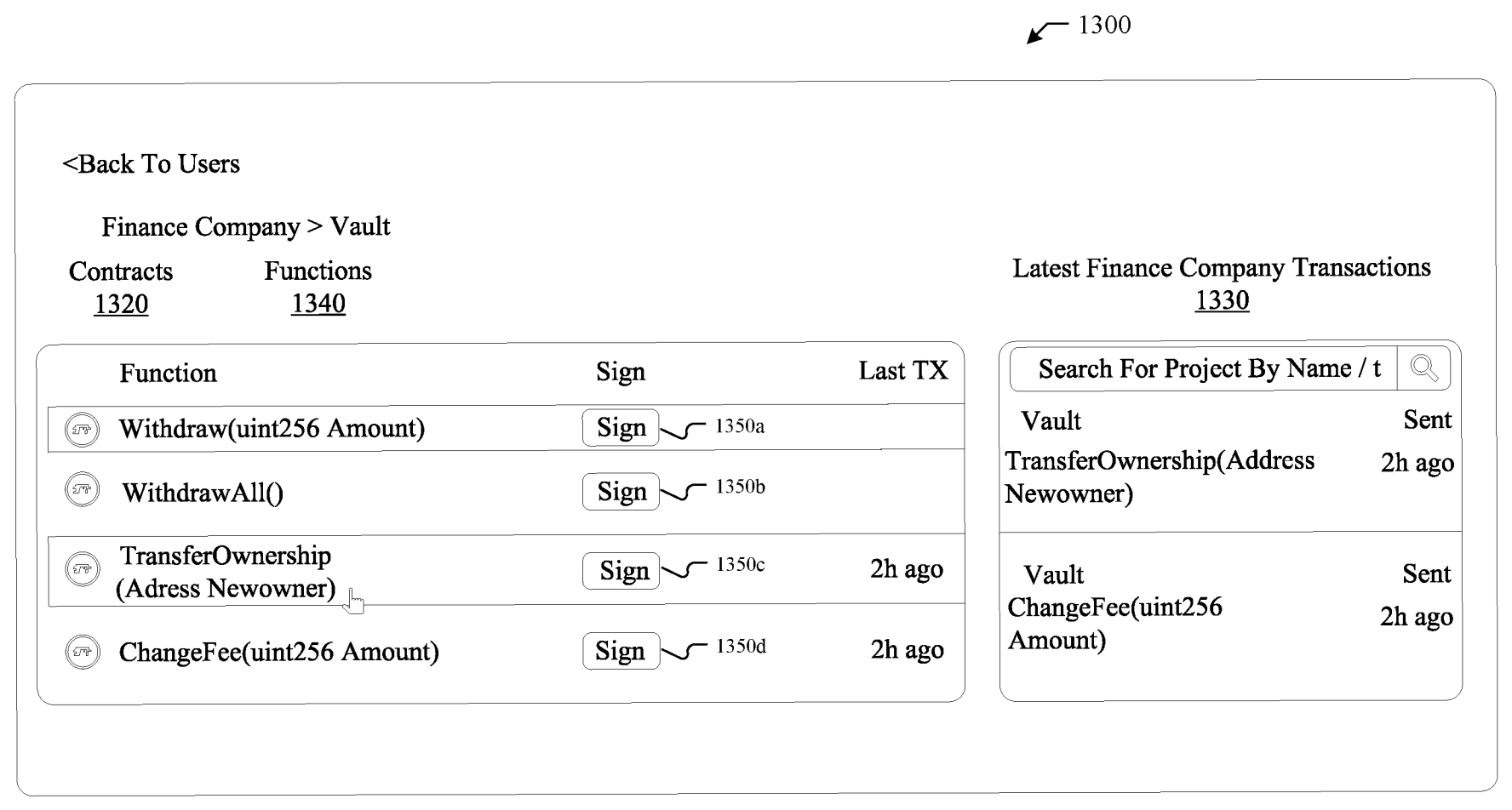

In particular embodiments, the dashboard may allow for checking the functions protected by the cybersecurity authentication service. To be able to see the functions of contracts that are protected by the cybersecurity authentication service, the user may select the user/project that owns the contract, check the available contracts associated by the user/project and select the contract that contains the desired function, and check the protected functions associated with a contract. Function names as well as time when they were last interacted with using the cybersecurity authentication service may be available. FIG. 13A illustrates an example dashboard 1300 showing an available contract. As illustrated in FIG. 13, the user may be "finance company 1310". The contracts 1320 shown may include "vault 1330". For this contract, the dashboard 1300 may show the address and last transaction. The dashboard 1300 may additionally show latest transactions for finance company 1330. FIG. 13B illustrates an example dashboard 1300 showing example protected functions associated with a contract. As illustrated in FIG. 13B, the user may be "finance company 1310". After selecting the contract "vault 1330" as illustrated in FIG. 13A, the dashboard 1300 may show the protected functions 1340 under this contract. For example, the functions 1340 may include "withdraw", "withdrawal( )", "transfer ownership", and "change fee". The user may sign the function using the "sign" 1350 buttons.

Figure 14B:
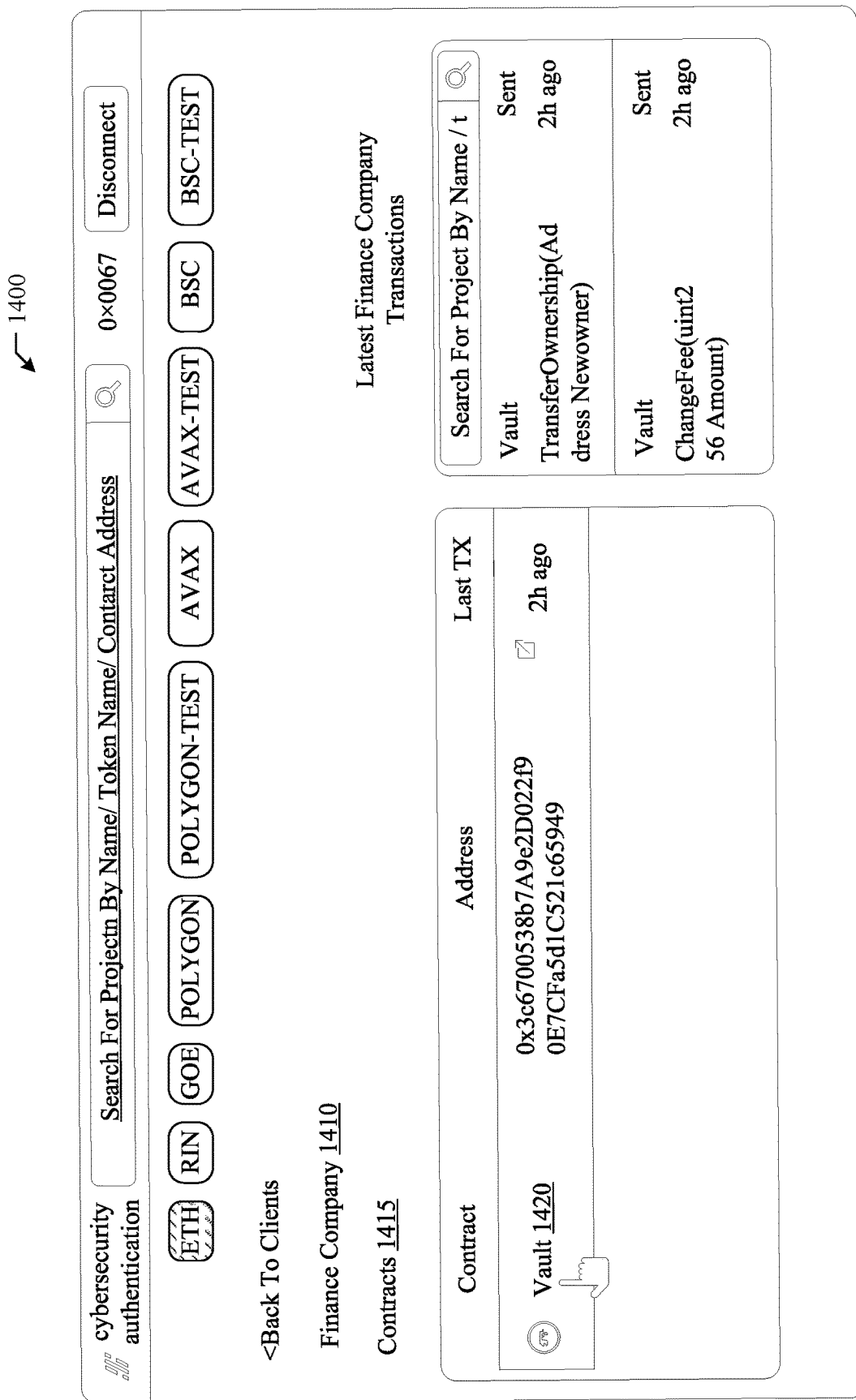

FIGS. 14A-14E illustrate an example process for checking transactions of functions protected by the cybersecurity authentication service. The dashboard 1400 may allow for checking the transactions of functions protected by the cybersecurity authentication service. To be able to see the transactions of functions that are protected by the cybersecurity authentication service, the user may select the user/project 1405 that owns the contract. FIG. 14A shows that "finance company 1410" may be selected. FIG. 14B shows that the user may be able to check the available contracts 1415 associated with the user/project (e.g., "finance company 1410") and select the contract that contains the desired function. For example, the contract "vault 1420" may be selected. FIG. 14C shows that the user may be able to select the function the user wants to check the transactions of from a list of functions 1425 protected under the contract "vault 1420". For example, the functions 1425 may include "withdraw", "withdrawal( )", "transfer ownership", and "change fee". FIG. 14C shows that the function "transfer ownership 1430" is selected. FIG. 14D shows the transactions 1435 associated with the function "transfer ownership 1430". The transactions may be summarized with transaction hash, call data, msg.value, stage, and last transaction. The user may select the transaction, e.g., transaction 1440 as indicated in FIG. 14D. FIG. 14E shows that user may be able to check the transaction detail 1445. For example, the transaction detail 1445 may list the transaction ID, user, contract, function, and call data.

Figure 15A:
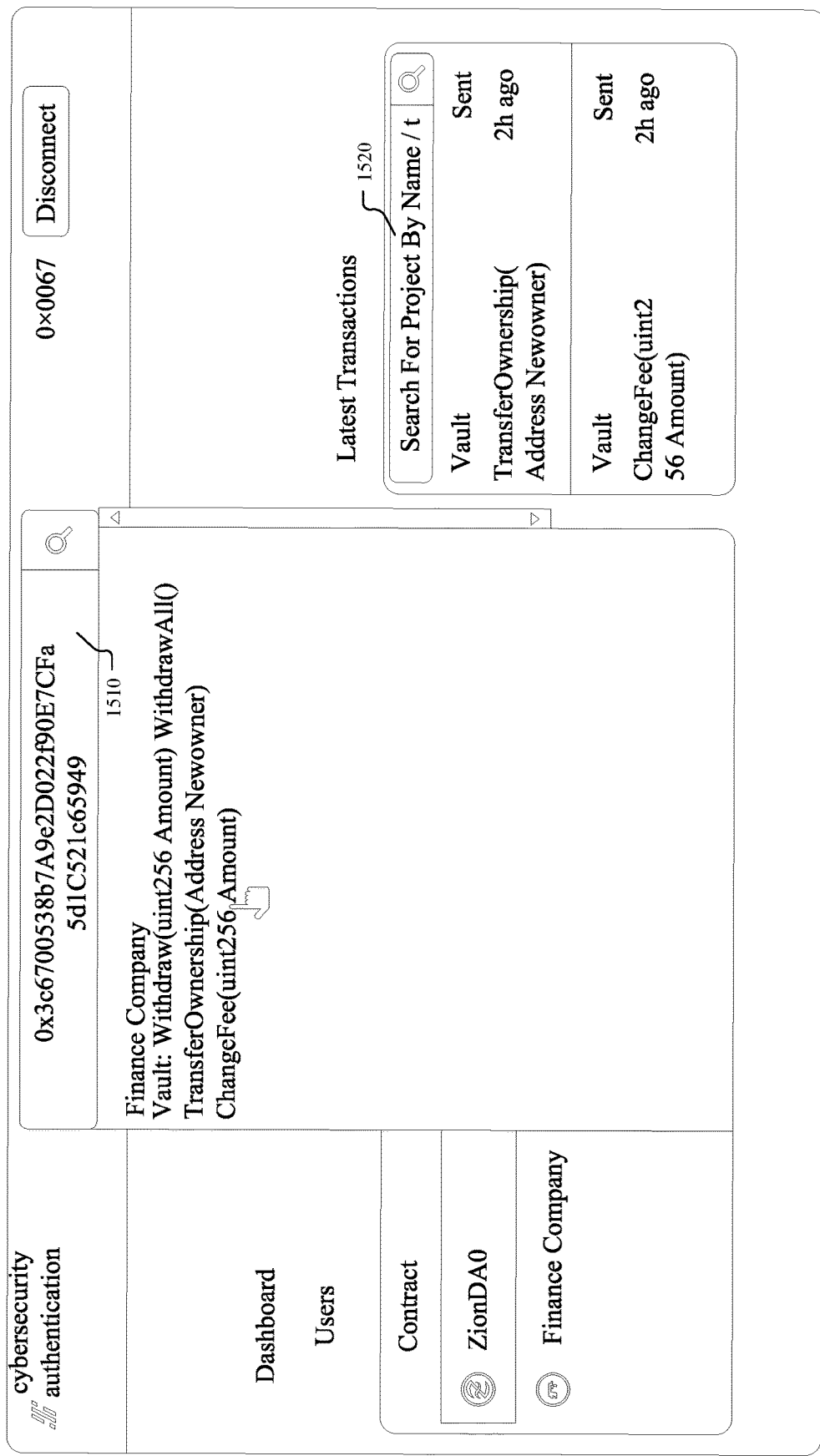
FIGS. 15A-15B illustrate an example dashboard for searching for a specific user, contract, or function.
Figure 15B:
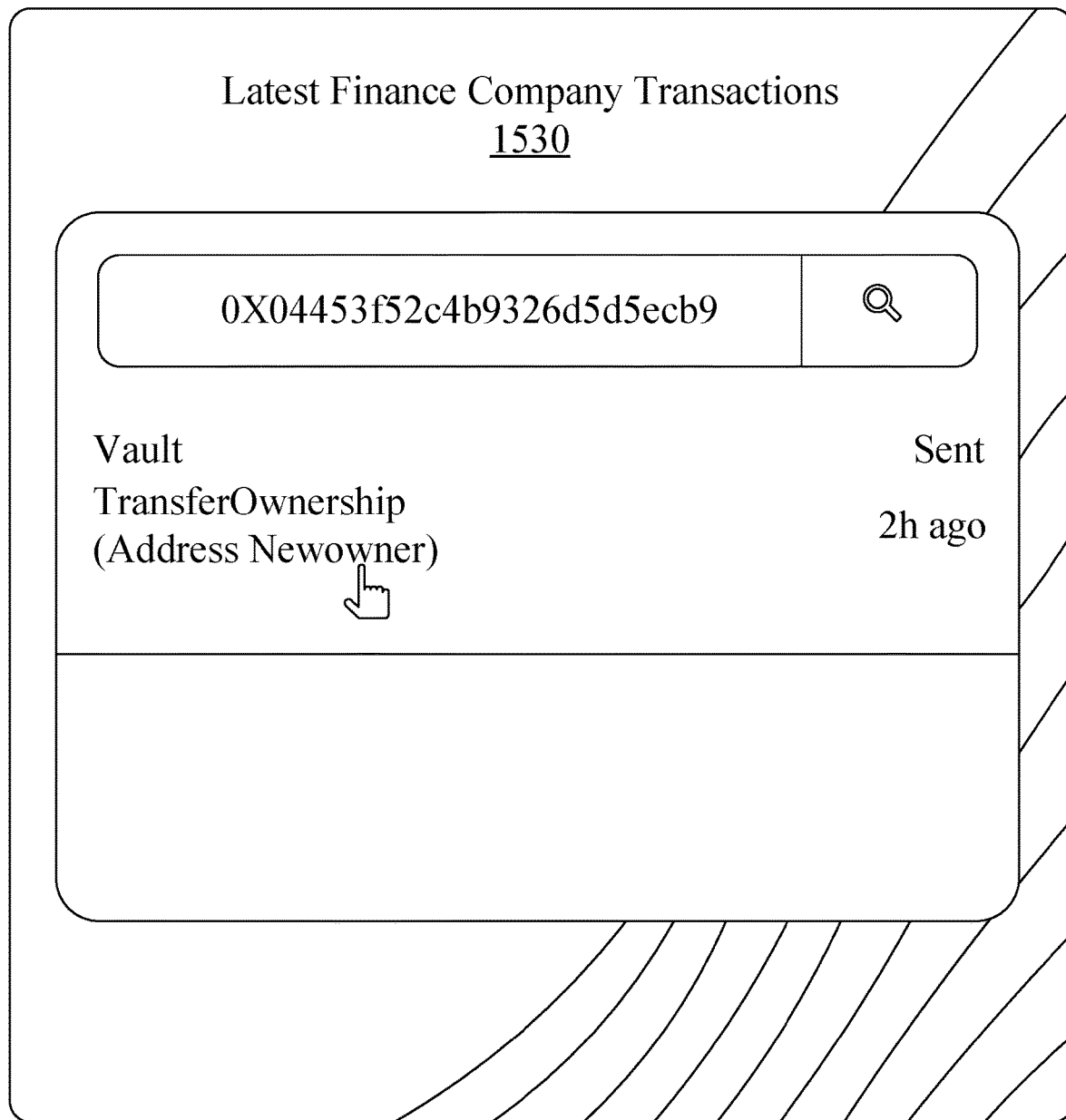

FIGS. 15A-15B illustrates an example dashboard 1500 for searching for a specific user, contract, or function. As illustrated in FIG. 15A, the dashboard 1500 may allow for looking for a specific user, contract or function. Users/projects, contracts and functions may be searched by means of the two search bars 1510-1520 available in the upper part and right part of the page. FIG. 15B illustrates the search result of the latest finance company transactions 1530. As indicated in FIG. 15B, the latest transaction may include the contract "vault" and the "transfer ownership" function.

FIGS. 16A-16C illustrates an example dashboard 1600 for sending a transaction to a function protected by the cybersecurity authentication service. The dashboard may allow for sending a transaction to a function protected by the cybersecurity authentication service. The cybersecurity authentication service may support interacting with transactions and sending functions from the web page. To send a transaction to a function protected by the cybersecurity authentication service, the user may first connect their wallet, select the desired function, and connect the wallet to the correct RPC server. As an example and not by way of limitation, the desired function may be "transfer ownership 1610" as illustrated in FIG. 16A. The user may then select the sign button 1620. FIG. 16B illustrates a confirmation prompt 1630. The user may introduce the necessary data. FIG. 16C illustrates a submission by the user. The user may click submit 1640, and approve and send the transaction on the wallet.

In particular embodiments, an example scenario for the function "emergency withdraw" may be described as follows. During user onboarding, a transaction protocol runbook may be created for this function registered with the cybersecurity authentication service. The contract may be upgraded with the cybersecurity authentication service and may be seen on the front end that it is protected with the cybersecurity authentication service. The function may be in idle state. The user may then sign the "emergency withdraw" function, for which the admin may call the "emergency withdraw" function registered with the cybersecurity authentication service and an event emit may be sent to a server associated with the cybersecurity authentication service for review. During the review of the transaction request, the automated decisional logic module or the incident response team may review the transaction protocol runbook and transaction request information after the alert is received. The cybersecurity authentication service may authorize or deny the transaction, e.g., approving the transaction, unblocking the function, or denying the transaction and set the function back to idle state.

In particular embodiments, an example scenario for DAO proposal may be described as follows. During DAO onboarding, a transaction protocol runbook may be created for governance proposals and the function may be registered with the cybersecurity authentication service. The contract may be upgraded with the cybersecurity authentication service and may be seen on the front end that it is protected with the cybersecurity authentication service. The function may be in idle state. The governance proposal may be accepted, for which the DAO proposal may be sent to the cybersecurity authentication service and a permit may be sent to a server associated with the cybersecurity authentication service for review. During the review of the transaction request, the automated decisional logic module or the incident response team may audit the DAO proposal for malicious intent or vulnerability after the alert is received. The cybersecurity authentication service may authorize or deny the transaction, e.g., approving the transaction, unblocking the function, or denying the transaction and set the function back to idle state.

In particular embodiments, the cybersecurity authentication service may be accessible to third parties, allowing them to authenticate on-chain actions. In other words, the cybersecurity authentication service may be provided as a platform comprising the system components and the operations. The third parties may easily create transaction protocol runbooks used for authentication services for on-chain actions and respond to the transaction protocol runbooks on the provided platform. In particular embodiments, a third party may use the cybersecurity authentication service to allow their users to protect critical functions for owned smart contracts by approving or denying transactions of said functions based on the cybersecurity authentication service. In particular embodiments, a third party may use the cybersecurity authentication service as an automated authentication process. In particular embodiments, a third party may use the cybersecurity authentication service as a manual authentication process. In particular embodiments, a third party may use the cybersecurity authentication service as being based on transaction simulations for both manual and automated authentication processes. In particular embodiments, a third party may make the cybersecurity authentication service easy to integrate with their user's contract.

Figure 17:
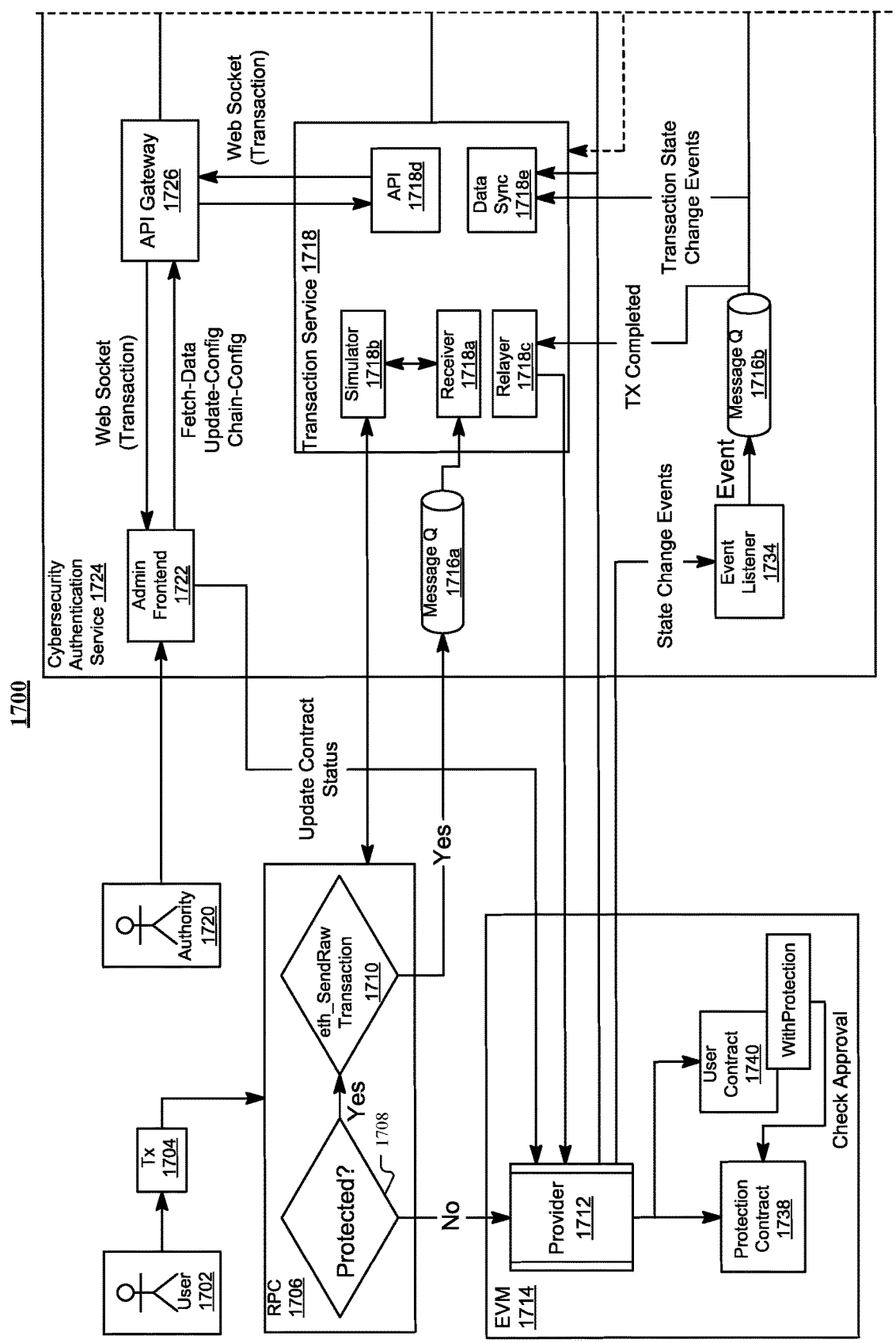
FIG. 17 illustrates an example architecture of the backend implementation of the cybersecurity authentication service as a service off-chain.
Figure 17:
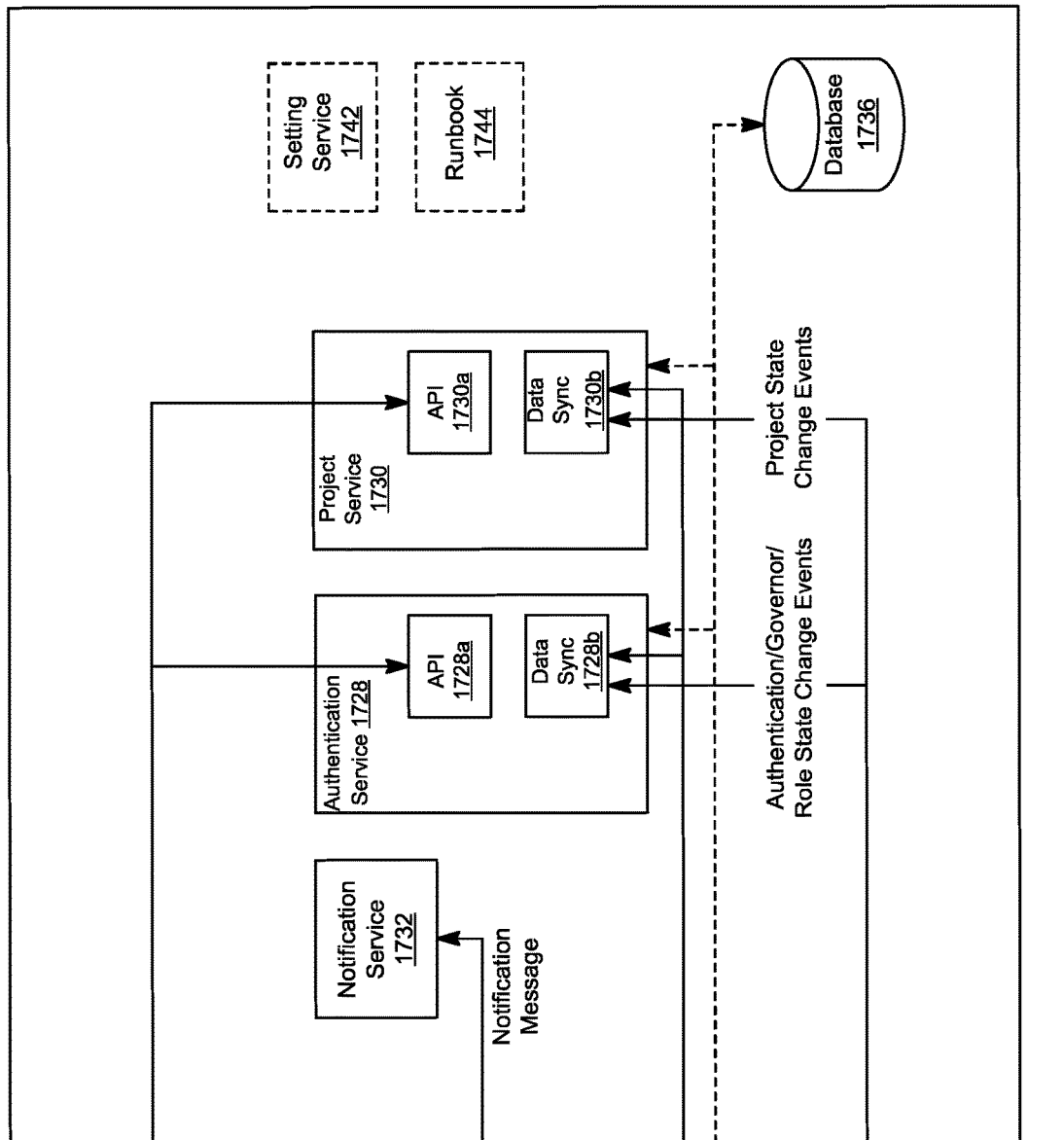

FIG. 17 illustrates an example architecture 1700 of the backend implementation of the cybersecurity authentication service as a service off-chain. In particular embodiments, a user 1702 may execute a transaction 1704. The transaction 1704 may be directed to the RPC server 1706, where it may be checked whether the transaction 1704 is protected by the cybersecurity authentication service at step 1708. If it is protected, the RPC server 1706 may determine the method of the transaction 1704, e.g., "eth_SendRaw Transaction" 1710. If it is not protected, the transaction 1704 may be directed to the provider 1712 on EVM 1714. If the method is "eth_SendRaw Transaction" 1710, the transaction 1704 may be pushed to a message queue 1716a. In particular embodiments, a receiver 1718a of a transaction service 1718 may get the transaction 1704 from the message queue 1716a. The receiver 1718a may then communicate with a simulator 1718b of the transaction service 1718 to simulate transactions. The receiver 1718a may further save the original transaction 1704 and simulated transactions in a database 1736. In particular embodiments, the RPC server 1706 may communicate with the simulator 1718b directly. In particular embodiments, the transaction service may further comprise a relayer 1718c, an API 1718d, and a data synchronizer 1718e.

In particular embodiments, a third-party authority 1720 may access an admin frontend 1722 of the cybersecurity authentication service 1724. The admin frontend 1722 may fetch data, update configurations or chain configurations via an API gateway 1726, which may return a web socket associated with the transaction 1704 to the admin frontend 1722. The API gateway 1726 may communicate with the API 1718d of the transaction service 1718. The API 1718d may expose endpoints for the admin frontend 1722 to obtain data from the database 1736. In particular embodiments, the API 1718d may return a web socket associated with the transaction 1704 to the API gateway 1726.

As illustrated in FIG. 17 (continued), the API gateway 1726 may additionally communicate with an API 1728a of the authentication service 1728 and an API 1730a of the project service 1730 (i.e., user service). Similarly, the API 1728a may expose endpoints for the admin frontend 1722 to obtain data from the database 1736 while the API 1730a may expose endpoints for the admin frontend 1722 to obtain data from the database 1736. The authentication service 1728 may synchronize data with the blockchain, and may be called by the other services. In particular embodiments, the transaction service 1718 may further generate notification messages and send them to a notification service 1732.

Referring back to FIG. 17, the third-party authority 1720 may access the admin frontend 1722 to update contract status with the provider 1712. An event listener 1734 may receive events (e.g., state change events) and contracts from the provider 1712 and push them to their respective workflow message queues. For example, the event listener 1734 may push the state change events to a message queue 1716b. The message queue 1716b may push a transaction completed event to the relayer 1718c, which may then send the original transaction 1704 to the blockchain provider 1712. The message queue 1716b may additionally push transaction state change events to the data synchronizer 1718e, which may be then triggered to search data in the blockchain and synchronize it with the database 1736.

As illustrated in FIG. 17 (continued), the message queue 1716b may further push authentication/governor/role state change events to a data synchronizer 1728b of the authentication service 1728, which may then be triggered to search data in the blockchain and synchronize it with the database 1736. The message queue 1716b may push project state change events to a data synchronizer 1730b of the project service 1730, which may then be triggered to search data in the blockchain and synchronize it with the database 1736.

Referring back again to FIG. 17, the provider 1712 may check both the protection contract 1738 and the user contract 1740 with protection. The user contract 1740 with protection may check approval with the protection contract 1738. In particular embodiments, the provider 1712 may be used to retrieve information to the data synchronizer 1718e on the transaction service 1718, the data synchronizer 1728b on the authentication service 1728, and the data synchronizer 1730b on the project service 1730.

In particular embodiments, the cybersecurity authentication service 1724 may optionally comprise a settings service 1742 and a runbook 1744, as illustrated in FIG. 17 (continued).

Figure 18:
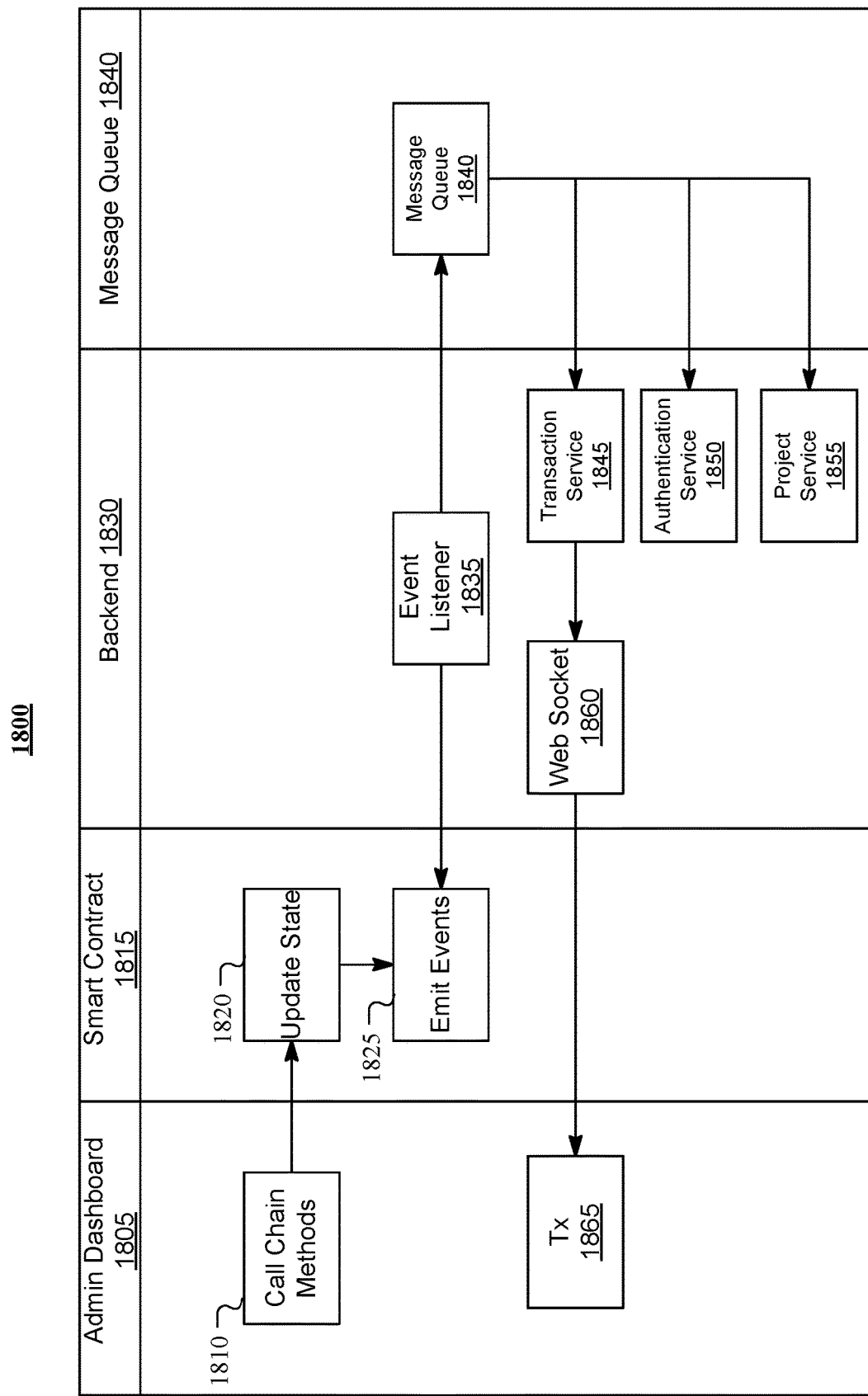
FIG. 18 illustrates an example sequence diagram for the cybersecurity authentication service as a service off-chain.

FIG. 18 illustrates an example sequence diagram 1800 for the cybersecurity authentication service as a service off-chain. In particular embodiments, a third-party authority may use the admin dashboard 1805 to call chain method at step 1810, which may update state on the smart contract 1815 at step 1820. At step 1825, the smart contract 1815 may emit events. At the backend 1830, the event listener 1835 may receive the emitted events and push them to the message queue 1840. The message queue 1840 may then push the events to their respective services, e.g., transaction service 1845, authentication service 1850, and project service 1855. In particular embodiments, the transaction service 1845 may send a web socket 1860 to the transaction 1865 at the admin dashboard 1805.

Figure 19:
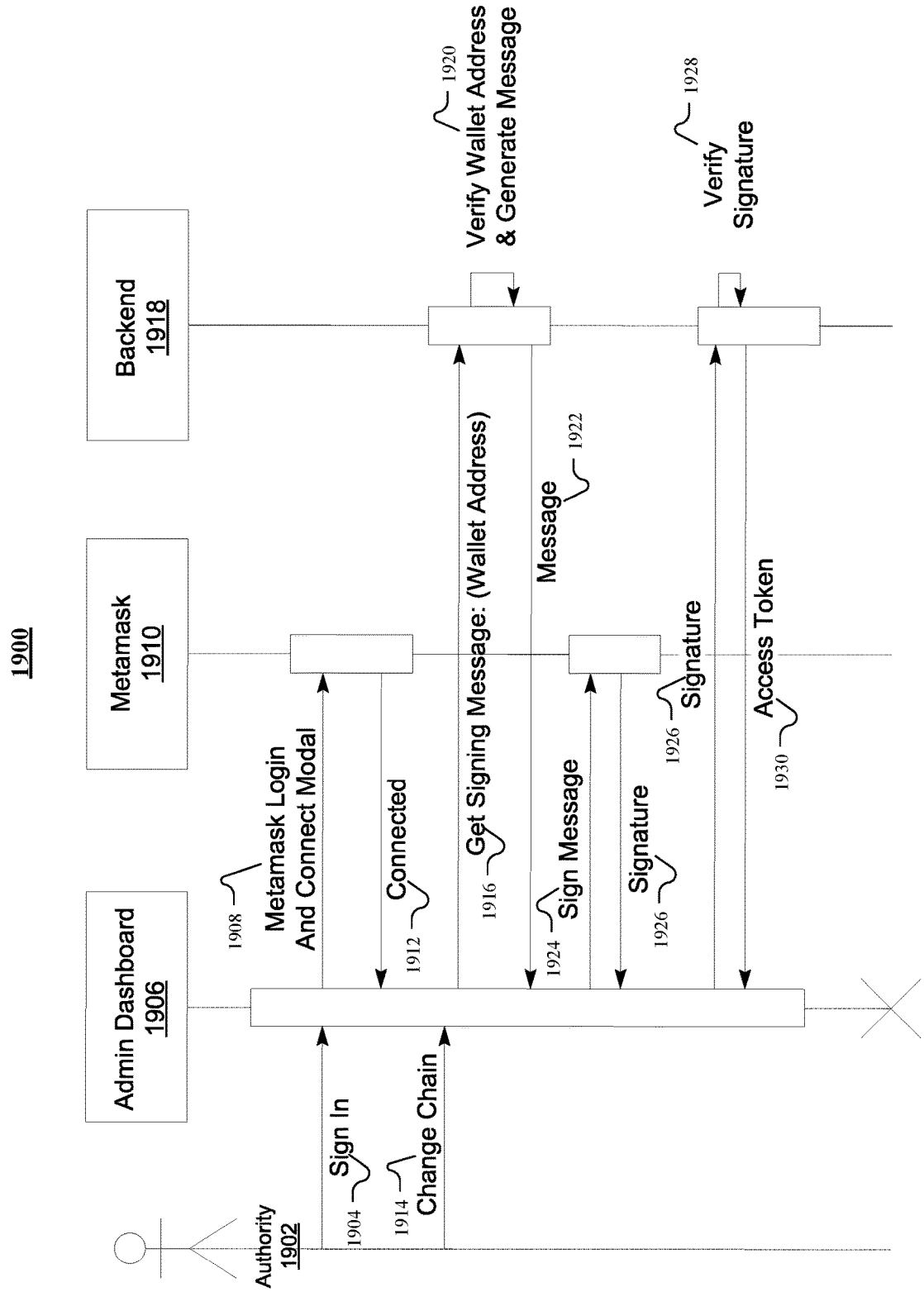
FIG. 19 illustrates an example sequence diagram for using the cybersecurity authentication service as a SaaS.

FIG. 19 illustrates an example sequence diagram 1900 for using the cybersecurity authentication service as a SaaS. A third-party authority 1902 may sign in the admin dashboard 1906 at step 1904. The admin dashboard 1906 may then send the metamask login and connect modal 1908 to the metamask 1910. The metamask 1910 may return a "connected" signal 1912 to the admin dashboard 1906. The third-party authority 1902 may then change chain 1914 on the admin dashboard 1906. The admin dashboard 1906 may then get signing message: (wallet address) 1916 to the backend 1918 of the cybersecurity authentication service. The backend 1918 may verify wallet address and generate message at step 1920. The backend 1918 may further send the message 1922 back to the admin dashboard 1906. The admin dashboard 1906 may then sign the message to metamask 1910 at step 1924. The metamask 1910 may return a signature 1926 to the admin dashboard 1906. The admin dashboard 1906 may further send the signature 1926 to the backend 1918. The backend 1918 may verify signature at step 1928. Once verified, the backend 1918 may send access token 1930 including, e.g., authentication ID, chain ID, and role, to the admin dashboard 1906. As may be seen, there is a customizable login flow that actually uses an ETH-based address signature as a sign-in mechanism to communicate with a traditional (Web2) API.

The following may be a real-world example for providing the cybersecurity authentication service as a platform for a third party. A user Bob may run a DAO protected by the cybersecurity authentication service. The user may go to the front end of the cybersecurity authentication service to update his DAO's contact information. He may sign in with a metamask wallet. In the backend, a standard JSON web token (JWT) may be created which gives him access, based on his permission level within the DAO, to update some of the DAO's off-chain information. User Bob may then use the user interface of the cybersecurity authentication service to update the preferred points of contact. In the backend, the changes may be stored in a traditional, off-chain database. User Bob may see the changes saved successfully and log out.

In particular embodiments, providing the cybersecurity authentication service as a platform for third parties may be based on smart contract specifications as illustrated below. The smart contract specifications may comprise contract features. In particular embodiments, the contract features may comprise a core contract which handles all main functionality of the cybersecurity authentication service.

In particular embodiments, the core contract may be associated with a plurality of structs. A struct may comprise "uint256 waitTime" which indicates the waiting period until the request can be approved. The struct may also comprise "bool autoApproved" which indicates whether the request needs to be approved by the cybersecurity authentication service. As an example and not by way of limitation, the struct may comprise the following example.

- struct RequestOptions {
- uint256 waitTime;
- bool autoApproved;
}

In particular embodiments, a struct may comprise "uint256 totalVoters" which indicates the total number of voters for the permit, "uint256 requiredVoters" which indicates the required approved individual votes to approve a permit, "uint256 acceptedVotes" which indicates the number of approval votes, and "uint256 rejectedVotes" which indicates the number of reject votes. As an example and not by way of limitation, the struct may comprise the following example.

- struct Permit Vote {
- uint256 total Voters;
- uint256 requiredVoters;
- uint256 acceptedVotes;
- uint256 rejectedVotes;
}

In particular embodiments, a struct may comprise "uint256 _id" which is the identifier of the authority, "address_address" which is the address of the authority, "string_name" which is the name of the authority, "bool_verified" which indicates whether the authority is verified by the blockchain cybersecurity platform, and "bool_blacklisted", which indicates whether the authority is blacklisted. As an example and not by way of limitation, the struct may comprise the following example.

- struct Authentication {
- uint256 _id;
- address _address;
- string _name;
- bool _verified;
- bool _blacklisted;
}

In particular embodiments, a struct may comprise "uint256 _id" which is the identifier of the user, "string_name" which is the name of the user, "address_wallet" which indicates the address of the associated wallet for the user, "address_pendingWallet" which indicates the address of the new proposed wallet, "address_authenticator" which indicates the address of the current authentication authority associated with the user, "address _pendingAuthenticator" which indicates the address of the new proposed authentication authority, "uint256 _lastAuthenticatorChange" which indicates the time of the last time the authority was changed, and "bool _isProtected" indicating whether the user is protected by the cybersecurity authentication service. As an example and not by way of limitation, the struct may comprise the following example.

- struct UserData {
- uint256_id;
- string _name;
- address _wallet;
- address _pendingWallet;
- address _authenticator;
- address _pending authenticator;
- uint256 _lastAuthenticatorChange;
- bool _isProtected;
}

In particular embodiments, a struct may comprise "address _address" indicating the address of the contract, "uint256 _userID" indicating the identifier of the user that owns that address, and "bool _isProtected" indicating whether the contract is protected. As an example and not by way of limitation, the struct may comprise the following example.

```
struct ContractData {
    address _address;
    uint256 _userID;
    bool _isProtected;
}
```

In particular embodiments, a struct may comprise "bytes4 _selector" indicating the identifier of the function, "uint256 _requiredVoters" indicating the required approve votes for a transaction to this function to be approved, "bool _isProtected" indicating whether the function is protected by the cybersecurity authentication service, and "bool _isTracked" indicating whether the function is registered on the system. As an example and not by way of limitation, the struct may comprise the following example.

```
struct FunctionData {
    bytes4 _selector;
    uint256 _requiredVoters;
    bool _isProtected;
    // Used since _selector can be 0 for fallback
    bool _isTracked;
}
```

In particular embodiments, a struct may comprise "bytes32 _hash" indicating the hash of the permit, "uint256 _userID" indicating the identifier of the user for who the permit is for, "uint256 _requiredVoters" indicating the required votes to approve the transaction, and "AuthenticationVote _result" indicating the result of the voting (i.e., whether the transaction should be approved). As an example and not by way of limitation, the struct may comprise the following example.

```
struct Permit {
    bytes32 _hash;
    uint256 _userID;
    uint256 _requiredVoters;
    AuthenticationVote _result;
    // PermitVote _permitVote;
    // mapping(address => AuthenticationVote) _permitVoters;
}
```

In particular embodiments, a struct may comprise "address txOrigin" indicating the address of the originator of the transaction, "TxStates state" indicating the state of the current transaction, "mapping (uint256=>Permit) permits" indicating the mapping of the different necessary permits for the transaction, "uint256 totalPermits" indicating the number of total necessary permits, "uint256 pendingPermitsToVote" indicating the number of pending permits to be voted, "uint256 numExecuted" indicating the number of executed calls, and "uint256 createdTimestamp" indicating the number of the block in which the approval was created. As an example and not by way of limitation, the struct may comprise the following example.

```
struct TxCallState {
    address txOrigin;
    TxStates state;
    mapping(uint256 => Permit) permits;
    uint256 totalPermits;
    uint256 pendingPermitsToVote;
    uint256 numExecuted;
    uint256 createdTimestamp;
    // uint256 proposerAuthentication;
}
```

In particular embodiments, a struct may comprise "bool enabled" indicating whether it is enabled to be used as a request and "options" indicating the information about the waiting period and auto approval. As an example and not by way of limitation, the struct may comprise the following example.

```
struct RequestRegister
    bool enabled;
    IAuthentication.RequestOptions options;
}
```

In particular embodiments, a struct may comprise "address callerAddress" indicating the address of the caller for the approval, "address contractAddress" indicating the address of the contracts for which the approval is for, "bytes4 functionSelector" indicating the identifier of the function called to be approved, "bytes callData" indicating the data provided to the function, and "uint256 value" indicating the value (in wei) transferred. As an example and not by way of limitation, the struct may comprise the following example.

```
struct Approvals {
    address callerAddress;
    address contractAddress;
    bytes4 functionSelector;
    bytes callData;
    uint256 value;
}
```

In particular embodiments, the contract features may comprise "enum". As an example and not by way of limitation, the "enum" may comprise the following examples.

```
Enum TxStates {
    NOT_CREATED,
    VOTING,
    ACCEPTED,
    REJECTED,
    EXECUTED
}
enum AuthenticationVote {
    PENDING.
    ACCEPTED,
    REJECTED
}
```

In particular embodiments, the contract features may comprise modifiers. One example modifier may be "userExists". The input for this modifier may comprise "uint256 userID". This modifier may be used to verify that a user exists by using its {userID} identifier. Another example modifier may be "contractExists". The input for this modifier may comprise "address contractAddress". This modifier may be used to verify that a contract exists by using its {contractAddress} identifier. Another example modifier may be "functionExists". The input for this modifier may comprise "address contractAddress" and "bytes4 functionSelector". This modifier may be used to verify that a function for a given contract exists by using its {functionSelector} identifier and the key parent {contractAddress} identifier. Another example modifier may be "onlyAuthenticator", which may be used to verify that the caller is an authentication authority. Another example modifier may be "onlyRequest", which may be used to verify that the caller is an authentication authority and it is responding to a request by a project. Another example modifier may be "authenticatorExists". The input for this modifier may comprise "address_address". This modifier may be used to verify that an authentication authority exists by using its {_address} identifier. Another example modifier may be "onlyAuthenticationAdmin", which may be used to verify that the caller is the admin of the cybersecurity authentication service.

In particular embodiments, the contract features may comprise one or more public variables. As an example and not by way of limitation, one public variable may be "address public admin", which indicates the address of the admin for the cybersecurity authentication service. As another example and not by way of limitation, another public variable may be "mapping (bytes32=>TxCallState) public _txHashState", which indicates the mapping of the transaction hash to TxCallState which is used to store all the calls in order that will be executed on the approved transaction and to verify, during the actual execution, the integrity of it. As another example and not by way of limitation, another public variable may be "mapping (address=>uint256) public walletToUser", which indicates the relation of wallet addresses to userID. As another example and not by way of limitation, another public variable may be "address public lastGovernance Version", which indicates the address of the latest implementation of the protection contract. As another example and not by way of limitation, another public variable may be "address public lastAdminGovernanceVersion", which indicates the address of the latest implementation of the admin contract for the cybersecurity authentication service. As another example and not by way of limitation, another public variable may be "uint256 public totalUsers", which indicates the number of total users.

In particular embodiments, the contract features may comprise one or more internal variables. As an example and not by way of limitation, one internal variable may be "mapping (address=>Authenticator) authenticators", which maps authenticator addresses to authentication objects. As another example and not by way of limitation, another internal variable may be "mapping (uint256=>address) authenticatorID" which maps the authentication authority ID to their address. As another example and not by way of limitation, another internal variable may be "mapping (address=>EnumerableSet.UintSet) authenticatorUsers" which maps an authentication authority to their users. As another example and not by way of limitation, another internal variable may be "uint256 authenticatorsCount", which is a counter of the number of authentication authorities in the system. As another example and not by way of limitation, another internal variable may be "mapping (uint256=>UserData) internal _userTracking" used to track users by mapping their ID to their data. As another example and not by way of limitation, another internal variable may be "mapping (uint256=>EnumerableSet.AddressSet)_userContracts" used to access all contract addresses for a specific user ID. As another example and not by way of limitation, another internal variable may be "mapping (address=>ContractData) internal _contractTracking" used to track registered contracts on the cybersecurity authentication service. As another example and not by way of limitation, another internal variable may be "mapping (address=>uint256)_contractRequestedUserId" used to get the user ID for the given address. As another example and not by way of limitation, another internal variable may be "mapping (address=>bytes4[ ]) internal_contractFunctions" used to access all function selectors for a specific contract address. As another example and not by way of limitation, another internal variable may be "mapping (address=>mapping (bytes4=>FunctionData)) internal function Tracking" used to get a function object based on the contract address and the function selector. As another example and not by way of limitation, another internal variable may be "mapping (uint256=>uint256) userPendingProposal" used to track the current pending proposal of each user. As another example and not by way of limitation, another internal variable may be "mapping (bytes4=>RequestRegister) requestsRegister" used to track which functions can be called in a request. As another example and not by way of limitation, another internal variable may be "uint256 currentRequestUserID" used to track the current request being executed. As another example and not by way of limitation, another internal variable may be "mapping (address=>bytes32) internal_originTxHash" used to track the address originator of the transaction.

In particular embodiments, the contract features may comprise one or more private variables. As an example and not by way of limitation, one private variable may be "bytes32 private constant SIMULATION_SLOT=keccak256 ("SIMULATION_SLOT")", which may be used to indicate the position of the simulation variable.

In particular embodiments, the contract features may comprise different types of public/external functions. The public/external functions may comprise administrative functions. As an example and not by way of limitation, one administrative function may be "initialize". The input for this function may comprise "address initialGovernance Version" indicating the address of the initial governance implementation. The input may also comprise "address initialAdminGovernanceVersion" indicating the address of the initial admin governance implementation. The input may additionally comprise "address[ ] memory admins" which is the list of addresses with the admin role. The input may further comprise "address[ ] memory integrators" which is the list of the addresses with the integrator role. The input may additionally comprise "address[ ] memory approvers" which is the list of addresses with the approver role. This function may be callable by anyone and initialize the cybersecurity authentication service. AN example pseudo code for this function may be as follows.

function initialize (address
initial Governance Version,
address initial AdminGovernance Version,
address[ ] memory admins,
address[ ] memory integrators,
address[ ] memory approvers
)external As another example and not by way of limitation, another administrative function may be "verifyAuthenticator". The input for this function may comprise "address authenticatorAddress" and "bool value." This function may be callable only by the admin of the cybersecurity authentication service and callable only when the contract is not paused. This function may set the verification status for a third-party authority. An example pseudo code for this function may be "function verify Authenticator (address authenticatorAddress, bool value) external only AuthenticatorAdmin authenticatorExists (authenticatorAddress) whenNotPaused."

As another example and not by way of limitation, another administrative function may be "setRequestRegister". The input for this function may comprise "bytes4 selector" indicating the identifier of the function to be added as eligible to be called as a request. The input may also comprise "bool enabled" indicating whether the function can be called as a request. The input may further comprise "IAuthenticationAuthenticator. RequestOptions memory options" comprising the information about the wait period and auto approval "statusCallable" only by the admin of the cybersecurity authentication service. This function may set whether a function can be callable by a project as a request, wait period to execute and if it needs approval from an authentication authority. An example pseudo code for this function may be "function setRequestRegister (bytes4 selector, bool enabled, IAuthenticationAuthenticator.RequestOptions memory options) external only AuthenticationAdmin."

As another example and not by way of limitation, another administrative function may be "setLastGovernanceVersion". The input for this function may comprise "address newImplementation" indicating the address of the new implementation for the governance contract. This function may be callable only by the admin of the cybersecurity authentication service and set the address with the new implementation of the protection contract. An example pseudo code may be "function setLastGovernance Version (address newImplementation) external onlyAuthenticationAdmin. As another example and not by way of limitation, another administrative function may be "setLastAdminGovernanceVersion". The input for this function may comprise "address newImplementation" indicating the address of the new implementation for the governance admin contract. This function may be callable only by the admin of the cybersecurity authentication service and set the address with the new implementation of the admin contract of the cybersecurity authentication service. An example pseudo code may be "function setLastAdminGovernance Version (address newImplementation) external only Authentication Admin.

As another example and not by way of limitation, another administrative function may be "blacklistAuthenticator". The input for this function may comprise "address authenticatorAddress" indicating the address of the authentication authority and "bool value" indicating whether the authentication authority is blacklisted. This function may be callable only by the admin of the cybersecurity authentication service only when the contract is not paused and may set the blacklisted status for a third-party authority. An example pseudo code may be "function blacklistAuthenticator (address authenticatorAddress, bool value) external only AuthenticationAdmin authenticatorExists (authenticatorAddress) whenNotPaused."

As another example and not by way of limitation, another administrative function may be "pause". This function may be callable only by the admin of the cybersecurity authentication service and pause the cybersecurity authentication service. An example pseudo code may be "function pause( ) external onlyAuthenticationAdmin." As another example and not by way of limitation, another administrative function may be "unpause." This function may be callable only by the admin of the cybersecurity authentication service and un-pause the cybersecurity authentication service. An example pseudo code may be "function unpause( ) external only AuthenticationAdmin."

In particular embodiments, the public/external functions may comprise user functions. As an example and not by way of limitation, one user function may be "addUser". The input for this function may comprise "string memory userName" indicating the name of the user to be added. This function may be callable by anyone to register as a user to the cybersecurity authentication service and callable only when the contract is not paused. This function may add a user to the cybersecurity authentication service and associate the address of the sender to that user. An example pseudo code for this function may be "function addUser (string memory userName) external whenNotPaused."

As another example and not by way of limitation, another user function may be "contractRequest". The input for this function may comprise "uint256 userID" which may be the identifier of the user to add the contract to. This function may be callable by a user from a contract who wants to join the cybersecurity authentication service and callable only when the contract is not paused. This function may request to join the cybersecurity authentication service from that contract. An example pseudo code may be "function contractRequest (uint256 userID) external userExists (userID) whenNotPaused."

As another example and not by way of limitation, another user function may be "request". The input for this function may comprise "bytes[ ] memory callDatas" which is the data comprising the functions and arguments used on the request. This function may be callable by a user and callable only when the contract is not paused. This function may create a request. An example pseudo code may be "function request (bytes[ ] memory callDatas) external whenNotPaused."

As another example and not by way of limitation, another user function may be "request_authenticator". The input for this function may comprise "address newAuthenticator" indicating the address of the authentication authority requested. This function may be callable by a user and callable only when the contract is not paused. This function may request a new cybersecurity authentication service. An example pseudo code may be "function request_authenticator (address newAuthenticator) external whenNotPaused."

As another example and not by way of limitation, another user function may be "execute_request". The input for this function may comprise "bytes[ ] memory callDatas", which is the data comprising the function and arguments used on the request. This function may be callable by a user and callable only when the contract is not paused. This function may execute a request on the protection contract. An example pseudo code may be "function execute_request (bytes[ ] memory callDatas) external whenNotPaused."

As another example and not by way of limitation, another user function may be "cancel_request". The input for this function may comprise "uint256 requestID". This function may be callable by a user and callable only when the contract is not paused. This function may cancel a request on the protection contract. An example pseudo code may be "function cancel_request( ) external whenNotPaused."

In particular embodiments, the public/external functions may comprise protection modifiers function. As an example and not by way of limitation, one protection modifiers function may be "checkEnter". The input for this function may comprise "address callerAddress" indicating the address of the caller, "bytes4 functionSelector" indicating the identificatory of the function called, "bytes calldata callData" indicating the input data provided to the function, and "uint256 value" indicating the quantity (in wei) to be transferred. This function may be callable by a contract protected by the cybersecurity authentication service and check that the transaction is approved and arguments do not vary. An example pseudo code may be "function checkEnter (address callerAddress, bytes4 functionSelector, bytes calldata callData, uint256 value) external."

In particular embodiments, the public/external functions may comprise authentication functions. As an example and not by way of limitation, one authentication function may be "createAuthenticator". The input for this function may comprise "string memory authenticatorName" indicating the name of the authentication authority to be added, "address[ ] memory admins" indicating the address of those with the admin role in the authorities, "address[ ] memory integrators" indicating the address of those with the integrator role in the authorities, and "address[ ] memory approvers" indicating the address of those with the approver role in the authorities. This function may be callable by anyone when the contract is not paused and may create (deploy) a new authentication authority with the given arguments. An example pseudo code may be "function createAuthenticator (string memory authenticatorName, address[ ] memory admins, address[ ] memory integrators, address[ ] memory approvers) external whenNotPaused returns (address)."

As another example and not by way of limitation, another authentication function may be "addContractAndFunction". The input for this function may comprise "uint256 userID", "address[ ] memory contractAddresses" indicating the addresses of the contracts to be added, "bytes4[ ][ ] memory functionSelectors" indicating the identifier of the functions to be added, and "uint256 [ ][ ] memory requiredVoters" indicating the required votes to a approve a call for each function. This function may be callable only by a third-party authority and callable only when the contract is not paused. This function may be triggered in response to an approved request. This function may add a contract and function to a user on the cybersecurity authentication service and set both as protected. An example pseudo code may be "function addContractsAndFunctions(address[ ] memory contractAddresses, bytes4[ ][ ] memory functionSelectors, uint256 [ ][ ] memory required Voters) external onlyRequest whenNotPaused."

As another example and not by way of limitation, another authentication function may be "setUserProtected". The input for this function may comprise "uint256 userID" indicating the address of the user and "bool value" indicating whether the user is going to be protected or not. This function may be callable only by a third-party authority and callable only when the contract is not paused. This function may be triggered in response to an approved request. This function may set the protection of a user in the cybersecurity authentication service to value (true or false). An example pseudo code may be "function setUserProtected(bool value) external onlyRequest whenNotPaused."

As another example and not by way of limitation, another authentication function may be "setContractProtected". The input for this function may comprise "address contractAddress" indicating the address of the contract and "bool value" indicating whether the contract is going to be protected or not. This function may be callable only by a third-party authority and callable only when the contract is not paused. This function may be triggered in response to an approved request. This function may set the protection of a contract in the cybersecurity authentication service to value (true or false). An example pseudo code may be "function setFunctionProtected(address contractAddress, bytes4 functionSelector, bool value) external onlyRequest contractExists (contractAddress) functionExists (contractAddress, functionSelector) whenNotPaused."

As another example and not by way of limitation, another authentication function may be "setFunctionProtected". The input for this function may comprise "address contractAddress" indicating the address of the contract containing the function, "bytes4 functionSelector" indicating the identifier of the function, and "bool value" indicating whether the function is going to be protected or not. This function may be callable only by a third-party authority and callable only when the contract is not paused. This function may be triggered in response to an approved request. This function may set the protection of a function in the cybersecurity authentication service to value (true or false). An example pseudo code may be "function setFunctionProtected(address contractAddress, bytes4 functionSelector, bool value) external onlyRequest contractExists (contractAddress) functionExists (contractAddress, functionSelector) whenNotPaused."

As another example and not by way of limitation, another authentication function may be "deactivateUser." The input for this function may comprise "uint256 userID" indicating the address of the user. This function may be callable only by an authentication authority and callable only when the contract is not paused. This function may be triggered in response to an approved proposal and remove the user from the cybersecurity authentication service. An example pseudo code may be "function deactivateUser (uint256 userID) external onlyAuthentication whenNotPaused."

As another example and not by way of limitation, another authentication function may be "acceptUser." This function may be callable only by an authentication authority and callable only when the contract is not paused. This function may be triggered in response to an approved request. This function may add a user to the cybersecurity authentication service. An example pseudo code may be "function acceptUser( ) external onlyRequest whenNotPaused."

As another example and not by way of limitation, another authentication function may be "proposeApproval". The input for this function may comprise "bytes32 txHash" indicating the hash of the transaction to approve, "address txOrigin" indicating the originator of the transaction, "uint256 gasPrice" indicating the gas price of the transaction, and "bytes[ ] calldata approvalsArray" indicating the array of approvals for the transaction. This function may be callable only by a third-party authority and callable only when the contract is not paused. If the proposal is not created, it may create the proposal. If it is already created, it may verify that there was not a change of a third-party authority after the transaction submission for all sub-calls (calls to protected functions). If it was, then the cybersecurity authenticator service may put that sub-call votes on a pending state again. An example pseudo code may be "function proposeApproval (bytes32 txHash, address txOrigin, uint256 gasPrice, bytes[ ] calldata approvalsArray) external onlyNotary whenNotPaused."

As another example and not by way of limitation, another authentication function may be "voteApproval". The input for this function may comprise "bytes32 txHash" indicating the hash of the transaction to vote, "uint256 subCallIndex" indicating the index of the sub call that belongs to the cybersecurity authentication service, and "bool vote" indicating the vote. This function may be callable only by a third-party authority and callable only when the contract is not paused. It may allow third-party authorities to vote whether to approve or reject a transaction by approving or rejecting those calls to the functions they are responsible for (sub-calls). If all authenticators approved the call, then it may be accepted. If only one third-party authority rejects the transaction, it may be rejected. An example pseudo code may be "function voteApproval (bytes32 txHash, uint256 subCallIndex, bool vote) external only Authentication whenNotPaused."

In particular embodiments, the public/external functions may comprise getter functions. As an example and not by way of limitation, one getter function may be "getAuthenticatorByID." The input for this function may comprise "uint256 _id" indicating the identifier of the authority to retrieve the data from. The returns may comprise "Authenticator memory" which is the information of the authority. This function may be callable by anyone and return the authority associated with the provided ID. An example pseudo code may be "function getAuthenticatorByID (uint256 _id) external view returns (Authenticator memory)."

As another example and not by way of limitation, another getter function may be "getAuthenticators". The returns for this function may comprise "Authenticator[ ] memory" which comprise an array of third-party authorities. This function may be callable by anyone and returns all third-party authorities. An example pseudo code may be "function getAuthenticators( ) external view returns (Authenticator[ ] memory)."

As another example and not by way of limitation, another getter function may be "getAuthenticatorUsers". The input for this function may comprise "address authenticatorAddress" indicating the address of the authority to retrieve the users from. The returns for this function may comprise "UserData[ ] memory" which is the information of the users of that authentication authority. This function may be callable by anyone and returns all users for a third-party authority. An example pseudo code may be "function getAuthenticatorUsers(address authenticatorAddress) external view returns (UserData[ ] memory)."

As another example and not by way of limitation, another getter function may be "getTxAuthenticators". The input for this function may comprise "bytes32 txHash" indicating the transaction from which to retrieve the authentication authorities from. The returns may comprise "address[ ] memory_authenticators" indicating the addresses of the authentication authorities for each sub call of the transaction. This function may be callable by anyone and return all third-party authorities for a transaction. An example pseudo code may be "function getTxAuthenticators (bytes32 txHash) external view returns (address[ ] memory)."

As another example and not by way of limitation, another getter function may be "getTxPermitAuthenticator". The input for this function may comprise "bytes32 txHash" indicating the hash of the transaction and "uint256 index" indicating the index of the sub call. The returns may comprise "address" indicating the address of the authentication authority for that sub call. This function may be callable by anyone and return the third-party authority for a sub-call for the transaction. An example pseudo code may be "function getTxPermitAuthenticator (bytes32 txHash, uint256 index) external view returns (address)."

As another example and not by way of limitation, another getter function may be "getTxPermitRequiredVoters". The input for this function may comprise "bytes32 txHash" indicating the hash of the transaction and "uint256 index" indicating the index of the sub call. The returns may comprise "uint256" indicating the number of the required votes to approve that sub call. This function may be callable by anyone and returns the third-party authority for a sub-call for the transaction. An example pseudo code may be "function getTxPermitRequired Voters (bytes32 txHash, uint256 index) external view returns (uint256)."

As another example and not by way of limitation, another getter function may be "getTxPermit". The input for this function may comprise "bytes32 txHash" indicating the hash of the transaction and "uint256 index" indicating the index of the sub call. The returns may comprise "Permit memory" indicating the permit for that sub call. This function may be callable by anyone and return the permit for a sub-call for the transaction. An example pseudo code may be "function getTxPermit(bytes32 txHash, uint256 index) external view returns(Permit memory)."

As another example and not by way of limitation, another getter function may be "getAllUserContracts". The input for this function may comprise "int256 userID" indicating the identificatory of the user. The returns may comprise "ContractData[ ] memory" which is the contract information. This function may be callable by anyone and return all contracts for a user. An example pseudo code may be "function getAllUserContracts (uint256 userID) external view returns (ContractData[ ] memory)."

As another example and not by way of limitation, another getter function may be "getAllContractFunctions". The input for this function may comprise "address contract Address" indicating the contract address. The returns may comprise "FunctionData[ ] memory" which is the information about functions on that contract. This function may be callable by anyone and return all functions associated with a contract. An example pseudo code may be "function getAllContractFunctions(address contractAddress) external view returns (FunctionData[ ] memory)."

As another example and not by way of limitation, another getter function may be "getUser." The input for this function may comprise "uint256 userID" indicating the identificator of the user. The returns may comprise "UserData memory" which is the information of the user. This function may be callable by anyone and return information of the user. An example pseudo code may be "function getUser (uint256 userID) external view returns (UserData memory)."

As another example and not by way of limitation, another getter function may be "getAllUsers". The returns may comprise "UserData[ ] memory" which is user information. This function may be callable by anyone and return all users. An example pseudo code may be "function getAllUsers( ) external view returns (UserData[ ] memory)."

As another example and not by way of limitation, another getter function may be "getPermit." The input for this function may comprise "address callerAddress" indicating the address of the caller, "address contractAddress" indicating the address of the contract for the permit, "bytes4 functionSelector" indicating the function identifier being called, "bytes memory callData" indicating the arguments for that function, "uint256 value" indicating the value (in wei) to be transferred, and "unit gasPrice" indicating the price of the gas on the transaction. The returns may comprise "bytes memory" indicating the arguments ABI encoded. This function may be callable by anyone and return the input arguments ABI encoded (permit). An example pseudo code may be "function getPermit(address callerAddress, address contractAddress, bytes4 functionSelector, bytes memory callData, uint256 value, unit gasPrice) public pure returns (bytes memory)."

As another example and not by way of limitation, another getter function may be "getPermitHash." The input for this function may comprise "address callerAddress" indicating the address of the caller, "address contractAddress" indicating the address of the contract for the permit, "bytes4 functionSelector" indicating the function identifier being called, "bytes memory callData" indicating the arguments for that function, "uint256 value" indicating the value (in wei) to be transferred, and "uint gasPrice" indicating the price of the gas on the transaction. The returns may comprise "bytes32" which is the hash of the input arguments. This function may be callable by anyone and return the keccak256 hash of the input arguments (hash of the permit). An example pseudo code may be "function getPermitHash (address callerAddress, address contractAddress, bytes4 functionSelector, bytes memory callData, uint256 value, uint gasPrice) public pure returns (bytes32)."

As another example and not by way of limitation, another getter function may be "getTxVotes". The input for this function may comprise "bytes32 txHash" indicating the hash of the transaction. The returns may comprise "IAuthentication.PermitVote[ ] memory" which comprises the information about the votes. This function may be callable by anyone and return the current status of the votes for the approval of that transaction. An example pseudo code may be "function getTxVotes (bytes32 txHash) external view returns (IAuthentication.PermitVote[ ] memory)."

As another example and not by way of limitation, another getter function may be "functionProtected". The input for this function may comprise "address contractAddress" indicating the address of the contract containing the function to check and "bytes4 functionSelector" indicating the identifier of the function to check. The returns may comprise "bool" indicating whether the function is protected. This function may be callable by anyone and return whether a function is protected. An example pseudo code may be "function functionProtected(address contractAddress, bytes4 functionSelector) public view returns(bool)."

As another example and not by way of limitation, another getter function may be "contractProtected". The input for this function may comprise "address contractAddress" indicating the address of the contract to check. The returns may comprise "bool" indicating whether the contract is protected. This function may be callable by anyone and return whether a contract is protected. An example pseudo code may be "function contractProtected(address contractAddress) public view returns(bool)."

As another example and not by way of limitation, another getter function may be "userProtected". The input for this function may comprise "uint256 userID" indicating the identificatory of the user to check. The returns may comprise "bool" indicating whether the user is protected. This function may be callable by anyone and return whether a user is protected. An example pseudo code may be "function userProtected(uint256 userID) external view returns(bool)."

In particular embodiments, the contract features may comprise one or more private functions. As an example and not by way of limitation, one private function may be "is simulation." The returns for this function may comprise "bool is_simulation" indicating whether the current execution is a simulation. This function may return whether the current execution is a simulation. An example pseudo code may be "function_is_simulation( ) private view returns (bool is_simulation)."

In particular embodiments, the contract features may comprise one or more internal functions. As an example and not by way of limitation, one internal function may be "addAuthenticator." The input for this function may comprise "string memory authenticatorName" which is the name of the third-party authority. The input may also comprise "address authenticatorAddress" which is the address of the authority. This internal function may be used to add a third-party authority to the system. An example pseudo code may be "function _addAuthenticator(string memory authenticatorName, address authenticatorAddress) internal."

As another example and not by way of limitation, another internal function may be "_request." The input for this function may comprise "uint256 userID" indicating the identifier of the user that creates the request, "address authenticatorAddress" indicating the address of the authority for whom the request is for, and "bytes[ ] memory callDatas" comprising the information about the functions and arguments called on the request. This function may create a request. An example pseudo code may be "function_request(uint256 userID, address authenticatorAddress, bytes[ ] memory callDatas) internal."

As another example and not by way of limitation, another internal function may be "_userRemoveCurrentAuthenticator." The input for this function may be "uint256 userID" indicating the identificator of the user to remove the authority from. This function may remove an authentication authority from a user. An example pseudo code may be "function _userRemoveCurrentAuthenticator (uint256 userID) internal whenNotPaused."

As another example and not by way of limitation, another internal function may be "isContract." The input for this function may comprise "address addr" indicating the address to check. This function may check if the input address is a contract. An example pseudo code may be "function _isContract (address addr) internal view returns (bool)."

As another example and not by way of limitation, another internal function may be "addContractToUser." The input for this function may comprise "uint256 userID" indicating the identifier of the user and "address contractAddress" indicating the address of the contract to add to the user. This function may add a contract to a user. An example pseudo code may be "function _addContractToUser(uint256 userID, address contractAddress) internal."

As another example and not by way of limitation, another internal function may be "addFunctionToContract." The input for this function may comprise "address contractAddress" indicating the address of the contract to add the function from, "bytes4 functionSelector" indicating the identifier of the function to add, and "uint256 requiredVoters" indicating the required voters to approve a transaction to that function. This function may add a function to a user. An example pseudo code may be "function _addFunctionToContract (address contractAddress, bytes4 functionSelector, uint256 requiredVoters) internal."

As another example and not by way of limitation, another internal function may be "_decode_approval_data." The input for this function may comprise "bytes calldata approvalsArray" which is the data to decode. This function may decode the approval data on the array and convert it into a struct. An example pseudo code may be "function _decode_approval_data (bytes calldata approvalsArray) internal pure returns (Approvals memory)."

As another example and not by way of limitation, another internal function may be "_proposeApproval." The input for this function may comprise "TxCallState storage_state" indicating the information about the transaction approval, "address txOrigin" indicating the originator of the transaction, "uint256 gasPrice" indicating the gas price used on the transaction, and "bytes[ ] calldata approvalsArray" indicating the data related to the approval. This function may create an approval with the given data. An example pseudo code may be "function _proposeApproval (TxCallState storage_state, address txOrigin, uint256 gasPrice, bytes[ ] calldata approvalsArray) internal."

As another example and not by way of limitation, another internal function may be "_verifyApproval." The input for this function may comprise "TxCallState storage_state" indicating the information about the transaction approval. This function may verify that the current authentication authority is the one approving the transaction. An example pseudo code may be "function_verifyApproval (TxCallState storage_state) internal."

As another example and not by way of limitation, another internal function may be "_createAuthenticator." The input for this function may comprise "string memory authenticatorName" indicating the name of the authentication authority to be added, "address[ ] memory admins" indicating the address of those with the admin role in the authorities, "address[ ] memory integrators" indicating the address of those with the integrator role in the authorities, and "address[ ] memory approvers" indicating the address of those with the approver role in the authorities. This function may create an authentication authority with the given data. An example pseudo code may be "function createAuthenticator (address version, string memory authenticatorName, address[ ] memory admins, address[ ] memory integrators, address[ ] memory approvers) internal returns (address)."

As another example and not by way of limitation, another internal function may be "_verify Authenticator." The input for this function may comprise "address authenticator Address" indicating the address of the authority to verify and "bool value" indicating whether the authority is verified. This function may verify or un-verify a provided authentication authority. An example pseudo code may be "function _verify Authenticator (address authenticatorAddress, bool value) internal."

In particular embodiments, the contract features may additionally comprise a protection contract, which may hold all the governance and authentication related processes. In particular embodiments, the protection contract may be associated with a plurality of structs. A struct may comprise "int256 waitTime" indicating the waiting period until the request can be approved and "bool autoApproved" which indicates whether the request needs to be approved by the authority. An example struct may be as follows.

```
• struct RequestOptions {
    uint256 waitTime;
    bool autoApproved;
  }
```

In particular embodiments, a struct may comprise "uint256 total Voters" indicating the total number of voters for the permit, "uint256 requiredVoters" indicating the required approved individual votes to approve a permit, "uint256 acceptedVotes" indicating the number of approval votes, and "uint256 rejected Votes" indicating the number of rejected votes. An example struct may be as follows.

```
• struct PermitVote {
    uint256 totalVoters;
    uint256 requiredVoters;
    uint256 acceptedVotes;
    uint256 rejectedVotes;
  }
```

In particular embodiments, a struct may comprise "uint id" indicating the identifier of the proposal, "address proposer" indicating the creator of the proposal, "uint startTime" indicating the time at which the proposal begins, "uint endTime" indicating the time at which voting ended, "uint waitPeriod" indicating the time from which execution is allowed (add to votedTime), "bytes32 callDataHash" indicating the hash of the data provided on the proposal, "ProposalState state" indicating the state of this proposal, "uint256 targetRole" indicating the role that needs to vote and approve this proposal, "uint256 userID" indicating the ID of the user that created the proposal (if applicable), "uint256 totalVoters" indicating the number of total voters for that proposal, "uint256 requiredVotes" indicating the number of required approve votes to approve the proposal, "uint256 votesFor" indicating the number of votes in favor of approving the proposal, "uint256 votesAgainst" indicating the number of votes against approving the proposal, and "mapping (address=>Proposal Vote) votes" indicating the receipts of ballots for the entire set of voters. An example struct may be as follows.

```
• struct Proposal {
    /// @notice Unique id for looking up a proposal
    uint id;
    /// @notice Creator of the proposal
    address proposer;
    /// @notice The time at which the proposal begins.
    uint startTime;
    /// @notice The time at which voting ended
    uint endTime;
    /// @notice The time from which execution is allowed (add to votedTime)
    uint waitPeriod;
    bytes32 callDataHash;
    /// @notice The state of this proposal
    ProposalState state;
    uint256 targetRole;
    uint256 userID;
    uint256 totalVoters;
    uint256 requiredVotes;
    uint256 votesFor;
    uint256 votesAgainst;
    /// @notice Receipts of ballots for the entire set of voters
    /// for each calldata
    /// 0 -> no vote, 1 -> vote for, 2 -> vote against
    mapping(address => ProposalVote) votes;
```

In particular embodiments, a struct may comprise "uint256 acceptedVotes" indicating the number of approve votes for the permit, "uint256 rejectedVotes" indicating the number of rejected votes for the permit, and "mapping (address=>bool) voters" indicating the receipts of ballots for the entire set of votes. An example struct may be as follows.

```
• struct Permit Voting {
    uint256 acceptedVotes;
    uint256 rejectedVotes;
    mapping(address => bool) voters;
  }
```

In particular embodiments, a struct may comprise "EnumerableSet.AddressSet members" indicating members of that role and "uint256 requiredVotes" indicating the required number of approve votes for that role. An example struct may be as follows.

```
• struct RoleData {
    EnumerableSet.AddressSet members;
    uint256 requiredVotes;
  }
```

In particular embodiments, the protection contract may be associated with "enum." Some example "enums" may be as follows.

- /// @notice Possible states that a proposal may be in enum ProposalState {
    NotCreated,
    Voting,
    Canceled,
    Defeated,
    Succeeded,
    Executed
    }
- enum ProposalVote { NotVoted,
    For,
    Against
    }

In particular embodiments, the protection contract may be associated with one or more public variables. As an example and not by way of limitation, one public variable may be "uint256 constant public ADMIN_ROLE=0x0" indicating the identifier for the admin role. As another example and not by way of limitation, another public variable may be "uint256 constant public INTEGRATOR_ROLE=0x1" indicating the identifier for the integrator role. As another example and not by way of limitation, another public variable may be "uint256 constant public APPROVER_ROLE=0x2" indicating the identifier for the approver role. As another example and not by way of limitation, another public variable may be "IAuthentication public authentication" indicating implementation of the cybersecurity authentication service. As another example and not by way of limitation, another public variable may be "mapping (uint=>Proposal) public proposals" which is the official record of all proposals ever proposed. As another example and not by way of limitation, another public variable may be "uint public proposalCount" indicating the total number of proposals. As another example and not by way of limitation, another public variable may be "mapping (address=>uint) public latestProposalIds" which includes the latest proposal for each proposer. As another example and not by way of limitation, another public variable may be "mapping (bytes32=>mapping (uint256=>PermitVoting)) public override txHashPermitVotes" which maps the transaction hash to the permit index and the "PermitVoting" for that index.

In particular embodiments, the protection contract may be associated with one or more internal variables. As an example and not by way of limitation, one internal variable may be "uint256 constant MAX_ROLE=0x3" which is the maximum number of roles. As another example and not by way of limitation, another internal variable may be "mapping (uint256=>RoleData) internal_roles" which maps each role with their data. As another example and not by way of limitation, another internal variable may be "bool internal initialized" indicating whether the contract is initialized. As another example and not by way of limitation, another internal variable may be "mapping (bytes4=>uint) internal_actionRole" which maps the action role for the function selector.

In particular embodiments, the protection contract may be associated with one or more modifiers. As an example and not by way of limitation, one modifier may be "onlyAuthenticator" which is a modifier used to verify that the caller is the protection contract. As another example and not by way of limitation, another modifier may be "onlyAuthentication" which is a modifier used to verify that the caller is the cybersecurity authentication service. As another example and not by way of limitation, another modifier may be "initializer" which is a modifier used to verify that a contract is initialized.

In particular embodiments, the protection contract may be associated with one or more proposal related functions. One example function may be "proposeRequest." The input for this function may comprise "address requester" indicating the address of the creator of the request, "uint256 userID" indicating the identifier of the user that create the request, "bytes[ ] memory callDatas" indicating the functions and input data for the request, and "RequestOptions memory requestOptions" comprising the information about the wait time necessary to execute the request and whether it needs to be approved. The returns may comprise "uint256 newProposal.id" which is the ID of the request created. Only the cybersecurity authentication service may propose that action. This function may propose a new request and create a request with, but not limited to, the following actions: addContractsAndFunctions, setContractProtected, setFunctionProtected, acceptUser. This function may need to be called by request, request_authenticator. An example pseudo code may be "function proposeRequest (address requester, uint256 userID, bytes[ ] memory callDatas, RequestOptions memory requestOptions) external override only Authentication returns (uint256)."

Another example proposal related function may be "propose." The inputs for this function may comprise "bytes[ ] memory callDatas" indicating the information about functions and arguments to call in the proposal and "string memory description" which is the description of the proposal. The returns may comprise "uint256 newProposal.id" which is the ID of the new proposal. Only those with the admin role may propose. This function may propose a new proposal and create a request with, but not limited to, the following actions: grantAdmin, revokeAdmin, grantIntegrator, revokeIntegrator, grantApprover, revokeApprover, setRequiredVotes, update. An example pseudo code may be "function propose (bytes[ ] memory callDatas, string memory description) external returns (uint256)."

Another example proposal related function may be "reportUser." The inputs for this function may comprise "uint256 userID" indicating the user identifier to report and "string memory description" which is a description of why the report is made. The returns may comprise "uint256 newProposal.id" which is the ID of the new proposal. Only those with the integrator role may propose. This function may propose to remove user(s) and create a request with the following actions: deactivateUser. An example pseudo code may be "function reportUser(uint256 userID, string memory description) external returns(uint256)."

Another example proposal related function may be "execute." The inputs for this function may comprise "uint proposalId" indicating the proposal to be executed and "bytes[ ] memory callDatas" indicating the information about functions and arguments to call in the proposal. This function may execute any type of proposals (created by proposeRequest, propose). An example pseudo code may be "function execute (uint proposalId, bytes[ ] memory callDatas) override external."

Another example proposal related function may be "cancel." The inputs for this function may comprise "uint proposalId" indicating the proposal ID to cancel. This function may allow canceling a proposal (created by proposeRequest, propose) as long as the sender is the creator of the proposal. An example pseudo code may be "function cancel (uint proposalId) override external."

Another example proposal related function may be "voteProposal." The inputs for this function may comprise "uint proposalId" indicating the proposal identifier to vote and "bool support" indicating whether the proposal if supported. This function may allow voting a proposal (created by proposeRequest, propose, propose_deactivate_client) as long as the caller has the appropriate role for the proposal. An example pseudo code may be "function voteProposal (uint proposalId, bool support) public."

In particular embodiments, the protection contract may be associated with transaction approval/rejection. As an example and not by way of limitation, one function may be "voteApproval." The input for this function may comprise "bytes32 txHash" indicating the hash of the transaction being voted, "address txOrigin" indicating the address of the originator of the transaction, "uint256 gasPrice" indicating the gas price of the transaction, "bytes[ ] calldata approvalsArray" indicating the data related to the approval, "uint256[ ] memory voteIndexes" indicating the indexes of the sub call to vote, "bool[ ] memory votes" indicating the votes, and "string[ ] memory rejectReasons" indicating the reasons of rejection (if applicable). Only those with the approver role may call this function. This function may allow voting to approve or reject a transaction. An example pseudo code may be "function voteApproval (bytes32 txHash, address txOrigin, uint256 gasPrice, bytes[ ] calldata approvalsArray, uint256[ ] memory voteIndexes, bool[ ] memory votes, string[ ] memory rejectReasons) external."

In particular embodiments, the protection contract may be associated with one or more getter functions. As an example and not by way of limitation, one getter function may be "VERSION", which may return the current version number. An example pseudo code may be "function VERSION( ) external pure virtual returns (string memory)."

As another example and not by way of limitation, another getter function may be "getActionRole." The input for this function may comprise "bytes4 functionSelector" indicating the function selector to retrieve the role. The returns may comprise "uint" indicating the role that needs to approve that function. This function may be callable by anyone and return the role that is able to approve that function. An example pseudo code may be "function getActionRole (bytes4 functionSelector) public view returns (uint)."

As another example and not by way of limitation, another getter function may be "getAdmins." The returns for this function may comprise "address[ ] memory" which is a list of addresses with the admin role. This function may be callable by anyone and return the list of addresses with the admin role. An example pseudo code may be "function getAdmins ( ) external view returns (address[ ] memory)."

As another example and not by way of limitation, another getter function may be "getIntegrators." The returns for this function may comprise "address[ ] memory" which is a list of addresses with the integrator role. This function may be callable by anyone and return the list of addresses with the integrator role. An example pseudo code may be "function getIntegrators( ) external view returns (address[ ] memory)."

As another example and not by way of limitation, another getter function may be "getApprovers." The returns for this function may comprise "address[ ] memory" which is a list of addresses with the approver role. This function may be callable by anyone and return the list of addresses with the approver role. An example pseudo code may be "function getApprovers( ) external view returns (address[ ] memory)."

As another example and not by way of limitation, another getter function may be "getRoleMembersCount." The input for this function may comprise "uint256 role" indicating the role to get the count. The returns may comprise "uint256" indicating the number of members for that role. This function may be callable by anyone and return the number of members for that role. An example pseudo code may be "function getRoleMembersCount (uint256 role) public view override returns (uint256)."

As another example and not by way of limitation, another getter function may be "hasRole." The input for this function may comprise "uint256 role" indicating the role to check and "address account" indicating the address to check. The returns may comprise "bool indicating whether the account has the role. This function may be callable by anyone and return whether the checked account has the role. An example pseudo code may be "function hasRole (uint256 role, address account) public view override returns(bool)."

As another example and not by way of limitation, another getter function may be "getRequiredVotes." The input for this function may comprise "uint256 role" indicating the role to check. The returns may comprise "uint256" indicating the number of required votes for a role. This function may be callable by anyone and return the number of required votes to approve a proposal for a role. An example pseudo code may be "function getRequiredVotes (uint256 role) public view returns (uint256)."

As another example and not by way of limitation, another getter function may be "get Votes." The input for this function may comprise "uint proposalId" indicating the identifier of the proposal to check. The returns may comprise "uint256 totalVoters" indicating the number of the total voters for the proposal, "uint256 requiredVotes" indicating the number of the required votes for that proposal to pass, "uint256 votesFor" indicating the number of votes in favor for that proposal, and "uint256 votesAgainst" indicating the number of votes against that proposal. This function may be callable by anyone and return the state of the votes for a proposal. An example pseudo code may be "function getVotes(uint proposalId) external view returns (uint256 total Voters, uint256 requiredVotes, uint256 votesFor, uint256 votesAgainst)."

As another example and not by way of limitation, another getter function may be "getVote." The input for this function may comprise "uint proposalId" which is the identifier of the proposal to check and "address voter" which is the address of the voter to check. The returns may comprise "Proposal Vote vote" which is the vote of the provided for the checked proposal. This function may be callable by anyone and return what a certain address has voted in a proposal. An example pseudo code may be "function getVote (uint proposalId, address voter) external view returns (Proposal Vote vote)."

As another example and not by way of limitation, another getter function may be "getImplementation." This function may be callable by anyone and return the current implementation. An example pseudo code may be "function getImplementation( ) external view returns(address)."

In particular embodiments, the protection contract may be associated with one or more internal functions. As an example and not by way of limitation, one internal function may be "_setActionRole." The input for this function may comprise "bytes4 functionSelector" indicating the function identifier to set the role to and "uint256 role" indicating the role to assign to that function. This function may assign a role to a function. An example pseudo code may be "function _setActionRole (bytes4 functionSelector, uint256 role) internal." As another example and not by way of limitation, another internal function may be "_setupRequiredVotes." The input for this function may comprise "uint256 role"

indicating the role to modify and "uint256 newVotes" indicating the new number of required votes for a proposal involving that role to pass. This function may modify the required number of positive votes needed for a role to pass a proposal. An example pseudo code may be "function _setupRequiredVotes(uint256 role, uint256 newVotes) internal."

As another example and not by way of limitation, another internal function may be "_grantRole." The input for this function may comprise "uint256 role" indicating the role to modify and "address account" indicating the address of the account to grant the role. This function may grant a role to an account. An example pseudo code may be "function _grantRole(uint256 role, address account) internal." As another example and not by way of limitation, another internal function may be "_revokeRole." The input for this function may comprise "uint256 role" indicating the role to modify and "address account" indicating the address of the account to revoke the role. This function may revoke a role to an account. An example pseudo code may be "function _revokeRole (uint256 role, address account) internal."

As another example and not by way of limitation, another internal function may be "_castVote." The input for this function may comprise "Proposal storage proposal" indicating the proposal to vote, "address sender" indicating the address of the account sending the vote, and "bool support" indicating the vote. This function may vote on a certain proposal. An example pseudo code may be "function _castVote (Proposal storage proposal, address sender, bool support) internal." As another example and not by way of limitation, another internal function may be "_setupRole." The input for this function may comprise "uint256 role" indicating the role to set and "address[ ] memory members" comprising a list of addresses to be members of the role. This function may assign a role to a list of addresses. An example pseudo code may be "function _setupRole (uint256 role, address[ ] memory members) internal."

As another example and not by way of limitation, another internal function may be "_proposeAuthenticator." The input for this function may comprise "address proposer" indicating the address of the proposer, "bytes[ ] memory callDatas" indicating the data containing the functions and arguments used on the proposal, and "string memory description" which is description of the proposal. The returns may comprise "Proposal storage newProposal" indicating the proposal created. This function may create a proposal from the authentication authority members. An example pseudo code may be "function proposeAuthenticator (address proposer, bytes[ ] memory callDatas, string memory description) internal returns (Proposal storage newProposal).

As another example and not by way of limitation, another internal function may be" _proposeRequest." The input for this function may comprise "address proposer" indicating the address of the proposer, "bytes[ ] memory callDatas" indicating the data containing the functions and arguments used on the request, "string memory description" which is a description of the request, "uint256 userID" indicating the identifier of the creator of the request, and "RequestOptions memory requestOptions" comprising information about the wait time necessary to execute the request and whether it needs to be approved. The returns may comprise "Proposal storage newProposal" indicating the request created. This function may create a request. An example pseudo code may be "function proposeRequest (address proposer, bytes[ ] memory callDatas, string memory description, uint256 clientId, RequestOptions memory requestOptions) internal returns (Proposal storage newProposal)."

As another example and not by way of limitation, another internal function may be "_proposeGeneric." The input for this function may comprise "uint256 targetRole" indicating the role that is capable of voting in the proposal, "address proposer" indicating the address of the proposer, "bytes[ ] memory callDatas" indicating the data containing the functions and arguments used on the proposal, "string memory description" which is a description of the proposal, "uint256 userID" indicating the identifier of the creator of the proposal, and "RequestOptions memory requestOptions" comprising information about the wait time necessary to execute the request and whether it needs to be approved. The returns may comprise "Proposal storage newProposal" indicating the proposal created. This function may create a new proposal. An example pseudo code may be "function _proposeGeneric (uint256 targetRole, address proposer, bytes[ ] memory callDatas, uint256 clientId, string memory description, RequestOptions memory options) internal returns (Proposal storage newProposal)."

In particular embodiments, the protection contract may be associated with one or more governance admin functions. As an example and not by way of limitation, one governance admin function may be "initAuthentication." The input for this function may comprise "address _authentication" indicating the address of the cybersecurity authentication service, "address[ ] memory admins" which is a list of addresses with the admin role, "address[ ] memory integrators" which is a list of the addresses with the integrator role, and "address[ ] memory approvers" which is a list of addresses with the approver roles. This function may initialize the cybersecurity authentication service. An example pseudo code may be "function initAuthentication (address _authentication, address[ ] memory admins, address[ ] memory integrators, address[ ] memory approvers) external override initializer."

As another example and not by way of limitation, another governance admin function may be "grantAdmin." The input for this function may comprise "address account" indicating the account to which grant the role. This function may need to be executed via a proposal ("propose" function). Only those with the administrator role may propose that action. This function may grant the admin role to an account. An example pseudo code may be "function grantAdmin (address account) public only Authenticator."

As another example and not by way of limitation, another governance admin function may be "revokeAdmin." The input for this function may comprise "address account" indicating the account to which revoke the role. This function may need to be executed via a proposal ("propose" function). Only those with the administrator role can propose that action. This function may revoke the admin role from an account. An example pseudo code may be "function revokeAdmin (address account) public onlyAuthenticator."

As another example and not by way of limitation, another governance admin function may be "grantIntegrator." The input for this function may comprise "address account" indicating the address to which grant the role. This function may need to be executed via a proposal ("propose" function). Only those with the administrator role can propose that action. This function may grant the integrator role to an account. An example pseudo code may be "function grantIntegrator (address account) public onlyAuthenticator."

As another example and not by way of limitation, another governance admin function may be "revokeIntegrator." The input for this function may comprise "address account"

indicating the account to which revoke the role. This function may need to be executed via a proposal ("propose" function). Only those with the administrator role can propose that action. This function may revoke the integrator role from an account. An example pseudo code may be "function revokeIntegrator (address account) public onlyAuthenticator."

As another example and not by way of limitation, another governance admin function may be "grantApprover." The input for this function may comprise "address account" indicating the account to which grant the role. This function may need to be executed via a proposal ("propose" function). Only those with the administrator role can propose that action. This function may grant the approver role to an account. An example pseudo code may be "function grantApprover (address account) public onlyAuthenticator."

As another example and not by way of limitation, another governance admin function may be "revokeApprover." The input for this function may comprise "address account" indicating the account to which revoke the role. This function may need to be executed via a proposal ("propose" function). Only those with the administrator role can propose that action. This function may revoke the approver role from an account. An example pseudo code may be "function revokeApprover (address account) public onlyAuthenticator."

As another example and not by way of limitation, another governance admin function may be "setRequiredVotes." The input for this function may comprise "uint256 role" indicating the role to set the required votes and "uint256 newVotes" indicating the number of the new required roles. This function may need to be executed via a proposal ("propose" function). Only those with the administrator role can propose that action. This function may set the required votes to pass a proposal to the admin or integrator roles. An example pseudo code may be "function setRequiredVotes (uint256 role, uint256 newVotes) public onlyAuthenticator."

As another example and not by way of limitation, another governance admin function may be "update." This function may need to be executed via a proposal ("propose" function). Only those with the admin can propose that action. This function may update the contract. An example pseudo code may be "function update( ) external virtual onlyAuthenticator."

In particular embodiments, the contract features may be associated with an authentication admin contract, which may hold all the governance and authentication related process regarding admin functions of the cybersecurity authentication service. It may have all the functionality that a normal contract has but may be also able to call admin functions on the cybersecurity authentication service.

In particular embodiments, the authentication admin contract may comprise one or more authentication permission sets. As an example and not by way of limitation, one permission set may be "Admin", which may add/remove members of the authentication authorities, manage member permission sets, and set priority levels for approvers of the cybersecurity authentication service. As another example and not by way of limitation, another permission set may be "Approver", which may have three priority levels and may be the only permission set that is able to approve/reject transactions. As another example and not by way of limitation, another permission set may be "Integrator", which may be responsible for interacting with the cybersecurity authentication service and manage actions related with administration of the user/project.

In particular embodiments, when third parties want to use the cybersecurity authentication service, they may firstly onboard the cybersecurity authentication service. A third-party authority may call "createAuthentication" function on the protection contract providing the desired "authenticationName", a list of addresses for the administrator role (admins), a list of addresses for the integrator role (integrators) and a list of addresses for the approvers role. The onboarding function may handle the governance proxy creation and return the proxy address, which may probably need to be shown to the user.

In particular embodiments, the third-party authority may then onboard a project. The project may need to call "addUser" function by providing their name. A new project may be added associating the message sender address to that project.

In particular embodiments, the authentication actions may comprise one or more of adding a project, adding a function, removing a project, removing a contract, removing a function, approving/rejecting a transaction, adding a member (another address/user), removing a member (another address/user), or setting the required votes ("requiredVotes").

In particular embodiments, regarding the action of adding a project, the third-party authority may need to approve the proposal created by "request_authentication" function. In the protection contract, those members with the integrator role may need to vote in the proposal. To do so, they may need to call "voteProposal" function providing the "proposalID" (integer) and "support" (Boolean). After that, if the wait time period has passed (e.g., 2 days) and the number of voters which equals to "requiredVotes" for that role (e.g., half the initial number of members for that role). "Execute_request" function may be called by the protection contract, providing "callDatas" (byte array representing the ABI encoded function to call plus arguments).

In particular embodiments, regarding the action of adding a function, the third-party authority may need to approve the proposal created by "request". In the protection contract, those members with the integrator role may need to vote in the proposal. To do so, they may need to call "voteProposal" function, providing the "proposalID" (integer) and "support" (Boolean). After that, if the wait time period has passed (e.g., 2 days) and the number of voters equals to "requiredVotes" for that role (e.g., half the initial number of members for that role by default), "Execute_request" function should be called by the project in the protection contract, providing "callDatas" (byte array representing the ABI encoded function to call plus arguments).

In particular embodiments, regarding the action of removing a project, the third-party authority may change the project protection status by project request or by a third-party authority. By project request, the project may either call "request_authentication" function, providing a new authentication address or "request" to leave the system providing "callDatas" (byte array representing the ABI encoded function, "setUserProtected", to call plus arguments). In the first case, the userID may be removed from the cybersecurity authentication service and set to the new cybersecurity authentication service. The project may need to call "execute_request" function in the protection contract, providing "callDatas" (byte array representing the ABI encoded function to call plus arguments). Then, the project protection may be changed to false so the third party may not have a say on the project transactions anymore. By a third-party authority, the third-party authority may be capable of removing a project by themselves. To do so, the integrator may need to make a proposal on the protection contract by calling the "reportUser" function and providing the "userID" and a description of the proposal (string). In the protection contract, those members with the integrator role may need to vote in the proposal. After that, if the wait time period has passed (e.g., 2 days) and the number of voters which equals to required Votes for the integrator role (e.g., half the initial number of members for that role by default). Execute function may be called also on the protection contract, providing the proposalID and callDatas (byte array representing the ABI encoded function to call plus arguments).

In particular embodiments, regarding the action of removing a contract, the third-party authority may change the project protection status. To do so, the third-party authority may need to approve the proposal created by "request" function. Then those members with the integrator role may need to call "voteProposal" function providing the "proposalID" (integer) and "support" (Boolean). After that, if the wait time period has passed (e.g., 2 days, it may be useful to show this on the UI, it may be retrieved by doing a call to the public variable proposals providing the "proposalID") and the number of voters which equals to "requiredVotes" for that role (e.g., half the initial number of members for that role by default). "Execute_request" function should be called by the project in the protection contract, providing "callDatas" (byte array representing the ABI encoded function to call plus arguments).

In particular embodiments, regarding the action of removing a function, the third-party authority may change the project protection status. To do so, the third-party authority may need to approve the proposal created by "request" function. Then those members with the integrator role may need to call "voteProposal" function providing the "proposalID" (integer) and "support" (Boolean). After that, if the wait time period has passed (e.g., 2 days) and the number of voters equals to "requiredVotes" for that role (e.g., half the initial number of members for that role by default), "Execute_request" function should be called by the project in the protection contract, providing "callDatas" (byte array representing the ABI encoded function to call plus arguments).

In particular embodiments, regarding the action of approving/rejecting a transaction, approvers may need to call "voteApproval" on the protection contract providing "txHash" (bytes32) which is the hash of the transaction to approve, "txOrigin" (address) which is the origin of the transaction, "approvalsArray" (bytes array) which comprises the caller address, contract address, function selector, call data with value, "gasPrice" (unit256) which is the gas price for the transaction, "voteIndexes" (uint256 array) which is the indexes for those sub-calls to approve/reject, votes (Boolean array) which indicates whether they vote to approve (true) or reject (false) each sub-call, and rejectReasons (string array) which includes the reasons expressing their reasoning. If any of the sub-calls vote are false, the approval may be rejected. On the contrary, if all sub-calls are voted as true and there is no authentication pending to vote, the transaction may be approved. It should be noticed that in a single authentication, there could be different approvers. For that sub-call to be approved by the cybersecurity authentication service as a whole, the number of approvers voting to pass the transaction may be at least the number required for the user when adding a function for the system.

In particular embodiments, adding a member (another address/user) may comprise adding a new admin, adding a new integrator, and adding a new approver. Regarding adding a new admin, an admin may need to make a proposal on the protection contract by calling the "propose" function and providing a byte array of "callDatas" and a description of the proposal (string). "callDatas" may be the ABI encoded function to execute, in this case "grantAdmin", and arguments: account (address). In the protection contract, those members with the admin role may need to vote in the proposal. After that, if the number of voters equals to "requiredVotes" for the admin role (e.g., half the initial number of members for that role by default), execute function may be called also on the protection contract, providing the "proposalID" and "callDatas" (byte array representing the ABI encoded function to call plus arguments).

Regarding adding a new integrator, an admin may need to make a proposal on the protection contract by calling the "propose" function and providing a byte array of "callDatas" and a description of the proposal (string). "callDatas" may be the ABI encoded function to execute, in this case "grantIntegrator", and arguments: account (address). In the protection contract, those members with the admin role may need to vote in the proposal. After that, if the number of voters equals to "requiredVotes" for the admin role (e.g., half the initial number of members for that role by default), execute function may be called also on the protection contract, providing the "proposalID" and "callDatas" (byte array representing the ABI encoded function to call plus arguments).

Regarding adding a new approver, an admin may need to make a proposal on the protection contract by calling the "propose" function and providing a byte array of "callDatas" and a description of the proposal (string). "callDatas" may be the ABI encoded function to execute, in this case "grantApprover", and arguments: account (address). In the protection contract, those members with the admin role may need to vote in the proposal. After that, if the number of voters equals to "requiredVotes" for the admin role (e.g., half the initial number of members for that role by default), execute function may be called also on the protection contract, providing the "proposalID" and "callDatas" (byte array representing the ABI encoded function to call plus arguments).

In particular embodiments, removing a member (another address/user) may comprise one or more of removing an admin, removing an integrator, or removing an approver. Regarding removing an admin, an admin may need to make a proposal on the protection contract by calling the "propose" function and providing a byte array of "callDatas" and a description of the proposal (string). "callDatas" may be the ABI encoded function to execute, in this case "revokeAdmin", and arguments: account (address). In the protection contract, those members with the admin role may need to vote in the proposal. After that, if the number of voters equals to "required Votes" for the admin role (e.g., half the initial number of members for that role by default), execute function may be called also on the protection contract, providing the "proposalID" and "callDatas" (byte array representing the ABI encoded function to call plus arguments).

Regarding removing an integrator, an admin may need to make a proposal on the protection contract by calling the "propose" function and providing a byte array of "callDatas" and a description of the proposal (string). "callDatas" may be the ABI encoded function to execute, in this case "revokeIntegrator", and arguments: account (address). In the protection contract, those members with the admin role may need to vote in the proposal. After that, if the number of voters equals to "requiredVotes" for the admin role (e.g., half the initial number of members for that role by default), "execute" function may be called also on the notary contract, providing the "proposalID" and "callDatas" (byte array representing the abi encoded function to call plus arguments).

Regarding removing an approver, an admin may need to make a proposal on the protection contract by calling the "propose" function and providing a byte array of "callDatas" and a description of the proposal (string). "callDatas" may be the ABI encoded function to execute, in this case "grantApprover", and arguments: account (address). In the protection contract, those members with the admin role may need to vote in the proposal. After that, if the number of voters equals to "requiredVotes" for the admin role (e.g., half the initial number of members for that role by default), "execute" function may be called also on the protection contract, providing the "proposalID" and "callDatas" (byte array representing the ABI encoded function to call plus arguments).

In particular embodiments, regarding the action of setting the required votes ("requiredVotes"), in order to set the minimum number of positives votes necessary to approve a proposal, an admin may need to make a proposal on the protection contract by calling the "propose" function and providing a byte array of "callDatas" and a description of the proposal (string). "callDatas" may be the ABI encoded function to execute, in this case "setRequiredVotes", and arguments: role (uint) and "newVotes" (uint). In the protection contract, those members with the admin role may need to vote in the proposal. After that, if the number of voters equals to "requiredVotes" for the admin role (e.g., half the initial number of members for that role by default), "execute" function may be called also on the protection contract, providing the "proposalID" and "callDatas" (byte array representing the ABI encoded function to call plus arguments).

In particular embodiments, to execute a proposal, someone with the same role necessary to propose the proposal may call "execute" providing the "proposalId" and "callDatas" (byte array representing the ABI encoded function to call plus arguments). To cancel a proposal, the proposer may call "cancel" providing the "proposalId".

In particular embodiments, the project actions may comprise one or more of checking the status of a pending approval, removing from current cybersecurity authentication service, requesting a new cybersecurity authentication service, requesting adding a new contract and function, requesting setting a contract protection, or requesting setting a function protection.

In particular embodiments, with checking the status of a pending approval, the current state of the approval of a transaction may be checked by calling "getTxVotes" on the protection contract. It may return "totalVoters" (uint256) which is the total of the voters for the approver role, "requiredVoters" (uint256) which is the minimum amount of votes necessary for the approval, "accepted" (uint256) which is the number of accepted votes, and "rejectedVotes" (uint256) which is the number of rejected votes.

Regarding the action of removing from current cybersecurity authentication service, the project may need to call "request" in the protection contract to leave the system providing "callDatas" (byte array representing the ABI encoded function, "setUserProtected", to call plus arguments). This may generate a new proposal on the protection contract which may be auto approved. After the wait time period, "execute_request" function should be called also on the protection contract, providing "callDatas" (byte array representing the ABI encoded function to call plus arguments).

Regarding the action of requesting a new cybersecurity authentication service, the project may need to call "request_authentication" on the protection contract providing the address of the new cybersecurity authentication service. This may generate a new proposal on the protection contract. The new cybersecurity authentication service may vote in accepting the new user. In the protection contract, those members with the integrator role may need to vote in the proposal. To do so, they may need to call "voteProposal" providing the "proposalID" (integer) and "support" (Boolean). After that, if the wait time period has passed, "execute_request" function should be called by the project in the protection contract, providing "callDatas" (byte array representing the ABI encoded function to call plus arguments).

Regarding the action of requesting adding a new contract and function, on the contract/s that should be protected, the project may firstly call "contractRequest" providing their "userID". Then, the project may need to call "request" providing the function selector for "addContractsAndFunctions", a list of contract addresses, a list of function selector and a list of the required number of approvers that need to vote in favor for a transaction for it to be approved. This may generate a new proposal on the protection contract. The cybersecurity authentication service may vote in adding those contracts and functions. In the protection contract, those members with the integrator role may need to vote in the proposal. To do so, they may need to call "voteProposal" providing the "proposalID" (integer) and "support" (Boolean). After that, if the wait time period has passed (e.g., 2 days), "execute_request" function should be called by the project in the protection contract, providing "callDatas" (byte array representing the ABI encoded function to call plus arguments).

Regarding the action of requesting setting a contract protection, the project may need to call "request" on the protection contract providing contractAddress and value (bool). This may generate a new proposal on the protection contract. The cybersecurity authentication service may vote in accepting the new user. In the protection contract, those members with the integrator role may need to vote in the proposal. To do so, they may need to call voteProposal providing the proposalID (integer) and support (Boolean). After that, if the wait time period has passed (e.g., 2 days), "execute_request" function should be called by the project in the protection contract, providing "callDatas" (byte array representing the ABI encoded function to call plus arguments).

Regarding the action of requesting setting a function protection, the project may need to call "request" on the protection contract providing the function selector for "setFunctionProtected", "contractAddress" and value (bool). This may generate a new proposal on the protection contract. The cybersecurity authentication service may vote in accepting the new user. In the protection contract, those members with the integrator role may need to vote in the proposal. To do so, they may need to call "voteProposal" providing the "proposalID" (integer) and "support" (Boolean). After that, if the wait time period has passed (e.g., 2 days), "execute_request" function should be called by the project in the protection contract, providing "callDatas" (byte array representing the ABI encoded function to call plus arguments).

In particular embodiments, to execute a proposal/request, the project may need to call "execute_request" in the protection contract providing "callDatas" (byte array representing the ABI encoded function to call plus arguments). Project may only be able to execute a proposal they made. To cancel a proposal/request, the project may need to call "cancel_request" in the protection contract. Project may only be able to cancel a proposal they made.

In particular embodiments, the authentication admin actions may comprise one or more of setting the last version for the governance contract, setting the last version for the admin governance contract, setting the functions compatible with requests, setting verification status for an authentication, or setting the blacklisted status for an authentication. Regarding the action of setting the last version for the governance contract, to update the new governance contract used to create new cybersecurity authentication services and for old cybersecurity authentication services to update to, a new proposal on the admin contract may need to be created by calling the "propose" function and providing a byte array of "callDatas" which is the ABI encoded function to execute, in this case "setLastGovernanceVersion", and arguments: "newImplementation" (address). In the admin contract, those members with the admin role may need to vote in the proposal. After that, if the voting passes, the execute function may be called also on the protection contract, providing the "proposalID" and "callDatas" (byte array representing the ABI encoded function to call plus arguments).

Regarding the action of setting the last version for the admin governance contract, to update the new admin governance contract implementation, a new proposal on the admin contract may need to be created by calling the "propose" function and providing a byte array of "callDatas" which is the ABI encoded function to execute, in this case "setLastAdminGovernance Version", and arguments: "newImplementation" (address). In the admin contract, those members with the admin role may need to vote in the proposal. After that, if the voting passes, "execute" function may be called also on the protection contract, providing the "proposalID" and "callDatas" (byte array representing the ABI encoded function to call plus arguments).

Regarding the action of setting the functions compatible with requests, to set which functions can be called by the project as requests a new proposal on the admin contract may need to be created by calling the "propose" function and providing a byte array of "callDatas" which is the ABI encoded function to execute, in this case "setRequestRegister", and arguments: selector (bytes4) which is the function selector, enabled (bool) whether the function can be called as request, options which may include "waitTime" (uint256) to execute the function and "autoApproved" (bool) which includes if the function would need approval from the authority. In the admin contract, those members with the admin role may need to vote in the proposal. After that, if the voting passes, the "execute" function may be called also on the protection contract, providing the "proposalId" and "callDatas" (byte array representing the ABI encoded function to call plus arguments).

Regarding the action of setting verification status for an authentication, to set the verification status for a cybersecurity authentication service (verified or not), a new proposal on the admin contract may need to be created by calling the "propose" function and providing a byte array of "callDatas" which is the ABI encoded function to execute, in this case "verifyAuthentication", and arguments: "authenticationAddress" (address) and value (bool). In the admin contract, those members with the admin role may need to vote in the proposal. After that, if the voting passes, the "execute" function may be called also on the protection contract, providing the "proposalID" and "callDatas" (byte array representing the ABI encoded function to call plus arguments).

Regarding the action of or setting the blacklisted status for an authentication, to set the blacklisted status for a cybersecurity authentication service (blacklisted or not), a new proposal on the admin contract may need to be created by calling the "propose" function and providing a byte array of "callDatas" which is the ABI encoded function to execute, in this case "backlistAuthentication", and arguments: "authenticationAddress" (address) and value (bool). In the admin contract, those members with the admin role may need to vote in the proposal. After that, if the voting passes, the execute function may be called also on the protection contract, providing the "proposalID" and "callDatas" (byte array representing the ABI encoded function to call plus arguments).

In particular embodiments, to pause or un-pause the cybersecurity authentication service, a new proposal on the admin contract may need to be created by calling the "propose" function and providing a byte array of "callDatas" which is the ABI encoded function to execute, in this case pause or un-pause. In the admin contract, those members with the admin role may need to vote in the proposal. After that, it the voting passes, the "execute" function may be called also on the protection contract, providing the "proposalId" and "callDatas" (byte array representing the ABI encoded function to call plus arguments).

Figure 20:
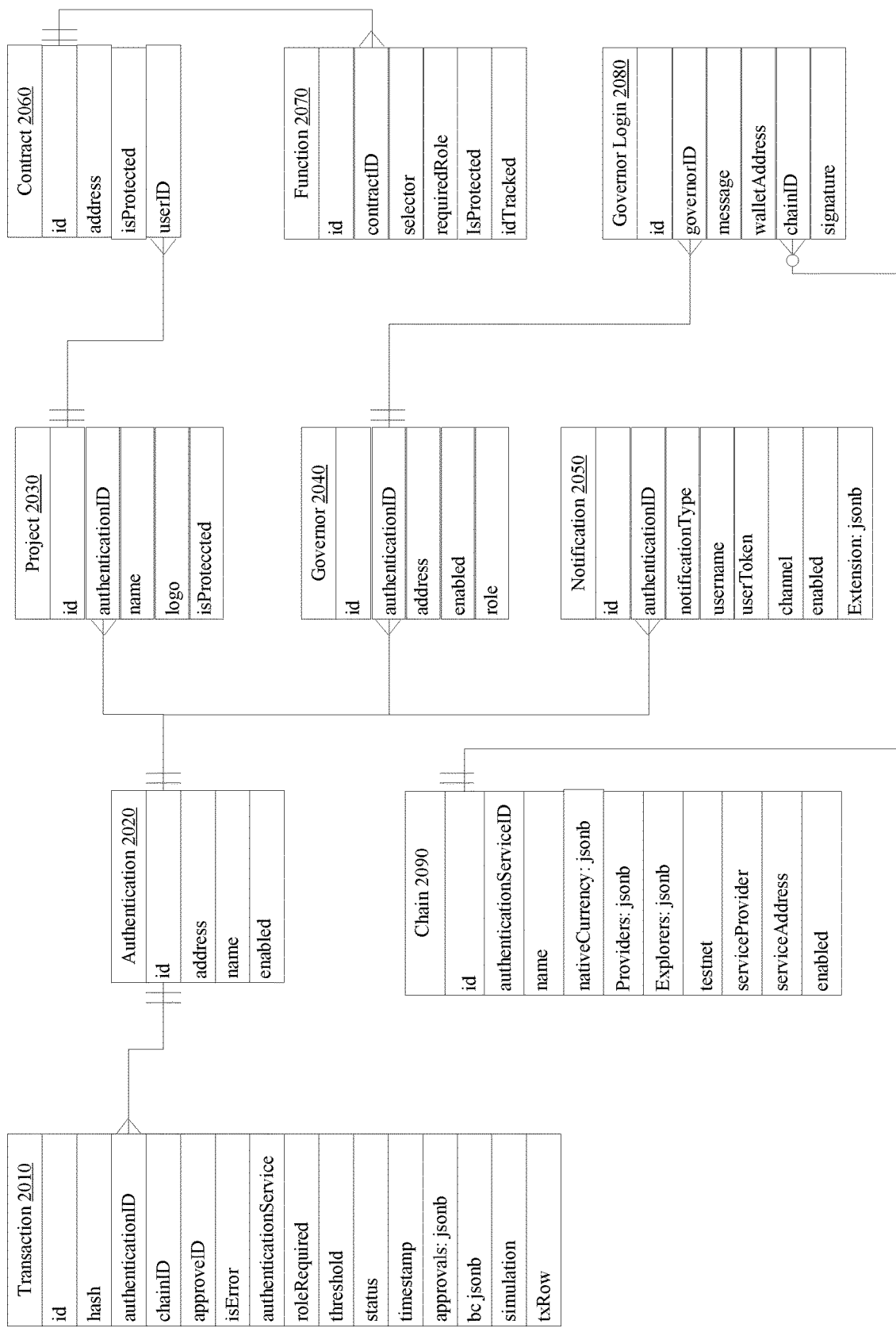
FIG. 20 illustrates an example data structure for providing the cybersecurity authentication service as a SaaS.

FIG. 20 illustrates an example data structure for providing the cybersecurity authentication service as a SaaS. The variables for transaction data 2010 may comprise ID, hash, authenticationID, chainID, approveTx, isError, authenticationService, roleRequired, threshold, timestamp, approvals: jsonb, bc jsonb, simulation, and txRow. The authenticationID may help direct the transaction to the variable ID of authentication data 2020. The authentication data may additionally comprise the following variables, e.g., address, name, and enabled. The ID of authentication data 2020 may help direct to project data 2030, governor data 2040, and notification 2050 via their variables of authenticationID, respectively. The variables for the project data 2030 may further comprise ID, name, logo, and isProtected. The variables for the governor data 2050 may further comprise ID, address, enabled, and role. The variables for the notification 2050 may further comprise ID, notificationType, username, userToken, channel, enabled, and extension: jsonb. In particular embodiments, the ID of project data 2030 may be linked to the userID of contract 2060. The variables for the contract 2060 may additionally comprise ID, address, and isProtected. The ID of contract 2060 may be linked to the contractID of function 2070. The variables for the function 2070 may additionally comprise ID, selector, requiredRole, isProtected and is Tracked. In particular embodiments, the authenticationID of the governor data 2040 may be linked to the governorID of governor login 2080. The variables for governor login 2080 may additionally comprise ID, message, walletAddress, chainID, and signature. The chainID of governor login 2080 may be linked to ID of chain data 2090. The chain data 2090 may further comprise authenticationServiceID, name, nativeCurrency: jsonb, Providers: jsonb, Explorers: jsonb, testnet, serviceProvider, serviceAddress, and enabled.

Figure 21:
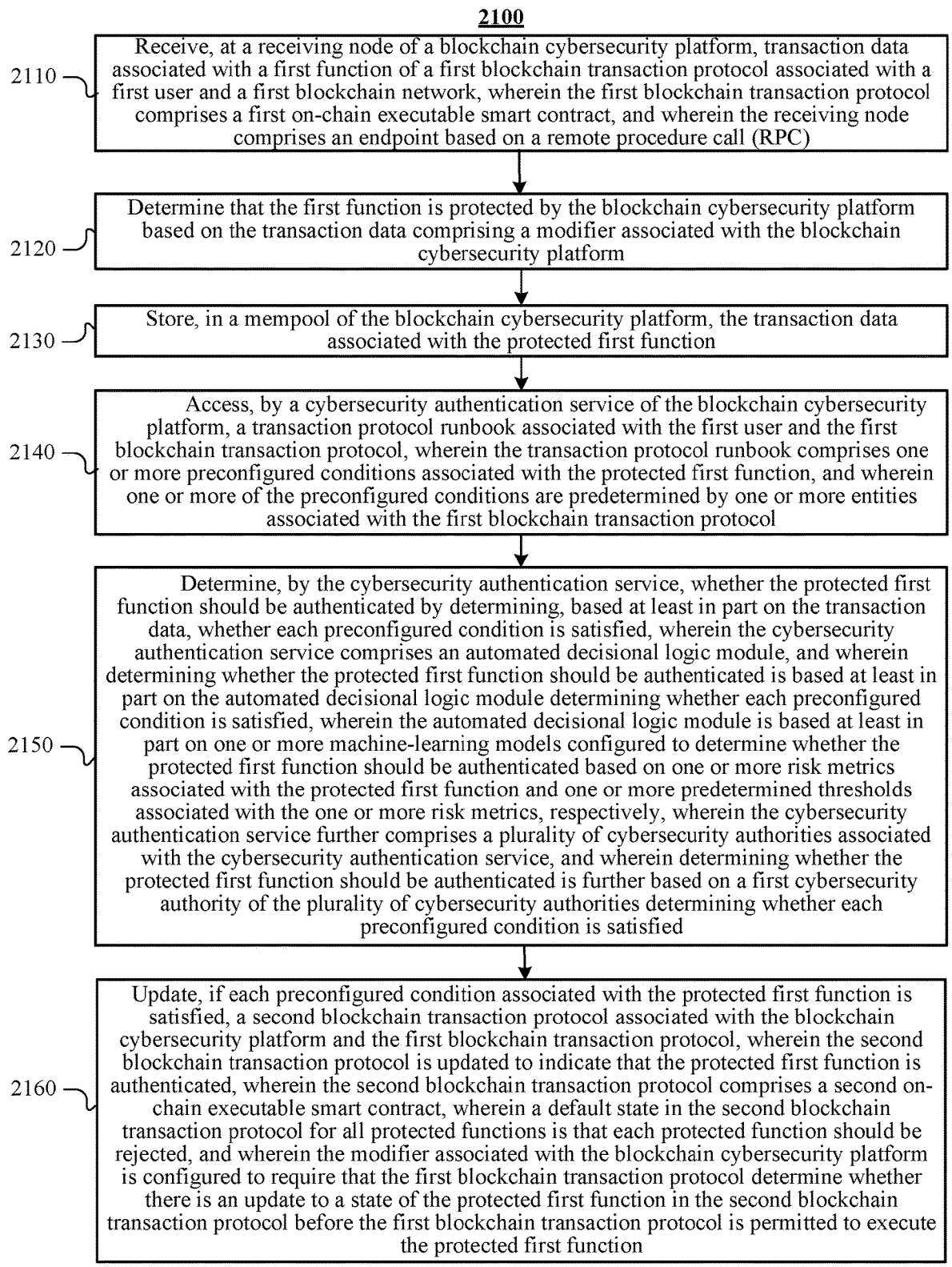
FIG. 21 illustrates an example method for authorizing transactions associated with smart contracts.

FIG. 21 illustrates an example method 2100 for authorizing transactions associated with smart contracts. The method may begin at step 2110, where the blockchain cybersecurity platform may receive, at a receiving node of the blockchain cybersecurity platform, transaction data associated with a first function of a first blockchain transaction protocol associated with a first user and a first blockchain network, wherein the first blockchain transaction protocol comprises a first on-chain executable smart contract, and wherein the receiving node comprises an endpoint based on a remote procedure call (RPC). At step 2120, the blockchain cybersecurity platform may determine that the first function is protected by the blockchain cybersecurity platform based on the transaction data comprising a modifier associated with the blockchain cybersecurity platform. At step 2130, the blockchain cybersecurity platform may store, in a mempool of the blockchain cybersecurity platform, the transaction data associated with the protected first function. At step 2140, the blockchain cybersecurity platform may access, by a cybersecurity authentication service of the blockchain cybersecurity platform, a transaction protocol runbook associated with the first user and the first blockchain transaction protocol, wherein the transaction protocol runbook comprises one or more preconfigured conditions associated with the protected first function, and wherein one or more of the preconfigured conditions are predetermined by one or more entities associated with the first blockchain transaction protocol. At step 2150, the blockchain cybersecurity platform may determine, by the cybersecurity authentication service, whether the protected first function should be authenticated by determining, based at least in part on the transaction data, whether each preconfigured condition is satisfied, wherein the cybersecurity authentication service comprises an automated decisional logic module, and wherein determining whether the protected first function should be authenticated is based at least in part on the automated decisional logic module determining whether each preconfigured condition is satisfied, wherein the automated decisional logic module is based at least in part on one or more machine-learning models configured to determine whether the protected first function should be authenticated based on one or more risk metrics associated with the protected first function and one or more predetermined thresholds associated with the one or more risk metrics, respectively, wherein the cybersecurity authentication service further comprises a plurality of cybersecurity authorities associated with the cybersecurity authentication service, and wherein determining whether the protected first function should be authenticated is further based on a first cybersecurity authority of the plurality of cybersecurity authorities determining whether each preconfigured condition is satisfied. At step 2160, the blockchain cybersecurity platform may update, if each preconfigured condition associated with the protected first function is satisfied, a second blockchain transaction protocol associated with the blockchain cybersecurity platform and the first blockchain transaction protocol, wherein the second blockchain transaction protocol is updated to indicate that the protected first function is authenticated, wherein the second blockchain transaction protocol comprises a second on-chain executable smart contract, wherein a default state in the second blockchain transaction protocol for all protected functions is that each protected function should be rejected, and wherein the modifier associated with the blockchain cybersecurity platform is configured to require that the first blockchain transaction protocol determine whether there is an update to a state of the protected first function in the second blockchain transaction protocol before the first blockchain transaction protocol is permitted to execute the protected first function. Particular embodiments may repeat one or more steps of the method of FIG. 21, where appropriate. Although this disclosure describes and illustrates particular steps of the method of FIG. 21 as occurring in a particular order, this disclosure contemplates any suitable steps of the method of FIG. 21 occurring in any suitable order. Moreover, although this disclosure describes and illustrates an example method for authorizing transactions associated with smart contracts including the particular steps of the method of FIG. 21, this disclosure contemplates any suitable method for authorizing transactions associated with smart contracts including any suitable steps, which may include all, some, or none of the steps of the method of FIG. 21, where appropriate. Furthermore, although this disclosure describes and illustrates particular components, devices, or systems carrying out particular steps of the method of FIG. 21, this disclosure contemplates any suitable combination of any suitable components, devices, or systems carrying out any suitable steps of the method of FIG. 21.

Figure 22:
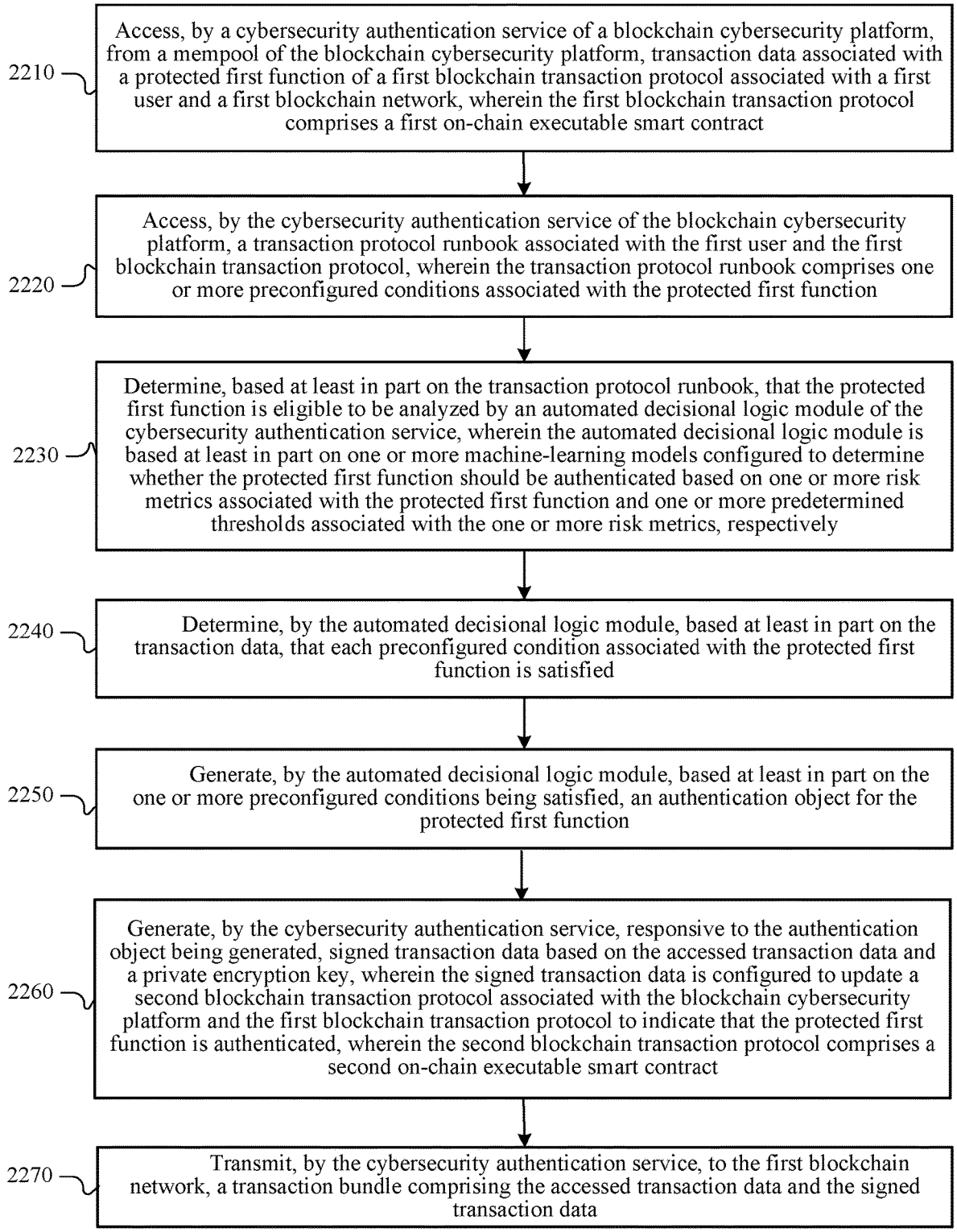
FIG. 22 illustrates an example method for automated rule-based smart contract approval.

FIG. 22 illustrates an example method 2200 for automated rule-based smart contract approval. The method may begin at step 2210, where the blockchain cybersecurity platform may access, by a cybersecurity authentication service of a blockchain cybersecurity platform, from a mempool of the blockchain cybersecurity platform, transaction data associated with a protected first function of a first blockchain transaction protocol associated with a first user and a first blockchain network, wherein the first blockchain transaction protocol comprises a first on-chain executable smart contract. At step 2220, the blockchain cybersecurity platform may access, by the cybersecurity authentication service of the blockchain cybersecurity platform, a transaction protocol runbook associated with the first user and the first blockchain transaction protocol, wherein the transaction protocol runbook comprises one or more preconfigured conditions associated with the protected first function. At step 2230, the blockchain cybersecurity platform may determine, based at least in part on the transaction protocol runbook, that the protected first function is eligible to be analyzed by an automated decisional logic module of the cybersecurity authentication service, wherein the automated decisional logic module is based at least in part on one or more machine-learning models configured to determine whether the protected first function should be authenticated based on one or more risk metrics associated with the protected first function and one or more predetermined thresholds associated with the one or more risk metrics, respectively. At step 2240, the blockchain cybersecurity platform may determine, by the automated decisional logic module, based at least in part on the transaction data, that each preconfigured condition associated with the protected first function is satisfied. At step 2250, the blockchain cybersecurity platform may generate, by the automated decisional logic module, based at least in part on the one or more preconfigured conditions being satisfied, an authentication object for the protected first function. At step 2260, the blockchain cybersecurity platform may generate, by the cybersecurity authentication service, responsive to the authentication object being generated, signed transaction data based on the accessed transaction data and a private encryption key, wherein the signed transaction data is configured to update a second blockchain transaction protocol associated with the blockchain cybersecurity platform and the first blockchain transaction protocol to indicate that the protected first function is authenticated, wherein the second blockchain transaction protocol comprises a second on-chain executable smart contract. At step 2270, the blockchain cybersecurity platform may transmit, by the cybersecurity authentication service, to the first blockchain network, a transaction bundle comprising the accessed transaction data and the signed transaction data. Particular embodiments may repeat one or more steps of the method of FIG. 22, where appropriate. Although this disclosure describes and illustrates particular steps of the method of FIG. 22 as occurring in a particular order, this disclosure contemplates any suitable steps of the method of FIG. 22 occurring in any suitable order. Moreover, although this disclosure describes and illustrates an example method for automated rule-based smart contract approval including the particular steps of the method of FIG. 22, this disclosure contemplates any suitable method for automated rule-based smart contract approval including any suitable steps, which may include all, some, or none of the steps of the method of FIG. 22, where appropriate. Furthermore, although this disclosure describes and illustrates particular components, devices, or systems carrying out particular steps of the method of FIG. 22, this disclosure contemplates any suitable combination of any suitable components, devices, or systems carrying out any suitable steps of the method of FIG. 22.

Figure 23:
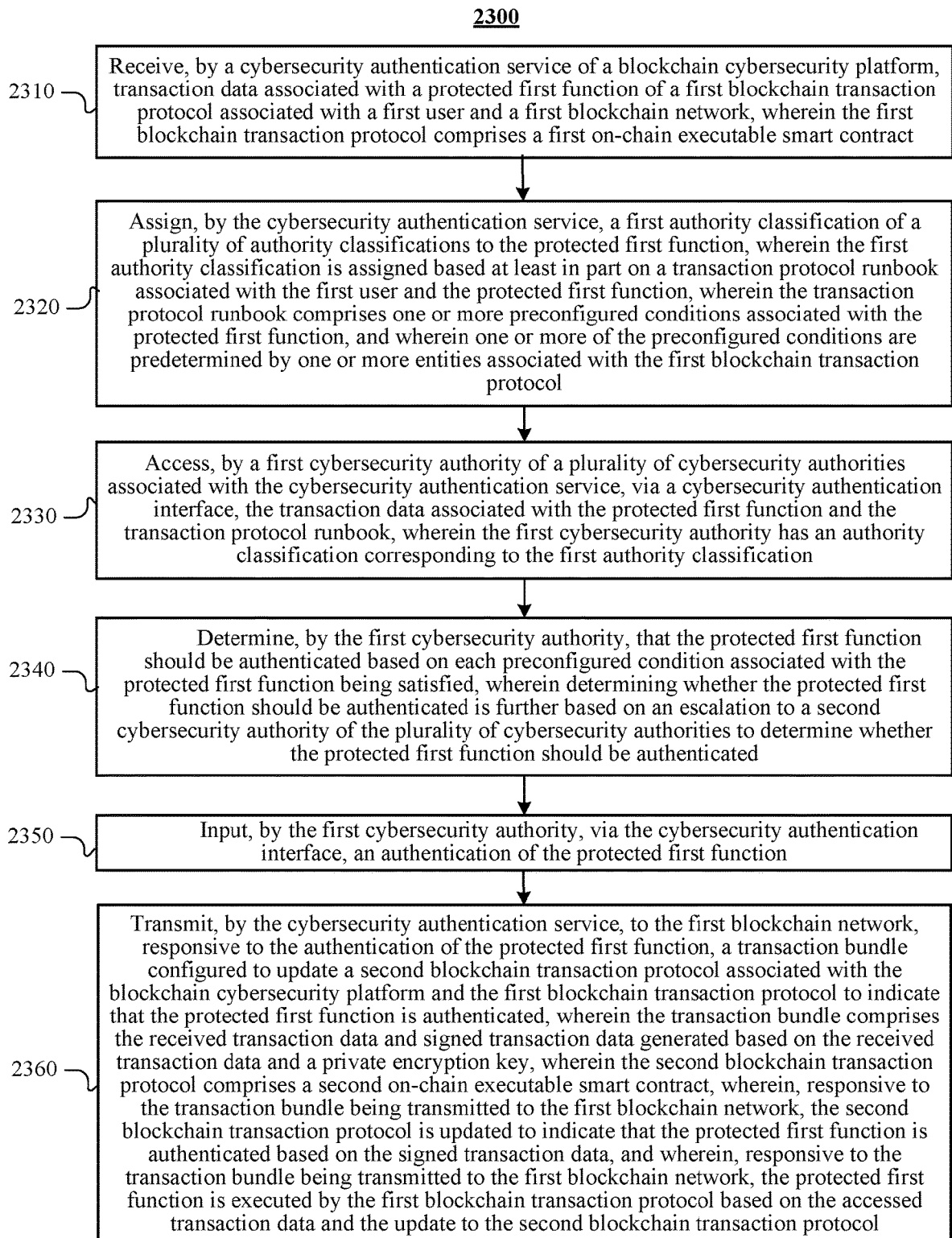
FIG. 23 illustrates an example method for permission-based tiered authorization for smart contracts.

FIG. 23 illustrates an example method 2300 for permission-based tiered authorization for smart contracts. The method may begin at step 2310, where the blockchain cybersecurity platform may receive, by a cybersecurity authentication service of the blockchain cybersecurity platform, transaction data associated with a protected first function of a first blockchain transaction protocol associated with a first user and a first blockchain network, wherein the first blockchain transaction protocol comprises a first on-chain executable smart contract. At step 2320, the blockchain cybersecurity platform may assign, by the cybersecurity authentication service, a first authority classification of a plurality of authority classifications to the protected first function, wherein the first authority classification is assigned based at least in part on a transaction protocol runbook associated with the first user and the protected first function, wherein the transaction protocol runbook comprises one or more preconfigured conditions associated with the protected first function, and wherein one or more of the preconfigured conditions are predetermined by one or more entities associated with the first blockchain transaction protocol. At step 2330, the blockchain cybersecurity platform may access, by a first cybersecurity authority of a plurality of cybersecurity authorities associated with the cybersecurity authentication service, via a cybersecurity authentication interface, the transaction data associated with the protected first function and the transaction protocol runbook, wherein the first cybersecurity authority has an authority classification corresponding to the first authority classification. At step 2340, the blockchain cybersecurity platform may determine, by the first cybersecurity authority, that the protected first function should be authenticated based on each preconfigured condition associated with the protected first function being satisfied, wherein determining whether the protected first function should be authenticated is further based on an escalation to a second cybersecurity authority of the plurality of cybersecurity authorities to determine whether the protected first function should be authenticated. At step 2350, the blockchain cybersecurity platform may input, by the first cybersecurity authority, via the cybersecurity authentication interface, an authentication of the protected first function. At step 2360, the blockchain cybersecurity platform may transmit, by the cybersecurity authentication service, to the first blockchain network, responsive to the authentication of the protected first function, a transaction bundle configured to update a second blockchain transaction protocol associated with the blockchain cybersecurity platform and the first blockchain transaction protocol to indicate that the protected first function is authenticated, wherein the transaction bundle comprises the received transaction data and signed transaction data generated based on the received transaction data and a private encryption key, wherein the second blockchain transaction protocol comprises a second on-chain executable smart contract, wherein, responsive to the transaction bundle being transmitted to the first blockchain network, the second blockchain transaction protocol is updated to indicate that the protected first function is authenticated based on the signed transaction data, and wherein, responsive to the transaction bundle being transmitted to the first blockchain network, the protected first function is executed by the first blockchain transaction protocol based on the accessed transaction data and the update to the second blockchain transaction protocol. Particular embodiments may repeat one or more steps of the method of FIG. 23, where appropriate. Although this disclosure describes and illustrates particular steps of the method of FIG. 23 as occurring in a particular order, this disclosure contemplates any suitable steps of the method of FIG. 23 occurring in any suitable order. Moreover, although this disclosure describes and illustrates an example method for permission-based tiered authorization for smart contracts including the particular steps of the method of FIG. 23, this disclosure contemplates any suitable method for permission-based tiered authorization for smart contracts including any suitable steps, which may include all, some, or none of the steps of the method of FIG. 23, where appropriate. Furthermore, although this disclosure describes and illustrates particular components, devices, or systems carrying out particular steps of the method of FIG. 23, this disclosure contemplates any suitable combination of any suitable components, devices, or systems carrying out any suitable steps of the method of FIG. 23.

Figure 24:
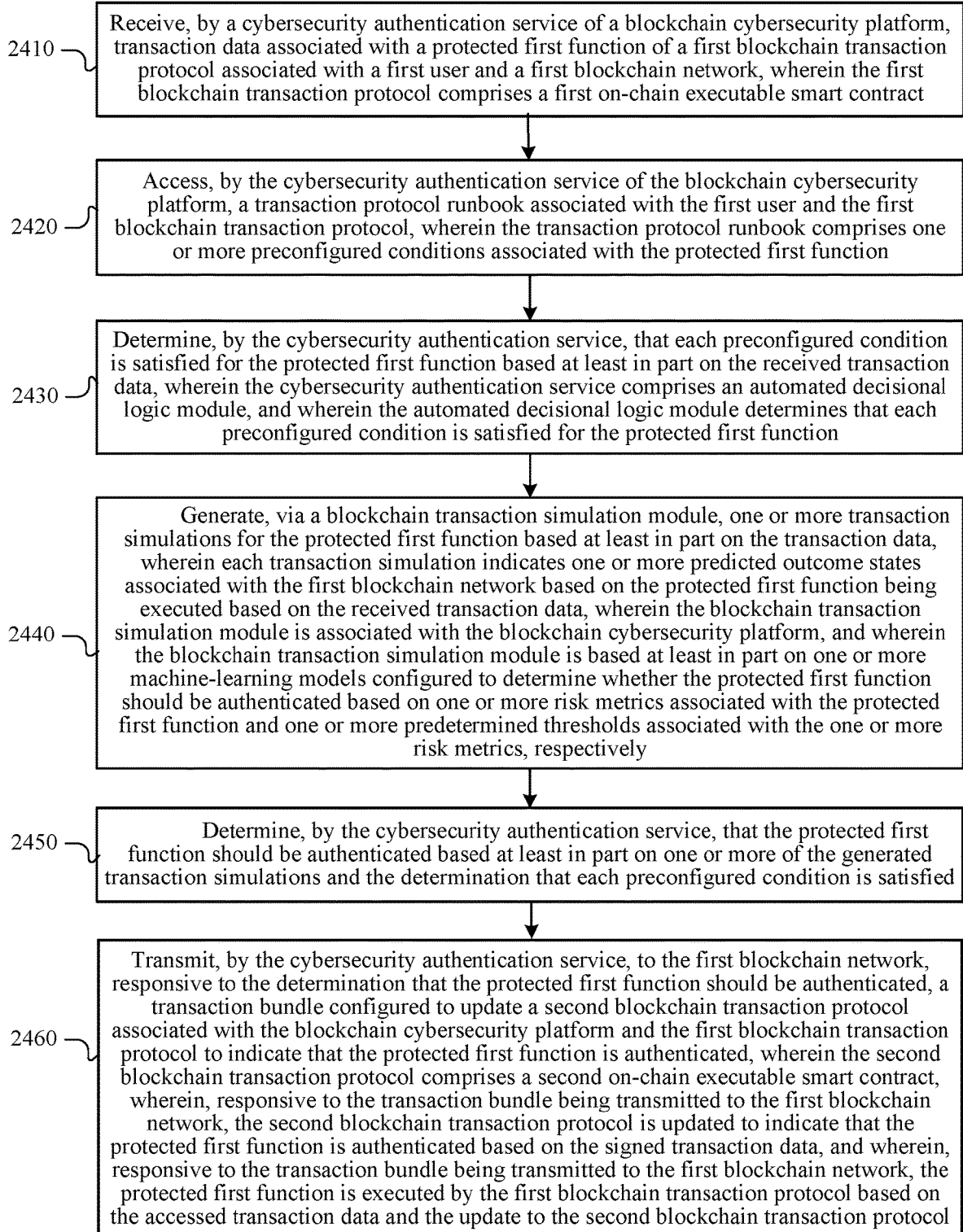
FIG. 24 illustrates an example method for smart contract authorization based on transaction simulations.

FIG. 24 illustrates an example method 2400 for smart contract authorization based on transaction simulations. The method may begin at step 2410, where the blockchain cybersecurity platform may receive, by a cybersecurity authentication service of the blockchain cybersecurity platform, transaction data associated with a protected first function of a first blockchain transaction protocol associated with a first user and a first blockchain network, wherein the first blockchain transaction protocol comprises a first on-chain executable smart contract. At step 2420, the blockchain cybersecurity platform may access, by the cybersecurity authentication service of the blockchain cybersecurity platform, a transaction protocol runbook associated with the first user and the first blockchain transaction protocol, wherein the transaction protocol runbook comprises one or more preconfigured conditions associated with the protected first function. At step 2430, the blockchain cybersecurity platform may determine, by the cybersecurity authentication service, that each preconfigured condition is satisfied for the protected first function based at least in part on the received transaction data, wherein the cybersecurity authentication service comprises an automated decisional logic module, and wherein the automated decisional logic module determines that each preconfigured condition is satisfied for the protected first function. At step 2440, the blockchain cybersecurity platform may generate, via a blockchain transaction simulation module, one or more transaction simulations for the protected first function based at least in part on the transaction data, wherein each transaction simulation indicates one or more predicted outcome states associated with the first blockchain network based on the protected first function being executed based on the received transaction data, wherein the blockchain transaction simulation module is associated with the blockchain cybersecurity platform, and wherein the blockchain transaction simulation module is based at least in part on one or more machine-learning models configured to determine whether the protected first function should be authenticated based on one or more risk metrics associated with the protected first function and one or more predetermined thresholds associated with the one or more risk metrics, respectively. At step 2450, the blockchain cybersecurity platform may determine, by the cybersecurity authentication service, that the protected first function should be authenticated based at least in part on one or more of the generated transaction simulations and the determination that each preconfigured condition is satisfied. At step 2460, the blockchain cybersecurity platform may transmit, by the cybersecurity authentication service, to the first blockchain network, responsive to the determination that the protected first function should be authenticated, a transaction bundle configured to update a second blockchain transaction protocol associated with the blockchain cybersecurity platform and the first blockchain transaction protocol to indicate that the protected first function is authenticated, wherein the second blockchain transaction protocol comprises a second on-chain executable smart contract, wherein, responsive to the transaction bundle being transmitted to the first blockchain network, the second blockchain transaction protocol is updated to indicate that the protected first function is authenticated based on the signed transaction data, and wherein, responsive to the transaction bundle being transmitted to the first blockchain network, the protected first function is executed by the first blockchain transaction protocol based on the accessed transaction data and the update to the second blockchain transaction protocol. Particular embodiments may repeat one or more steps of the method of FIG. 24, where appropriate. Although this disclosure describes and illustrates particular steps of the method of FIG. 24 as occurring in a particular order, this disclosure contemplates any suitable steps of the method of FIG. 24 occurring in any suitable order. Moreover, although this disclosure describes and illustrates an example method for smart contract authorization based on transaction simulations including the particular steps of the method of FIG. 24, this disclosure contemplates any suitable method for smart contract authorization based on transaction simulations including any suitable steps, which may include all, some, or none of the steps of the method of FIG. 24, where appropriate. Furthermore, although this disclosure describes and illustrates particular components, devices, or systems carrying out particular steps of the method of FIG. 24, this disclosure contemplates any suitable combination of any suitable components, devices, or systems carrying out any suitable steps of the method of FIG. 24.

Figure 25:
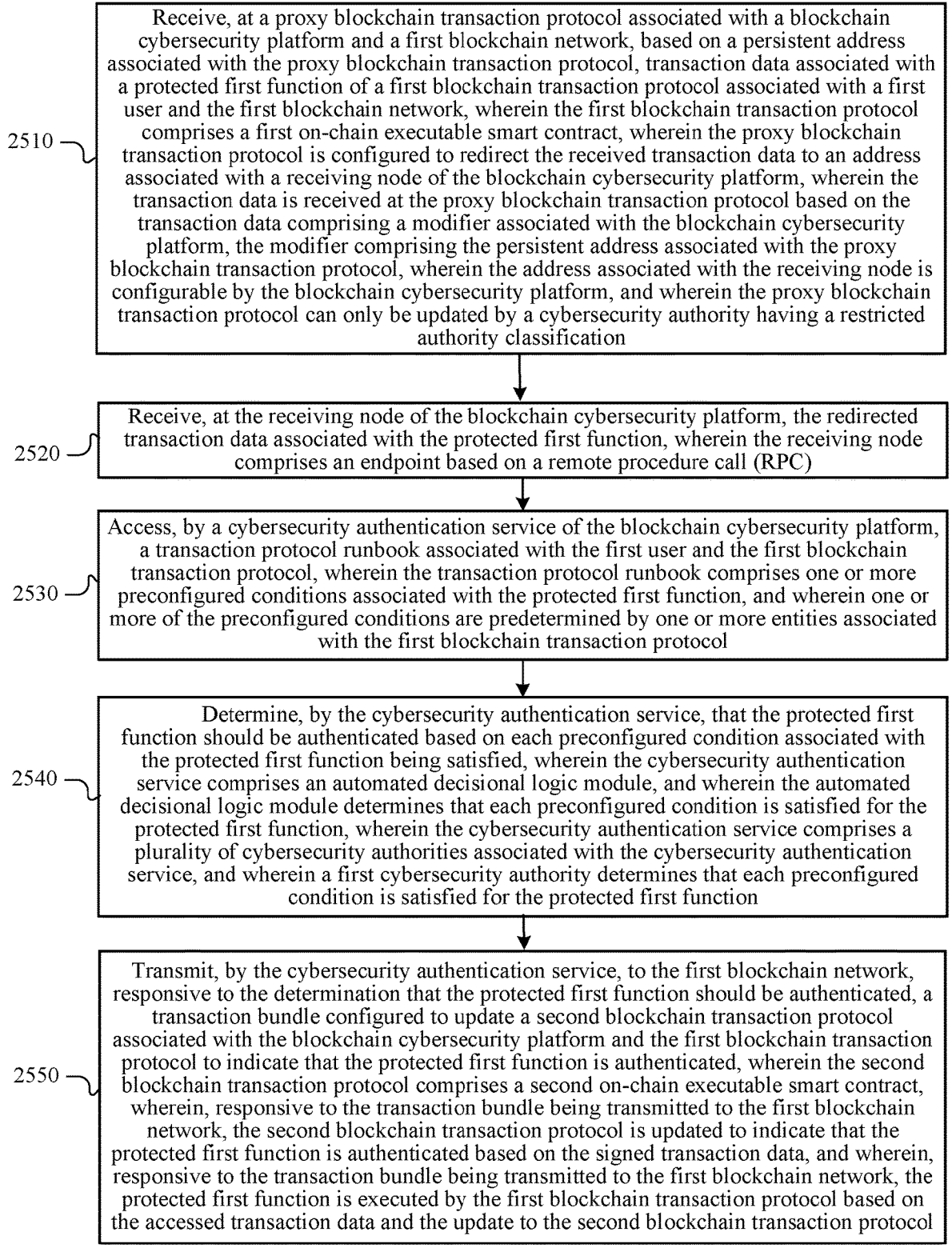
FIG. 25 illustrates an example method for persistent remote procedure calls for smart contract security.

FIG. 25 illustrates an example method 2500 for persistent remote procedure calls for smart contract security. The method may begin at step 2510, where the blockchain cybersecurity platform may receive, at a proxy blockchain transaction protocol associated with the blockchain cybersecurity platform and a first blockchain network, based on a persistent address associated with the proxy blockchain transaction protocol, transaction data associated with a protected first function of a first blockchain transaction protocol associated with a first user and the first blockchain network, wherein the first blockchain transaction protocol comprises a first on-chain executable smart contract, wherein the proxy blockchain transaction protocol is configured to redirect the received transaction data to an address associated with a receiving node of the blockchain cybersecurity platform, wherein the transaction data is received at the proxy blockchain transaction protocol based on the transaction data comprising a modifier associated with the blockchain cybersecurity platform, the modifier comprising the persistent address associated with the proxy blockchain transaction protocol, wherein the address associated with the receiving node is configurable by the blockchain cybersecurity platform, and wherein the proxy blockchain transaction protocol can only be updated by a cybersecurity authority having a restricted authority classification. At step 2520, the blockchain cybersecurity platform may receive, at the receiving node of the blockchain cybersecurity platform, the redirected transaction data associated with the protected first function, wherein the receiving node comprises an endpoint based on a remote procedure call (RPC) At step 2530, the blockchain cybersecurity platform may access, by a cybersecurity authentication service of the blockchain cybersecurity platform, a transaction protocol runbook associated with the first user and the first blockchain transaction protocol, wherein the transaction protocol runbook comprises one or more preconfigured conditions associated with the protected first function, and wherein one or more of the preconfigured conditions are predetermined by one or more entities associated with the first blockchain transaction protocol. At step 2540, the blockchain cybersecurity platform may determine, by the cybersecurity authentication service, that the protected first function should be authenticated based on each preconfigured condition associated with the protected first function being satisfied, wherein the cybersecurity authentication service comprises an automated decisional logic module, and wherein the automated decisional logic module determines that each preconfigured condition is satisfied for the protected first function, wherein the cybersecurity authentication service comprises a plurality of cybersecurity authorities associated with the cybersecurity authentication service, and wherein a first cybersecurity authority determines that each preconfigured condition is satisfied for the protected first function. At step 2550, the blockchain cybersecurity platform may transmit, by the cybersecurity authentication service, to the first blockchain network, responsive to the determination that the protected first function should be authenticated, a transaction bundle configured to update a second blockchain transaction protocol associated with the blockchain cybersecurity platform and the first blockchain transaction protocol to indicate that the protected first function is authenticated, wherein the second blockchain transaction protocol comprises a second on-chain executable smart contract, wherein, responsive to the transaction bundle being transmitted to the first blockchain network, the second blockchain transaction protocol is updated to indicate that the protected first function is authenticated based on the signed transaction data, and wherein, responsive to the transaction bundle being transmitted to the first blockchain network, the protected first function is executed by the first blockchain transaction protocol based on the accessed transaction data and the update to the second blockchain transaction protocol. Particular embodiments may repeat one or more steps of the method of FIG. 25, where appropriate. Although this disclosure describes and illustrates particular steps of the method of FIG. 25 as occurring in a particular order, this disclosure contemplates any suitable steps of the method of FIG. 25 occurring in any suitable order. Moreover, although this disclosure describes and illustrates an example method for persistent remote procedure calls for smart contract security including the particular steps of the method of FIG. 25, this disclosure contemplates any suitable method for persistent remote procedure calls for smart contract security including any suitable steps, which may include all, some, or none of the steps of the method of FIG.

25, where appropriate. Furthermore, although this disclosure describes and illustrates particular components, devices, or systems carrying out particular steps of the method of FIG. 25, this disclosure contemplates any suitable combination of any suitable components, devices, or systems carrying out any suitable steps of the method of FIG. 25.

Systems and Methods

Figure 26:
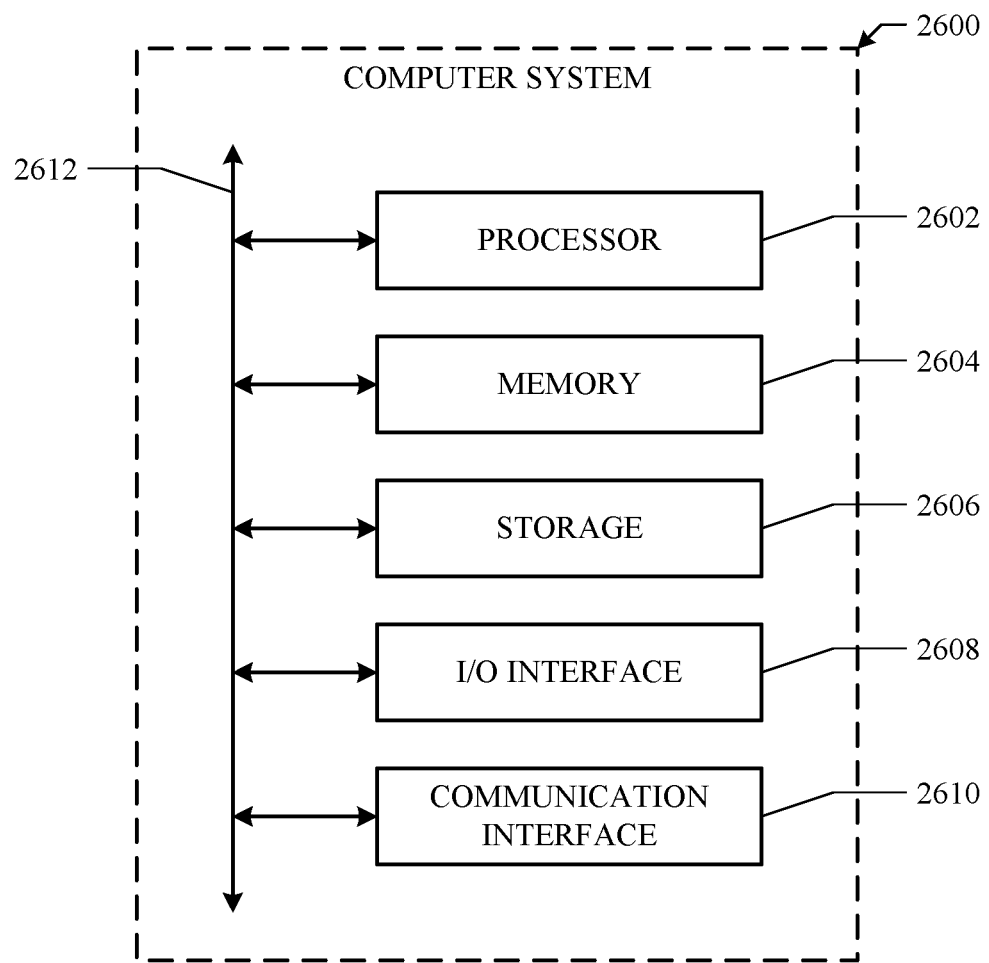
FIG. 26 illustrates an example computer system.

FIG. 26 illustrates an example computer system 2600. In particular embodiments, one or more computer systems 2600 perform one or more steps of one or more methods described or illustrated herein. In particular embodiments, one or more computer systems 2600 provide functionality described or illustrated herein. In particular embodiments, software running on one or more computer systems 2600 performs one or more steps of one or more methods described or illustrated herein or provides functionality described or illustrated herein. Particular embodiments include one or more portions of one or more computer systems 2600. Herein, reference to a computer system may encompass a computing device, and vice versa, where appropriate. Moreover, reference to a computer system may encompass one or more computer systems, where appropriate.

This disclosure contemplates any suitable number of computer systems 2600. This disclosure contemplates computer system 2600 taking any suitable physical form. As example and not by way of limitation, computer system 2600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 2600 may include one or more computer systems 2600; be unitary or distributed; span multiple locations; span multiple machines; span multiple data centers; or reside in a cloud, which may include one or more cloud components in one or more networks. Where appropriate, one or more computer systems 2600 may perform without substantial spatial or temporal limitation one or more steps of one or more methods described or illustrated herein. As an example and not by way of limitation, one or more computer systems 2600 may perform in real time or in batch mode one or more steps of one or more methods described or illustrated herein. One or more computer systems 2600 may perform at different times or at different locations one or more steps of one or more methods described or illustrated herein, where appropriate.

In particular embodiments, computer system 2600 includes a processor 2602, memory 2604, storage 2606, an input/output (I/O) interface 2608, a communication interface 2610, and a bus 2612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2602 includes hardware for executing instructions, such as those making up a computer program. As an example and not by way of limitation, to execute instructions, processor 2602 may retrieve (or fetch) the instructions from an internal register, an internal cache, memory 2604, or storage 2606; decode and execute them; and then write one or more results to an internal register, an internal cache, memory 2604, or storage 2606. In particular embodiments, processor 2602 may include one or more internal caches for data, instructions, or addresses. This disclosure contemplates processor 2602 including any suitable number of any suitable internal caches, where appropriate. As an example and not by way of limitation, processor 2602 may include one or more instruction caches, one or more data caches, and one or more translation lookaside buffers (TLBs). Instructions in the instruction caches may be copies of instructions in memory 2604 or storage 2606, and the instruction caches may speed up retrieval of those instructions by processor 2602. Data in the data caches may be copies of data in memory 2604 or storage 2606 for instructions executing at processor 2602 to operate on; the results of previous instructions executed at processor 2602 for access by subsequent instructions executing at processor 2602 or for writing to memory 2604 or storage 2606; or other suitable data. The data caches may speed up read or write operations by processor 2602. The TLBs may speed up virtual-address translation for processor 2602. In particular embodiments, processor 2602 may include one or more internal registers for data, instructions, or addresses. This disclosure contemplates processor 2602 including any suitable number of any suitable internal registers, where appropriate. Where appropriate, processor 2602 may include one or more arithmetic logic units (ALUs); be a multi-core processor; or include one or more processors 2602. Although this disclosure describes and illustrates a particular processor, this disclosure contemplates any suitable processor.

In particular embodiments, memory 2604 includes main memory for storing instructions for processor 2602 to execute or data for processor 2602 to operate on. As an example and not by way of limitation, computer system 2600 may load instructions from storage 2606 or another source (such as, for example, another computer system 2600) to memory 2604. Processor 2602 may then load the instructions from memory 2604 to an internal register or internal cache. To execute the instructions, processor 2602 may retrieve the instructions from the internal register or internal cache and decode them. During or after execution of the instructions, processor 2602 may write one or more results (which may be intermediate or final results) to the internal register or internal cache. Processor 2602 may then write one or more of those results to memory 2604. In particular embodiments, processor 2602 executes only instructions in one or more internal registers or internal caches or in memory 2604 (as opposed to storage 2606 or elsewhere) and operates only on data in one or more internal registers or internal caches or in memory 2604 (as opposed to storage 2606 or elsewhere). One or more memory buses (which may each include an address bus and a data bus) may couple processor 2602 to memory 2604. Bus 2612 may include one or more memory buses, as described below. In particular embodiments, one or more memory management units (MMUs) reside between processor 2602 and memory 2604 and facilitate accesses to memory 2604 requested by processor 2602. In particular embodiments, memory 2604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2604 may include one or more memories 2604, where appropriate. Although this disclosure describes and illustrates particular memory, this disclosure contemplates any suitable memory.

In particular embodiments, storage 2606 includes mass storage for data or instructions. As an example and not by way of limitation, storage 2606 may include a hard disk drive (HDD), a floppy disk drive, flash memory, an optical disc, a magneto-optical disc, magnetic tape, or a Universal Serial Bus (USB) drive or a combination of two or more of these. Storage 2606 may include removable or non-removable (or fixed) media, where appropriate. Storage 2606 may be internal or external to computer system 2600, where appropriate. In particular embodiments, storage 2606 is non-volatile, solid-state memory. In particular embodiments, storage 2606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2606 taking any suitable physical form. Storage 2606 may include one or more storage control units facilitating communication between processor 2602 and storage 2606, where appropriate. Where appropriate, storage 2606 may include one or more storages 2606. Although this disclosure describes and illustrates particular storage, this disclosure contemplates any suitable storage.

In particular embodiments, I/O interface 2608 includes hardware, software, or both, providing one or more interfaces for communication between computer system 2600 and one or more I/O devices. Computer system 2600 may include one or more of these I/O devices, where appropriate. One or more of these I/O devices may enable communication between a person and computer system 2600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2608 for them. Where appropriate, I/O interface 2608 may include one or more device or software drivers enabling processor 2602 to drive one or more of these I/O devices. I/O interface 2608 may include one or more I/O interfaces 2608, where appropriate. Although this disclosure describes and illustrates a particular I/O interface, this disclosure contemplates any suitable I/O interface.

In particular embodiments, communication interface 2610 includes hardware, software, or both providing one or more interfaces for communication (such as, for example, packet-based communication) between computer system 2600 and one or more other computer systems 2600 or one or more networks. As an example and not by way of limitation, communication interface 2610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2610 for it. As an example and not by way of limitation, computer system 2600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2600 may include any suitable communication interface 2610 for any of these networks, where appropriate. Communication interface 2610 may include one or more communication interfaces 2610, where appropriate. Although this disclosure describes and illustrates a particular communication interface, this disclosure contemplates any suitable communication interface.

In particular embodiments, bus 2612 includes hardware, software, or both coupling components of computer system 2600 to each other. As an example and not by way of limitation, bus 2612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2612 may include one or more buses 2612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more servers associated with a blockchain cybersecurity platform:
   receiving, by a cybersecurity authentication service of the blockchain cybersecurity platform, transaction data associated with a protected first function of a first blockchain transaction protocol associated with a first user and a first blockchain network;
   assigning, by the cybersecurity authentication service, a first authority classification of a plurality of authority classifications to the protected first function, wherein the first authority classification is assigned based at least in part on a transaction protocol runbook associated with the first user and the protected first function, and wherein the transaction protocol runbook comprises one or more preconfigured conditions associated with the protected first function;
   accessing, by a first cybersecurity authority of a plurality of cybersecurity authorities associated with the cybersecurity authentication service, via a cybersecurity authentication interface, the transaction data associated with the protected first function and the transaction protocol runbook, wherein the first cybersecurity authority has an authority classification corresponding to the first authority classification;
   determining, by the first cybersecurity authority, that the protected first function should be authenticated based on each preconfigured condition associated with the protected first function being satisfied;
   inputting, by the first cybersecurity authority, via the cybersecurity authentication interface, an authentication of the protected first function;
   transmitting, by the cybersecurity authentication service, to the first blockchain network, responsive to the authentication of the protected first function, a transaction bundle configured to update a second blockchain transaction protocol associated with the blockchain cybersecurity platform and the first blockchain transaction protocol to indicate that the protected first function is authenticated;
   responsive to the transaction bundle being transmitted to the first blockchain network, updating the second blockchain transaction protocol to indicate that the protected first function is authenticated based on the signed transaction data; and
   executing the protected first function by the first blockchain transaction protocol based on the accessed transaction data and the update to the second blockchain transaction protocol.

2. The method of claim 1, wherein determining whether the protected first function should be authenticated is further based on an escalation to a second cybersecurity authority of the plurality of cybersecurity authorities to determine whether the protected first function should be authenticated.

3. The method of claim 2, wherein the escalation to the second cybersecurity authority is based at least in part on one or more factors comprising one or more of:
   a risk metric associated with the protected first function;
   a sensitivity metric associated with the protected first function;
   a complexity metric associated with the protected first function;
   an importance metric associated with the protected first function;
   a transaction volume associated with the protected first function;
   a function type associated with the protected first function;
   a blockchain transaction protocol type associated with the first blockchain transaction protocol;
   a preconfigured flag requiring escalation to a second cybersecurity authority associated with the cybersecurity authentication service;
   a customized escalation protocol configured by one or more entities associated with the first blockchain transaction protocol; or
   a default escalation protocol configured by the blockchain cybersecurity platform.

4. The method of claim 3, wherein one or more of the factors are based at least in part on the transaction protocol runbook.

5. The method of claim 1, wherein the cybersecurity authentication service comprises an automated decisional logic module, and wherein determining whether the protected first function should be authenticated is further based on the automated decisional logic module determining whether each preconfigured condition is satisfied.

6. The method of claim 1, wherein the transaction bundle comprises the received transaction data and signed transaction data generated based on the received transaction data and a private encryption key.

7. The method of claim 1, wherein one or more of the preconfigured conditions are predetermined by one or more entities associated with the first blockchain transaction protocol.

8. The method of claim 1, further comprising:
   receiving, at a receiving node of the blockchain cybersecurity platform, transaction data associated with a first function of the first blockchain transaction protocol;
   determining that the first function is protected by the blockchain cybersecurity platform based on the transaction data comprising a modifier associated with the blockchain cybersecurity platform;
   storing, in the mempool of the blockchain cybersecurity platform, the transaction data associated with the protected first function.

9. The method of claim 8, further comprising:
   receiving, at a proxy blockchain transaction protocol associated with the blockchain cybersecurity platform and the first blockchain network, based on a persistent address associated with the proxy blockchain transaction protocol, the transaction data associated with the protected first function, wherein the proxy blockchain transaction protocol is configured to redirect the transaction data to an address associated with the receiving node of the blockchain cybersecurity platform.

10. The method of claim 9, wherein the transaction data is received at the proxy blockchain transaction protocol based on the modifier comprising the persistent address associated with the proxy blockchain transaction protocol.

11. The method of claim 1, further comprising:
generating, via a blockchain transaction simulation module, one or more transaction simulations for the protected first function based at least in part on the transaction data, wherein each transaction simulation indicates one or more predicted outcome states associated with the first blockchain network based on the protected first function being executed based on the received transaction data, and wherein generating the authentication object for the protected first function is further based on the generated transaction simulations.

12. The method of claim 11, wherein the blockchain transaction simulation module is based at least in part on one or more machine-learning models configured to determine whether the protected first function should be authenticated based on one or more risk metrics associated with the protected first function and one or more predetermined thresholds associated with the one or more risk metrics, respectively.

13. The method of claim 11, wherein execution of the protected first function is associated with one or more second functions associated with the first blockchain network, and wherein one or more of the transaction simulations further indicate one or more predicted outcome states for the one or more second functions based on the protected first function being executed.

14. The method of claim 1, wherein execution of the protected first function is associated with one or more second functions associated with the first blockchain network, wherein one or more of the second functions are protected by the blockchain cybersecurity platform, and wherein determining that the protected first function should be authenticated comprises determining that the one or more protected second functions should be authenticated.

15. The method of claim 1, wherein execution of the protected first function is associated with one or more second functions associated with the first blockchain network, and wherein one or more of the second functions are associated with one or more second blockchain transaction protocols.

16. The method of claim 1, wherein the first blockchain transaction protocol comprises a first on-chain executable smart contract, and wherein the second blockchain transaction protocol comprises a second on-chain executable smart contract.

17. One or more computer-readable non-transitory storage media embodying software that is operable when executed by a cybersecurity authentication service of a blockchain cybersecurity platform comprising one or more processors, cause the one or more processors to:
receive transaction data associated with a protected first function of a first blockchain transaction protocol associated with a first user and a first blockchain network;
assign a first authority classification of a plurality of authority classifications to the protected first function, wherein the first authority classification is assigned based at least in part on a transaction protocol runbook associated with the first user and the protected first function, and wherein the transaction protocol runbook comprises one or more preconfigured conditions associated with the protected first function;
access, by a first cybersecurity authority of a plurality of cybersecurity authorities of the cybersecurity authentication service, via a cybersecurity authentication interface, the transaction data associated with the protected first function and the transaction protocol runbook, wherein the first cybersecurity authority has an authority classification corresponding to the first authority classification;
determine, by the first cybersecurity authority, that the protected first function should be authenticated based on each preconfigured condition associated with the protected first function being satisfied;
input, by the first cybersecurity authority, via the cybersecurity authentication interface, an authentication of the protected first function;
transmit, to the first blockchain network, responsive to the authentication of the protected first function, a transaction bundle configured to update a second blockchain transaction protocol associated with the blockchain cybersecurity platform and the first blockchain transaction protocol to indicate that the protected first function is authenticated;
responsive to the transaction bundle being transmitted to the first blockchain network, update the second blockchain transaction protocol to indicate that the protected first function is authenticated based on the signed transaction data; and
execute the protected first function by the first blockchain transaction protocol based on the accessed transaction data and the update to the second blockchain transaction protocol.

18. A system comprising: one or more processors associated with a cybersecurity authentication service of a blockchain cybersecurity platform; and a non-transitory memory coupled to the processors comprising instructions executable by the processors, the processors operable when executing the instructions to:
receive transaction data associated with a protected first function of a first blockchain transaction protocol associated with a first user and a first blockchain network;
assign a first authority classification of a plurality of authority classifications to the protected first function, wherein the first authority classification is assigned based at least in part on a transaction protocol runbook associated with the first user and the protected first function, and wherein the transaction protocol runbook comprises one or more preconfigured conditions associated with the protected first function;
access, by a first cybersecurity authority of a plurality of cybersecurity authorities associated with the cybersecurity authentication service, via a cybersecurity authentication interface, the transaction data associated with the protected first function and the transaction protocol runbook, wherein the first cybersecurity authority has an authority classification corresponding to the first authority classification;
determine, by the first cybersecurity authority, that the protected first function should be authenticated based on each preconfigured condition associated with the protected first function being satisfied;
input, by the first cybersecurity authority, via the cybersecurity authentication interface, an authentication of the protected first function;
transmit, to the first blockchain network, responsive to the authentication of the protected first function, a transaction bundle configured to update a second blockchain transaction protocol associated with the blockchain cybersecurity platform and the first blockchain transaction protocol to indicate that the protected first function is authenticated;

responsive to the transaction bundle being transmitted to the first blockchain network, update the second blockchain transaction protocol to indicate that the protected first function is authenticated based on the signed transaction data; and execute the protected first function by the first blockchain transaction protocol based on the accessed transaction data and the update to the second blockchain transaction protocol.

* * * * *